US012071847B2

(12) United States Patent
Cooley et al.

(10) Patent No.: US 12,071,847 B2
(45) Date of Patent: Aug. 27, 2024

(54) ELECTROMAGNETIC TELEMETRY DEVICE

(71) Applicant: FastCAP Systems Corporation, Boston, MA (US)

(72) Inventors: John J. Cooley, Boston, MA (US); Riccardo Signorelli, The Woodlands, TX (US); Morris Green, Cambridge, MA (US); Joseph K. Lane, Cambridge, MA (US); Dan Stiurca, Boston, MA (US)

(73) Assignee: FASTCAP SYSTEMS CORPORATION, Boston, MA (US)

( * ) Notice: Subject to any disclaimer, the term of this patent is extended or adjusted under 35 U.S.C. 154(b) by 0 days.

(21) Appl. No.: 17/727,075

(22) Filed: Apr. 22, 2022

(65) Prior Publication Data

US 2022/0243586 A1    Aug. 4, 2022

Related U.S. Application Data

(63) Continuation of application No. 16/793,744, filed on Feb. 18, 2020, now Pat. No. 11,313,221, which is a continuation of application No. 15/186,531, filed on Jun. 19, 2016, now Pat. No. 10,563,501, which is a continuation of application No. PCT/US2014/071790, filed on Dec. 22, 2014.

(Continued)

(51) Int. Cl.
*E21B 47/13* (2012.01)
*E21B 41/00* (2006.01)
*G01V 11/00* (2006.01)
*H02J 7/00* (2006.01)
*H02J 7/34* (2006.01)

(52) U.S. Cl.
CPC .......... *E21B 47/13* (2020.05); *E21B 41/0085* (2013.01); *G01V 11/002* (2013.01); *H02J 7/00* (2013.01); *H02J 7/345* (2013.01)

(58) Field of Classification Search
CPC ... E21B 47/13; E21B 41/0085; G01V 11/002; H02J 7/00; H02J 7/345
USPC .......................................................... 307/19
See application file for complete search history.

(56) References Cited

U.S. PATENT DOCUMENTS 3,185,903 A    5/1965    Genovese
3,824,129 A    7/1974    Fagan, Jr.
(Continued)

FOREIGN PATENT DOCUMENTS

CA    2908296 A1    10/2007
CN    1030959 A    2/1989
(Continued)

OTHER PUBLICATIONS

[No Author Listed], New technology for electric vehicle. Japan Electric Society, Electric Vehicle Drive System Survey Special Committee. Machinery Industry Press. Section 5.6. Aug. 2008:134-9.

(Continued)

*Primary Examiner* — Hal Kaplan

(57) ABSTRACT

In one aspect, an electromagnetic (EM) telemetry device is disclosed including an EM telemetry circuit capable of transmitting a pulsed high power EM telemetry signal, wherein the high power EM telemetry signal has a peak or average pulse power of about 20 W to about 2000 W.

19 Claims, 23 Drawing Sheets

Related U.S. Application Data

(60) Provisional application No. 62/066,337, filed on Oct. 20, 2014, provisional application No. 62/056,166, filed on Sep. 26, 2014, provisional application No. 61/919,585, filed on Dec. 20, 2013.

(56) References Cited

U.S. PATENT DOCUMENTS

| | | |
|---|---|---|
| 3,841,152 A | 10/1974 | Guest |
| 3,968,473 A | 7/1976 | Patton et al. |
| 3,977,245 A | 8/1976 | Clark et al. |
| 3,982,182 A | 9/1976 | Hogg |
| 4,349,910 A | 9/1982 | Belz |
| 4,408,259 A | 10/1983 | Muranaka et al. |
| 4,604,676 A | 8/1986 | Senda et al. |
| 4,665,393 A | 5/1987 | Wilder et al. |
| 4,695,957 A | 9/1987 | Peltier |
| 4,802,143 A | 1/1989 | Smith |
| 4,831,558 A | 5/1989 | Shoup et al. |
| 4,849,699 A | 7/1989 | Gill et al. |
| 4,903,245 A | 2/1990 | Close et al. |
| 4,934,366 A | 6/1990 | Truex et al. |
| 4,982,485 A | 1/1991 | Nakaya et al. |
| 5,187,473 A | 2/1993 | Guest |
| 5,210,704 A | 5/1993 | Husseiny |
| 5,440,447 A | 8/1995 | Shipman et al. |
| 5,441,827 A | 8/1995 | Gratzel et al. |
| 5,448,911 A | 9/1995 | Mason |
| 5,476,709 A | 12/1995 | Inoue et al. |
| 5,493,626 A | 2/1996 | Schultz et al. |
| 5,517,464 A | 5/1996 | Lerner et al. |
| 5,636,178 A | 6/1997 | Ritter |
| 5,710,699 A | 1/1998 | King et al. |
| 5,711,988 A | 1/1998 | Tsai et al. |
| 5,831,934 A | 11/1998 | Gill et al. |
| 5,923,619 A | 7/1999 | Knapen et al. |
| 5,945,749 A | 8/1999 | Li |
| 5,982,156 A | 11/1999 | Weimer et al. |
| 6,059,847 A | 5/2000 | Farahmandi et al. |
| 6,072,315 A | 6/2000 | Slade |
| 6,118,251 A | 9/2000 | Atwater |
| 6,193,032 B1 | 2/2001 | Lesieutre et al. |
| 6,193,779 B1 | 2/2001 | Reichert et al. |
| 6,194,815 B1 | 2/2001 | Carroll |
| 6,205,016 B1 | 3/2001 | Niu |
| 6,232,706 B1 | 5/2001 | Dai et al. |
| 6,257,332 B1 | 7/2001 | Vidrine et al. |
| 6,304,427 B1 | 10/2001 | Reed et al. |
| 6,318,457 B1 | 11/2001 | Den Boer et al. |
| 6,350,488 B1 | 2/2002 | Lee et al. |
| 6,388,423 B1 | 5/2002 | Schilleci, Jr. |
| 6,413,285 B1 | 7/2002 | Chu et al. |
| 6,444,326 B1 | 9/2002 | Smith |
| 6,454,816 B1 | 9/2002 | Lee et al. |
| 6,491,848 B1 | 12/2002 | Sato et al. |
| 6,498,712 B1 | 12/2002 | Ditlya |
| 6,504,258 B2 | 1/2003 | Schultz et al. |
| 6,511,760 B1 | 1/2003 | Barone et al. |
| 6,514,113 B1 | 2/2003 | Lee et al. |
| 6,554,074 B2 | 4/2003 | Longbottom |
| 6,565,701 B1 | 5/2003 | Jerabek et al. |
| 6,641,434 B2 | 11/2003 | Boyle et al. |
| 6,644,110 B1 | 11/2003 | Curtis et al. |
| 6,665,169 B2 | 12/2003 | Tennent et al. |
| 6,764,874 B1 | 7/2004 | Zhang et al. |
| 6,843,119 B2 | 1/2005 | Patey et al. |
| 6,872,681 B2 | 3/2005 | Niu et al. |
| 6,906,911 B2 | 6/2005 | Ikeda et al. |
| 6,909,667 B2 | 6/2005 | Shah et al. |
| 6,914,341 B1 | 7/2005 | McIntyre |
| 6,924,059 B1 | 8/2005 | Kawakami et al. |
| 6,927,475 B2 | 8/2005 | Lu |
| 6,952,060 B2 | 10/2005 | Goldner et al. |
| 6,962,823 B2 | 11/2005 | Empedocles et al. |
| 7,070,833 B2 | 7/2006 | Smith et al. |
| 7,126,207 B2 | 10/2006 | Mosley et al. |
| 7,168,487 B2 | 1/2007 | Salamitou et al. |
| 7,201,627 B2 | 4/2007 | Ohnuma |
| 7,207,396 B2 | 4/2007 | Hall et al. |
| 7,327,556 B2 | 2/2008 | Ro et al. |
| 7,335,395 B2 | 2/2008 | Ward et al. |
| 7,381,367 B1 | 6/2008 | Baker et al. |
| 7,408,645 B2 | 8/2008 | DiFoggio |
| 7,468,679 B2 | 12/2008 | Feluch |
| 7,477,162 B2 | 1/2009 | Clark |
| 7,493,962 B2 | 2/2009 | Sheffield |
| 7,511,941 B1 | 3/2009 | Gallay et al. |
| 7,567,013 B2 | 7/2009 | Lu et al. |
| 7,573,397 B2 | 8/2009 | Petrovic et al. |
| 7,699,102 B2 | 4/2010 | Storm et al. |
| 7,713,658 B2 | 5/2010 | Mizuta et al. |
| 7,785,558 B2 | 8/2010 | Hikata |
| 7,857,644 B2 | 12/2010 | Madhavan et al. |
| 7,897,209 B2 | 3/2011 | Shibuya et al. |
| 7,914,927 B2 | 3/2011 | Mizuta et al. |
| 7,982,345 B2 | 7/2011 | Tung et al. |
| 7,982,439 B2 | 7/2011 | Trainor et al. |
| 7,999,695 B2 | 8/2011 | Rodney et al. |
| 8,025,971 B2 | 9/2011 | Maeno et al. |
| 8,120,509 B2 | 2/2012 | Young |
| 8,168,331 B2 | 5/2012 | Best et al. |
| 8,319,471 B2 | 11/2012 | Adest et al. |
| 8,502,696 B2 | 8/2013 | Clark |
| 8,531,818 B2 | 9/2013 | Hashimoto et al. |
| 8,760,851 B2 | 6/2014 | Signorelli et al. |
| 8,932,750 B2 | 1/2015 | Cooley et al. |
| 8,995,487 B1 | 3/2015 | Almonte |
| 9,001,495 B2 | 4/2015 | Martini et al. |
| 9,013,144 B2 | 4/2015 | Cooley et al. |
| 9,017,634 B2 | 4/2015 | Brambilla et al. |
| 9,206,672 B2 | 12/2015 | Cooley et al. |
| 9,209,434 B2 | 12/2015 | Epstein |
| 9,214,709 B2 | 12/2015 | Cooley et al. |
| 9,218,917 B2 | 12/2015 | Brambilla et al. |
| 9,404,360 B2 | 8/2016 | DiFoggio et al. |
| 9,515,499 B2 | 12/2016 | Signorelli et al. |
| 9,558,894 B2 | 1/2017 | Signorelli et al. |
| 9,683,441 B2 | 6/2017 | Signorelli et al. |
| 9,954,382 B2 | 4/2018 | Cooley et al. |
| 2001/0006108 A1 | 7/2001 | Brett |
| 2001/0040379 A1 | 11/2001 | Schultz et al. |
| 2002/0043369 A1 | 4/2002 | Vinegar et al. |
| 2002/0159943 A1 | 10/2002 | Smalley et al. |
| 2002/0177018 A1 | 11/2002 | Fuglevand |
| 2003/0003359 A1 | 1/2003 | Banno et al. |
| 2003/0027038 A1 | 2/2003 | Tsukamoto et al. |
| 2003/0030969 A1 | 2/2003 | Farahmandi et al. |
| 2003/0048697 A1 | 3/2003 | Hirsch et al. |
| 2003/0081372 A1 | 5/2003 | Nakazawa et al. |
| 2003/0084716 A1 | 5/2003 | Patey et al. |
| 2004/0004553 A1 | 1/2004 | Rodney |
| 2004/0084219 A1 | 5/2004 | Moore et al. |
| 2004/0131937 A1 | 7/2004 | Chen et al. |
| 2004/0188350 A1 | 9/2004 | Beste et al. |
| 2004/0229117 A1 | 11/2004 | Mitani et al. |
| 2004/0265682 A1 | 12/2004 | Hudson et al. |
| 2005/0030628 A1 | 2/2005 | Wagner et al. |
| 2005/0152096 A1 | 7/2005 | Farahmandi et al. |
| 2005/0172721 A1 | 8/2005 | Daigle |
| 2005/0182744 A1 | 8/2005 | Kawabata et al. |
| 2005/0208207 A1 | 9/2005 | Hinoki et al. |
| 2005/0230270 A1 | 10/2005 | Ren et al. |
| 2005/0231893 A1 | 10/2005 | Harvey |
| 2005/0234177 A1 | 10/2005 | Zaghib et al. |
| 2005/0238810 A1 | 10/2005 | Scaringe et al. |
| 2006/0001399 A1 | 1/2006 | Salasoo et al. |
| 2006/0019168 A1 | 1/2006 | Li et al. |
| 2006/0115722 A1 | 6/2006 | Kim |
| 2006/0191681 A1 | 8/2006 | Storm et al. |
| 2006/0191687 A1 | 8/2006 | Storm et al. |
| 2006/0194102 A1 | 8/2006 | Keshishian et al. |
| 2006/0256506 A1 | 11/2006 | Konuma et al. |
| 2006/0279906 A1 | 12/2006 | Stemen et al. |
| 2006/0288769 A1 | 12/2006 | Odom |

(56) References Cited

U.S. PATENT DOCUMENTS

| | | |
|---|---|---|
| 2007/0015336 A1 | 1/2007 | Farahmandi et al. |
| 2007/0076349 A1 | 4/2007 | Dementiev et al. |
| 2007/0097598 A1 | 5/2007 | Siggel et al. |
| 2007/0120704 A1 | 5/2007 | Hudson et al. |
| 2007/0146965 A1 | 6/2007 | Mitchell et al. |
| 2007/0175663 A1 | 8/2007 | Rotthaeuser |
| 2007/0182583 A1 | 8/2007 | Feluch |
| 2007/0188977 A1 | 8/2007 | Takeda et al. |
| 2007/0254213 A1 | 11/2007 | Best et al. |
| 2007/0258192 A1 | 11/2007 | Schindall et al. |
| 2007/0258193 A1 | 11/2007 | Zhong et al. |
| 2007/0259216 A1 | 11/2007 | Logan |
| 2007/0292746 A1 | 12/2007 | Sloop |
| 2007/0296606 A1 | 12/2007 | Godager |
| 2008/0013224 A1 | 1/2008 | Kim et al. |
| 2008/0059089 A1 | 3/2008 | Hornick et al. |
| 2008/0066979 A1 | 3/2008 | Carter |
| 2008/0068801 A1 | 3/2008 | Wilk |
| 2008/0083626 A1 | 4/2008 | Kubo et al. |
| 2008/0090183 A1 | 4/2008 | Zhu et al. |
| 2008/0094777 A1 | 4/2008 | Itahashi et al. |
| 2008/0123330 A1 | 5/2008 | Sullivan |
| 2008/0128123 A1 | 6/2008 | Gold |
| 2008/0150524 A1 | 6/2008 | Song et al. |
| 2008/0164062 A1 | 7/2008 | Brackin et al. |
| 2008/0192407 A1 | 8/2008 | Lu et al. |
| 2008/0212261 A1 | 9/2008 | Ajayan et al. |
| 2008/0289408 A1* | 11/2008 | Adnan .............. E21B 47/103 166/305.1 |
| 2008/0316678 A1 | 12/2008 | Ehrenberg et al. |
| 2009/0011330 A1 | 1/2009 | Onodera et al. |
| 2009/0021890 A1 | 1/2009 | Bourcier et al. |
| 2009/0102478 A1 | 4/2009 | Reiderman et al. |
| 2009/0194314 A1 | 8/2009 | Varkey et al. |
| 2009/0250409 A1 | 10/2009 | Fiene et al. |
| 2009/0272935 A1 | 11/2009 | Hata et al. |
| 2009/0272946 A1 | 11/2009 | Lu |
| 2009/0286163 A1 | 11/2009 | Shin et al. |
| 2009/0294753 A1 | 12/2009 | Hauge et al. |
| 2009/0302153 A1 | 12/2009 | Matasso et al. |
| 2009/0303658 A1 | 12/2009 | Hiroyuki et al. |
| 2009/0303686 A1 | 12/2009 | Hall et al. |
| 2010/0016287 A1 | 1/2010 | Bonanomi et al. |
| 2010/0026518 A1 | 2/2010 | Kirst et al. |
| 2010/0046142 A1 | 2/2010 | Aitchison et al. |
| 2010/0066560 A1 | 3/2010 | McDaniel et al. |
| 2010/0119934 A1 | 5/2010 | Ushio et al. |
| 2010/0134955 A1 | 6/2010 | O'Connor et al. |
| 2010/0182075 A1 | 7/2010 | Yang et al. |
| 2010/0194117 A1 | 8/2010 | Pabon et al. |
| 2010/0196600 A1 | 8/2010 | Shibuya et al. |
| 2010/0236777 A1 | 9/2010 | Partouche et al. |
| 2010/0259866 A1 | 10/2010 | Shaffer et al. |
| 2011/0049901 A1 | 3/2011 | Tinnen et al. |
| 2011/0080689 A1 | 4/2011 | Bielawski et al. |
| 2011/0085285 A1 | 4/2011 | Zednicek et al. |
| 2011/0102023 A1 | 5/2011 | Forgang |
| 2011/0122662 A1 | 5/2011 | Li et al. |
| 2011/0141661 A1 | 6/2011 | Muthu et al. |
| 2011/0150736 A1 | 6/2011 | Hagiwara et al. |
| 2011/0151317 A1 | 6/2011 | Giroud et al. |
| 2011/0163891 A1 | 7/2011 | Wilson et al. |
| 2011/0170236 A1 | 7/2011 | Young |
| 2012/0028086 A1 | 2/2012 | Shi et al. |
| 2012/0154979 A1 | 6/2012 | Signorelli et al. |
| 2012/0156528 A1 | 6/2012 | Cooley |
| 2012/0268074 A1* | 10/2012 | Cooley .............. H01M 10/39 320/167 |
| 2012/0273271 A1 | 11/2012 | Stuart-Bruges |
| 2012/0313586 A1 | 12/2012 | Signorelli et al. |
| 2012/0313591 A1 | 12/2012 | Brambilla et al. |
| 2013/0026978 A1 | 1/2013 | Cooley et al. |
| 2013/0029215 A1 | 1/2013 | Signorelli et al. |
| 2013/0033130 A1 | 2/2013 | Nair et al. |
| 2013/0044405 A1 | 2/2013 | Brambilla et al. |
| 2013/0045157 A1 | 2/2013 | Brambilla et al. |
| 2013/0063276 A1* | 3/2013 | Zientarski .............. E21B 47/12 340/854.4 |
| 2013/0088363 A1* | 4/2013 | Gonzalez .............. G01V 11/002 340/854.9 |
| 2013/0106615 A1 | 5/2013 | Prammer |
| 2013/0141840 A1 | 6/2013 | Cooley et al. |
| 2013/0143108 A1 | 6/2013 | Epstein |
| 2013/0206401 A1* | 8/2013 | Bhoite .................. E21B 34/066 166/250.01 |
| 2013/0235509 A1 | 9/2013 | Ruoff et al. |
| 2013/0249705 A1 | 9/2013 | Sharp et al. |
| 2013/0271066 A1 | 10/2013 | Signorelli et al. |
| 2014/0042988 A1 | 2/2014 | Kuttipillai |
| 2014/0057164 A1 | 2/2014 | Brambilla et al. |
| 2014/0265565 A1 | 9/2014 | Cooley et al. |
| 2014/0265580 A1 | 9/2014 | Cooley et al. |
| 2015/0002987 A1 | 1/2015 | Signorelli et al. |
| 2015/0096744 A1 | 4/2015 | Signorelli et al. |
| 2015/0107824 A1 | 4/2015 | Signorelli et al. |
| 2015/0210548 A1 | 7/2015 | Brambilla et al. |
| 2015/0218913 A1 | 8/2015 | Cooley et al. |
| 2015/0279578 A1 | 10/2015 | Martini et al. |
| 2015/0287961 A1 | 10/2015 | Signorelli et al. |
| 2017/0316889 A1 | 11/2017 | Martini et al. |
| 2018/0068803 A1 | 3/2018 | Brambilla et al. |
| 2018/0068804 A1 | 3/2018 | Brambilla et al. |
| 2018/0171777 A1 | 6/2018 | Cooley et al. |
| 2018/0204689 A1 | 7/2018 | Brambilla |
| 2018/0211794 A1 | 7/2018 | Brambilla |
| 2019/0058345 A1 | 2/2019 | Cooley et al. |

FOREIGN PATENT DOCUMENTS

| | | | |
|---|---|---|---|
| CN | 2115403 U | 9/1992 | |
| CN | 1096611 A | 12/1994 | |
| CN | 1098764 A | 2/1995 | |
| CN | 1538470 A | 10/2004 | |
| CN | 101180691 A | 5/2008 | |
| CN | 101395748 A | 3/2009 | |
| CN | 101600851 A | 12/2009 | |
| CN | 201588627 U | 9/2010 | |
| CN | 103061754 A | 4/2013 | |
| EP | 1305502 B1 | 3/2007 | |
| EP | 1918508 A1 | 5/2008 | |
| FR | 2621072 A1 | 3/1989 | |
| GB | 2009473 A | 6/1979 | |
| GB | 2433753 A | 7/2007 | |
| JP | S63261811 A | 10/1988 | |
| JP | H05234814 A | 9/1993 | |
| JP | 2002535808 A | 10/2002 | |
| JP | 2003115422 A | 4/2003 | |
| JP | 2003133185 A | 5/2003 | |
| JP | 2004127774 A | 4/2004 | |
| JP | 2007109609 A | 4/2007 | |
| JP | 2007131596 A | 5/2007 | |
| JP | 2007518905 A | 7/2007 | |
| JP | 2007273149 | 10/2007 | |
| JP | 2008088135 A | 4/2008 | |
| JP | 2009534828 A | 9/2009 | |
| JP | 2010220413 A | 9/2010 | |
| JP | 2012074541 A | 4/2012 | |
| JP | 2016521451 A5 * | 3/2013 | ......... E21B 41/0085 |
| RU | 2272132 C2 | 3/2006 | |
| RU | 2273732 C2 | 4/2006 | |
| RU | 2439319 C2 | 1/2012 | |
| WO | 9407272 A1 | 3/1994 | |
| WO | 9966985 A1 | 12/1999 | |
| WO | 0042674 | 7/2000 | |
| WO | 0165054 A1 | 9/2001 | |
| WO | 2006060673 A1 | 6/2006 | |
| WO | 2007101303 A1 | 9/2007 | |
| WO | 2008016990 A2 | 2/2008 | |
| WO | 2008085946 A2 | 7/2008 | |
| WO | 2009137508 A1 | 11/2009 | |
| WO | WO-2009149038 A2 * | 12/2009 | ......... E21B 41/0085 |
| WO | 2012041437 A2 | 4/2012 | |
| WO | 2012162500 A2 | 11/2012 | |
| WO | 2012170749 A2 | 12/2012 | |

(56) References Cited

FOREIGN PATENT DOCUMENTS

| WO | 2013009720 | A2 | 1/2013 |
|---|---|---|---|
| WO | 2013010641 | A1 | 1/2013 |
| WO | 2013016145 | A1 | 1/2013 |
| WO | 2013067540 | A1 | 5/2013 |
| WO | 2013126915 | A1 | 8/2013 |
| WO | 2014145259 | A2 | 9/2014 |
| WO | 2014145520 | A2 | 9/2014 |
| WO | 2015054432 | A1 | 4/2015 |
| WO | 2015095858 | A2 | 6/2015 |
| WO | 2015102716 | A2 | 7/2015 |
| WO | 2015138038 | A2 | 9/2015 |
| WO | 2015171528 | A1 | 11/2015 |
| WO | 2016057983 | A2 | 4/2016 |

OTHER PUBLICATIONS

[No Author Listed], Principles of Automobile Engines. The Peoples Transportation Press. Oct. 2007:260.
An, et al., "Electrochemical Properties of High-Power Supercapacitors Using Single-Walled Carbon Nanotube Electrodes," Adv. Funct. Mater., Oct. 2001, 387-392, vol. 11, No. 5.
Awad, et al., "Thermal degradation studies of alkyl-imidazolium salts and their application in nanocomposites," Thermochimica Acta, pp. 3-11, 2004, vol. 409.
Emmenegger, et al., "Investigation of Electrochemical Double-layer {ECOL} Capacitors Electrodes Based on Carbon Nanotubes and Activated Carbon Materials," J. of Power Sources, 2003, pp. 321-329, vol. 124.
Extended European Search Report for EP App. No. 12817809.2 mailed Jul. 14, 2015.
Extended European Search Report for EP App. No. 12846480.7 mailed Aug. 29, 2016.
Extended European Search Report For EP App. No. 14764474.4 mailed Dec. 21, 2016.
Extended European Search Report mailed Jun. 25, 2015 for EP App. No. 12790090.0.
Hua, Diesel Engine Failure Analysis. Coal Industry Press. 1987:217-9.
International Preliminary Report on Patentability for PCT/US2012/047474 mailed Feb. 6, 2014.
International Preliminary Report on Patentability for PCT/US2012/063621 mailed May 15, 2014.
International Preliminary Report on Patentability for PCT/US2014/029992 mailed Sep. 24, 2015.
International Preliminary Report on Patentability for PCT/US2014/071790 mailed Jun. 30, 2016.
International Search Report and Written Opinion for PCT/US2007/068314 mailed Feb. 13, 2008.
International Search Report and Written Opinion for PCT/US2012/039342 mailed Dec. 6, 2012.
International Search Report and Written Opinion for PCT/US2012/045994 mailed Dec. 26, 2012.
International Search Report and Written Opinion for PCT/US2012/047474 mailed Oct. 16, 2012.
International Search Report and Written Opinion for PCT/US2012/063621 mailed Mar. 25, 2013.
International Search Report and Written Opinion for PCT/US2013/027697 mailed Jun. 26, 2013.
International Search Report and Written Opinion for PCT/US2014/029992 mailed Oct. 7, 2014.
International Search Report and Written Opinion for PCT/US2014/071790 mailed Jul. 21, 2015.
International Search Report and Written Opinion for PCT/US2015/029117 mailed Jul. 20, 2015.
International Search Report for PCT/US2014/030310 mailed Oct. 10, 2014.
Jun, Performance and Application of Ionic Liquids. China Textile Press. Beijing, China. 2007:58-62, 376-7.
Marincic, "High Temperature Electrochemical Double Layer Capacitors with Reduced Leakage Rate," 14th International Seminar on Double Layer Capacitors and Hybrid Energy Storage Devices, Dec. 6-8, 2004, pp. 310-316.
Maxwell Active Cell Voltage Management Electronics Document #1011130. Maxwell Technologies. Published Feb. 17, 2007.9 pages.
Maxwell Technologies Application Note, "Maxwell Technologies' Test Procedures for Capacitance, ESR, Leakage Current and Self-Discharge Characterizations of Ultracapacitors," Jul. 2009, pp. 1-10.
Murakami, et al., "Growth of Vertically Aligned Single-walled Carbon Nanotube Films on Quartz Substrates and Their Optical Anisotropy," Chem. Phys. Lett., 2004, pp. 298-303, vol. 385.
Niu, et al., "High Power Electrochemical Capacitors Based on Carbon Nanotube Electrodes," Appl. Phys. Lett., Mar. 17, 1997, pp. 1480-1482, vol. 70, No. 11.
Office Action mailed Apr. 16, 2019 for CN App No. 201280036518.X.
Office Action mailed Dec. 11, 2013 for U.S. Appl. No. 12/928,897.
Office Action mailed Jul. 16, 2014 for U.S. Appl. No. 12/928,897.
Office Action mailed Jun. 18, 2014 for U.S. Appl. No. 13/588,452.
Office Action mailed May 29, 2014 for U.S. Appl. No. 13/560,628.
Office Action mailed Oct. 15, 2014 for U.S. Appl. No. 13/587,037.
Quan, Ionic Liquids—Properties, Preparation and Application. The Chinese Petrochemical Press. Beijing, China. 2006:37-40, 407-11.
Randstrom, "The influence of air and its components on the cathodic stability of N-butyl-N-methylpyrrolidinium bis(trifluoromethanesulfonyl)imide," Electrochemica Acta, pp. 1837-1842, Aug. 19, 2007, vol. 53.
Robertson, "Realistic applications of CNTs," materials today, Oct. 2004, pp. 46-52, vol. 7, No. 10.
Signorelli, et al., "Carbon Nanotube Enhanced Ultracapacitor", Sep. 2004.
Signorelli, et al., "High Density Energy Storage Using a Nanotube-Enhanced Ultracapacitor," 16th International Seminar on Double Layer Capacitors and Hybrid Energy Storage Devices, Dec. 4-6, 2006, pp. 15-21.
Signorelli, et al., "High Potential Vertically Aligned Carbon Nanotubes as EDLC Electrodes," 18th International Seminar on Double Layer Capacitors and Hybrid Energy Storage Devices, Dec. 8-10, 2008, pp. 73-79.
Signorelli, et al., "Nanotube Enhanced Ultracapacitor," 14th International Seminar on Double Layer Capacitors and Hybrid Energy Storage Devices, Dec. 6-8, 2004, pp. 49-61.
Signorelli, et al., "Nanotube Enhanced Ultracapacitor," 15th International Seminar on Double Layer Capacitors and Hybrid Energy Storage Devices, Dec. 5-7, 2005, pp. 158-168.
Ue, et al., "Application of Low-Viscosity Ionic Liquid to the Electrolyte of Double-Layer Capacitors," J. Electrochem. Soc., Feb. 28, 2003, pp. A499-A502, vol. 150, No. 4.
Wongwiriyapan, et al., "Direct Growth of Single-Walled Carbon Nanotube Networks on Alumina Substrate: A novel route to Ultrasensitive Gas Sensor Fabrication", Japanese Journal of Applied Physics, Nov. 9, 2005, pp. 8227-8230, vol. 44, No. 11.
Xiong, Green Solvent: Synthesis and Application of Ionic Liquids. Chemical Industry Press. Beijing, China. 2004:254.
Zuckerbrod, et al., "How Dry I Am: Optimizing Cell Performance Through Proper Component Drying," 15th International Seminar on Double Layer Capacitors and Hybrid Energy Storage Devices, Dec. 5-7, 2005, pp. 101-110.
[No Author Listed], Canline Wirelines Stainless and Nickel Product Overview. Central Wire. 2007. 7 pages.
[No Author Listed], DPU Downhole Power Unit. Halliburton Product Overview. Internet Printout. Accessed Apr. 6, 2012 from <http://www.halliburton.com>. 1 page.
[No Author Listed], Flow Scanner. Schlumberger Product Overview. Aug. 2006. 8 pages.
[No Author Listed], Integrating Coiled Tubing and Production Logging for ConocoPhillips. Schlumberger Case Study Overview. 2010. 1 page.
[No Author Listed], Memory Production Logging (MPL) Service. Halliburton Product Overview. Internet Printout. Accessed Apr. 6, 2012 from <http://www.halliburton.com>. 1 page.

(56) References Cited

OTHER PUBLICATIONS

[No Author Listed], New power in production logging. Middle East Reservoir Review. Schlumberger. 2001;2:6-9.

[No Author Listed], New power in production logging. Middle East Well Evaluation Review. Schlumberger. 1997;19:38-43.

[No Author Listed], Oscilla Power, Homepage. Web Printout. Last accessed Feb. 29, 2012 at <http://oscillapower.com/>. 2 pages.

[No Author Listed], Oscilla Power, iMEC Technology. Web Printout. Last accessed Feb. 29, 2012 from <http://oscillapower.com/imec-technology/>. 2 pages.

[No Author Listed], Power Over Fiber. RLH Industries, Inc. Product Overview. Orange, CA. 2008 2 pages.

[No Author Listed], Production Logging Tools. Lee Specialties Product Listing. Internet Printout. Accessed Jun. 21, 2018 from archive.org as available to the public Apr. 27, 2011 at <http://www.leespecialties.com/ptools/>. 3 pages.

[No Author Listed], Slickline Wikipedia Entry. Last modified Aug. 10, 2011. Last accessed Apr. 6, 2012 at <http://en.wikipedia.org/w/index.php?title=Slickline&oldid=444019747>. 7 pages.

An, et al., "Supercapacitors Using Single-Walled Carbon Nanotube Electrodes", Advanced Materials, Apr. 2001, pp. 497-500, vol. 13, No. 7.

Balducci, et al., "High temperature carbon-carbon supercapacitor using ionic liquid as electrolyte," J. Power Sources, pp. 922-927, Jan. 3, 2007, vol. 165.

Bamforth et al., Revitalizing Production Logging. Oilfield Review. 1996;44-60.

Carter, A Differential Op-Amp Circuit Collection. Application Report. Texas Instruments. Dallas, TX.Jul. 2001:17 pages.

Halber, "Researchers Fired Up Over New Battery", The Tech, Feb. 8, 2006, pp. 1, 5, vol. 50, No. 16.

Hensley, et al., "The evolution of oilfield batteries", Oilfield Review, Autumn 1998, pp. 42-57.

Hutchens et al., 275° C. Downhole switched-Mode Power Supply. Final Technical Progress Report for DOE Award No. DE-FC26-06NT42948. 2008. 53 pages.

International Preliminary Report on Patentability for PCT/US2015/029117 mailed Nov. 17, 2016.

International Search Report and Written Opinion for PCT/US2012/041438 mailed Nov. 19, 2012.

Koch, "Electrochemical Double Layer Capacitors for High Temperature Applications," 14th International Seminar on Double Layer Capacitors and Hybrid Energy Storage Devices, Dec. 6-8, 2004, pp. 33-39.

Koch, "Thermally Robust Capacitors for the Drilling Industry," Report for U.S. Dept. of Energy Grant No. DE-FG02-06ER84598 for the period Jun. 28, 2006 to Mar. 27, 2007.

Liu, et al., "Graphene-Based Supercapacitor with an Ultrahigh Energy Density," Nano Lett., pp. 4863-4868, 2010, vol. 10.

Ngo, et al., "Thermal properties of imidazolium ionic liquids," Thermochimica Acta, pp. 97-102, 2000, vol. 357-58.

Nishida, et al., "Physical and electrochemical properties of 1-alkyl-3-methylimidazolium tetrafluoroborate for electrolyte," J. Fluorine Chem., pp. 135-141, 2003, vol. 120.

Price, Downhole power for deep, hot drilling. E&P. Dec. 4, 2005. Internet Printout. Accessed Apr. 6, 2012 at <http://www.epmag.com/EP-Magazine/archive/Downhole-power-deep-hot-drilling_4157>. 4 pages.

Schneuwly, et al. "Properties of supercapacitors From the state-of-the-ar to future trends" Proc. PCIM 2000. 9 pages.

Shamsipur, et al., "Physical and electrochemical properties of ionic liquids 1-ethyl-3-methylimidazolium tetrafluoroborate, 1-butyl-3-methylimidazolium trifluoromethanesulfonate and 1-butyl-1-methylpyrrolidinium bis (trifluoromethylsulfonyl)imide," J. Mol. Liq., pp. 43-50, Aug. 24, 2010, vol. 157.

Signorelli, et al., "Fabrication and Electrochemical Testing of the First Generation Carbon-Nanotube Based Ultracapacitor Cell," 17th International Seminar on Double Layer Capacitors and Hybrid Energy Storage Devices, Dec. 10-12, 2007, pp. 70-78.

European Search Report for European Application No. 23210770.6 dated Mar. 21, 2024; 16 pages.

\* cited by examiner

ELECTROMAGNETIC TELEMETRY DEVICE

CROSS REFERENCE TO RELATED APPLICATIONS

This application is a Continuation of U.S. application Ser. No. 16/793,744, filed on Feb. 18, 2020, which is a Continuation application of and claims priority to U.S. application Ser. No. 15/186,531, filed on Jun. 19, 2016, now U.S. Pat. No. 10,563,501, granted on Feb. 18, 2020, which claims priority to PCT/US2014/071790, filed on Dec. 22, 2014, which in turn claims priority to U.S. Provisional Patent Application No. 61/919,585, filed Dec. 20, 2013; U.S. Provisional Patent Application No. 62/066,337, filed Oct. 20, 2014; U.S. Provisional Patent Application No. 62/056,166, filed Sep. 26, 2014, the contents of each of which are incorporated herein by reference in their entirety. The present application is also related to the applications listed in Table 2 below the entire contents of each of which are incorporated herein by reference.

FIELD OF THE DISCLOSURE

This disclosure herein relates to exploration for oil and gas and geothermal and other subterranean resources and, in particular, to downhole electromagnetic telemetry devices, systems, and methods of their use.

BACKGROUND

In the exploration for oil and gas, it is necessary to drill a wellbore into the Earth. While drilling of the wellbore permits individuals and companies to evaluate sub-surface materials and to extract desired hydrocarbons, many problems are encountered.

For example, it is well known that the "easy oil" is generally gone. Exploration now requires searching to greater depths than ever before. This necessitates drilling deeper and deeper, and thus into harsh environments, such as those having temperatures ranging from 200° C. up to or in excess of 300° C. Generally, present day instrumentation is not built to operate in such an environment, and will fail well before reaching ambient temperatures within this range.

The growing complexity of downhole instrumentation further complicates this problem. That is, as technology continues to improve, exploration is making use of more instrumentation than ever before. With this usage comes an increased demand for power downhole. In addition, downhole instruments becoming available have greater instantaneous (or pulse or peak) power requirements. For example, certain downhole instruments may be able to use an existing downhole power source while operating in a first mode, e.g., a standby mode, but require a high power pulse, which existing power sources cannot readily meet, during a second mode of operation, e.g., a data collection or transmission mode.

Unfortunately, many of the known downhole power sources have substantial drawbacks. For example, various types of batteries suffer catastrophic failure at elevated temperature, and can thus destroy instrumentation. Meeting the high instantaneous (or peak or pulse) power demand of certain downhole instruments requires high rate batteries, which typically have a lower capacity than low or medium rate batteries and are more susceptible to catastrophic failure at elevated temperatures. Additionally, batteries currently used in downhole applications are typically not rechargeable and may be quite expensive. When a battery requires replacement, e.g., due to failure or charge depletion, a drilling operation must be halted while the drillstring, typically thousands of linear feet, is extracted from the well to gain access to the batteries and any instrumentation that may also require replacement. This operation is time consuming and expensive, and potentially hazardous.

Another currently available downhole power source is a downhole generator, e.g., a turbine-based generator. Downhole generators may not suffer from the same temperature limitations as available downhole battery technologies, but downhole electrical generators are highly complex and expensive devices. For example, a typical high temperature, high pressure downhole turbine generator is designed to withstand temperatures up to 200° C. to 300° C., pressures in the thousands of pounds per square inch (psi), shock and vibrational forces up to several hundred g, and exposure to corrosive chemicals present in the drilling mud. Thus, downhole generators are typically constructed out of expensive, highly engineered materials, similar to those found in expensive jet engines or other gas turbines. In terms of electrical performance, downhole generators also suffer from many of the same limitations as batteries, being unable to provide consistently high power pulses to meet the requirements of many downhole instruments.

Electromagnetic ("EM") telemetry tools are an example of a class of downhole instruments with complex power requirements, particularly pulse power requirements. EM telemetry involves transmitting information about subsurface conditions to the surface using an EM signal, as opposed to mud pulse ("MP") telemetry where information is transmitted by mechanically varying the pressure of the drilling fluid (or mud) in the wellbore. EM telemetry typically has a higher data transfer (or bit) rate (about 10 bits per second ("bps")) than MP telemetry (about 1-4 bps). In addition, MP telemetry is not suited to many complex drilling operations, e.g., directional drilling or underbalanced drilling, where EM telemetry is necessary. Therefore, EM telemetry is necessary or favored during many drilling operations. The strength of an EM telemetry signal is directly related to the power—a stronger, more powerful EM telemetry signal can propagate over a longer distance and/or have a higher bit rate. For example, many conventional EM telemetry tools cannot operate at depths greater than a few thousand feet because signal attenuation renders the signal undetectable at the surface receiver. In addition, many conventional EM telemetry tools have efficiency limitations that prevent them from delivering a high power EM signal.

Therefore, a high power EM telemetry device is needed that is capable of efficiently providing high power EM telemetry signals in a downhole environment, where temperatures range from ambient environmental temperatures up to about 200° C. Celsius or higher, including up to about 300° C.

SUMMARY

In one aspect, an electromagnetic (EM) telemetry device is disclosed including an EM telemetry circuit capable of transmitting a pulsed high power EM telemetry signal, wherein the high power EM telemetry signal has a peak or average pulse power of about 20 W to about 2000 W.

In another aspect, a topside receiver is disclosed for receiving a telemetry signal from a downhole electromagnetic telemetry device, wherein the telemetry signal is transmitted through the earth to the receiver. In some embodiments, the receiver includes: a receiver antenna including a first electrode and a second electrode, wherein the receiver antenna is configured to generate an antenna signal current and an antenna signal voltage in response to the telemetry signal; a detector configured to detect at least one of the antenna signal current and the antenna signal voltage; and a decoder configured to decode data encoded on the telemetry signal with a bit rate of at least 1 bit per second (bps) based on the detected antenna signal current or antenna signal voltage.

In another aspect, a method of receiving a telemetry signal from a downhole electromagnetic telemetry device is disclosed, the method including: selecting a topside receiver of the type described herein; receiving the telemetry signal from the downhole electromagnetic telemetry device transmitted through the earth to the receiver; generating an antenna signal current and an antenna signal voltage in response to the telemetry signal; detecting at least one of the an antenna signal current and the antenna signal voltage; and decoding data encoded on the telemetry signal based on the detected antenna signal current or antenna signal voltage with a bit rate of at least 1 bit per second (bps).

In another aspect, an electromagnetic (EM) telemetry device is disclosed including an EM telemetry circuit capable of transmitting a pulsed high power EM telemetry signal, wherein: the high power EM telemetry signal has a peak or average pulse power of about 20 W to about 2000 W, and the EM telemetry circuit has a maximum operating temperature of at least 150 degrees Celsius.

In another aspect, a method is disclosed including transmitting an EM telemetry signal from a downhole location using an EM telemetry system of the type described herein.

In another aspect, a system is disclosed including: a receiver of the type described herein; and a transmitter comprising of the type described herein configured to transmit a telemetry signal to the receiver.

In another aspect, a method is disclosed including: establishing a telemetry communications link using an EM telemetry system of the type described herein.

DETAILED DESCRIPTION OF CERTAIN EMBODIMENTS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings.

DETAILED DESCRIPTION OF CERTAIN EMBODIMENTS

Disclosed herein are devices, systems, and methods that overcome the limitations of other existing EM telemetry tools. The EM telemetry devices, systems, and methods disclosed herein provide consistent and efficient high power EM signals. The EM telemetry devices disclosed herein are capable of receiving power from a variety of available downhole power sources, including without limitation batteries, generators, rechargeable energy storage devices, and topside power sources, and delivering a high power (e.g., greater than 20 W or greater than 50 W, and up to 100 W, 250 W, 500 W, 750 W, 1000 W, 1250 W, 1500 W, 1750 W, 2000 W or more) EM pulse (or train of pulses) to an EM antenna. Delivering high power EM telemetry signals enables faster data transmission rates and deeper drilling operations.

The EM telemetry devices, systems, and methods disclosed herein also enable numerous operational advantages, including without limitation improved management of downhole power sources (e.g., primary batteries), increased runtime, increased electrical efficiency, reduced power consumption, improved thermal management, multi-channel (e.g., multi-frequency) transmission modes, and realtime two-way communication between the surface and the toolstring.

Downhole EM telemetry systems of the type described herein may include an amplifier which drives at least two electrodes (defining a transmitter antenna) to generate an EM signal. The EM signal may be transmitted by way of low frequency electrostatic time-varying voltages and currents, (e.g., oscillating signals such as sinusoids). The EM signal is received on the surface by way of at least two receiving electrodes (refining a receiver antenna) configured to sense an EM quantity such as current or the potential difference created by the EM signal. One receiver electrode may be tied to something electrically connected to the drill string, and the other a stake driven in to the ground near (e.g., within a few hundred meters along the surface) from the drill string.

The EM signal is sensed and decoded by a surface receiver which is typically connected to a PC having interface and visualization (application layer) software. In some instances, the two electrodes are both distinct from the system ground and the amplifier output is a differential output having two terminals to drive the load. Also, in some instances, the electrode potential is bipolar in order to minimize the average potential difference between the two electrodes to reduce corrosion from the electrode surfaces.

Typical time-domain shapes of the EM signal include sinusoidal, quasi-sinusoidal, pulsed, or square.

Figure 1:
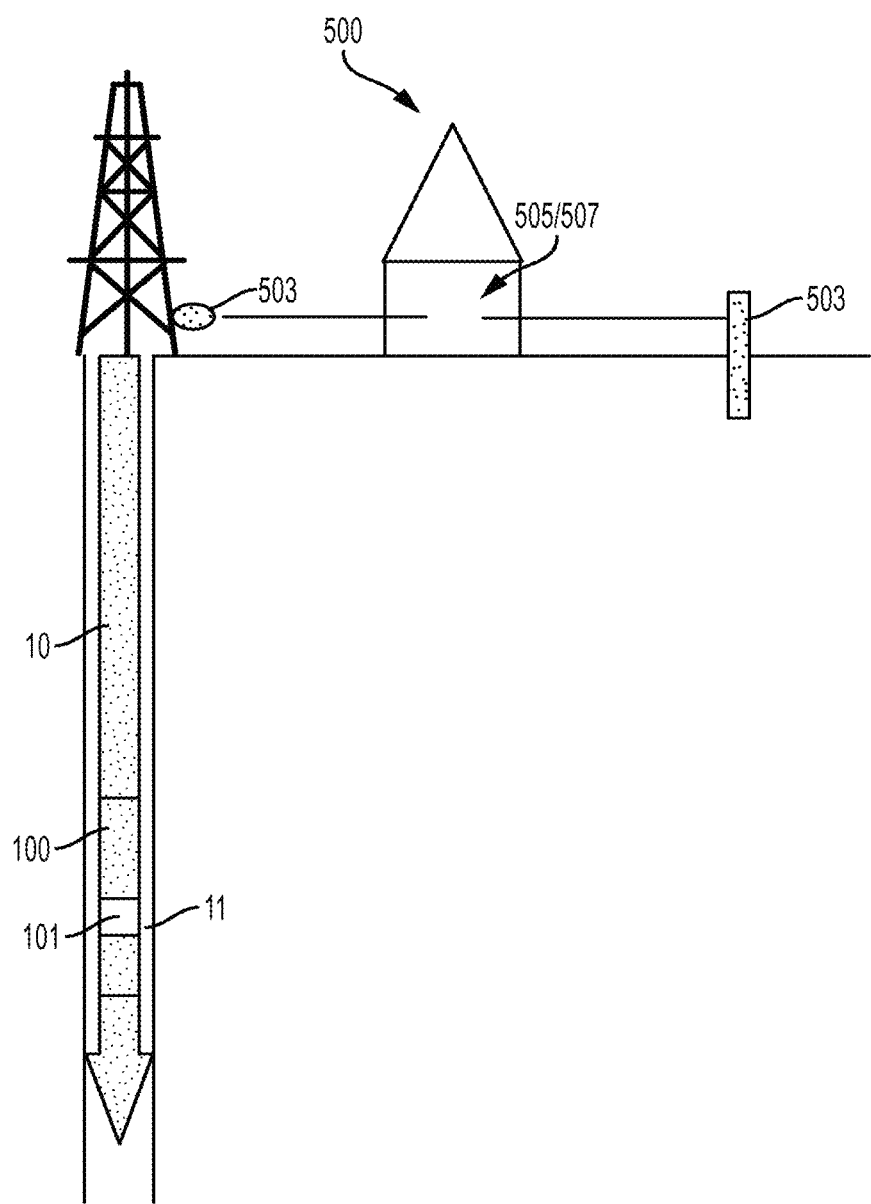
FIG. 1 shows a schematic of a drilling operation using an EM telemetry device of the type described herein.

Referring to FIG. 1, in some embodiments, the EM telemetry tool 100 is included in a toolstring 10 used in, e.g., a drilling operation. The EM telemetry tool is typically disposed in a pressure barrel either uphole or downhole of other system components (e.g., a power source). The tool 100 includes an antenna which is typically an assembly having a similar outer diameter as the rest of the tool string but with an insulating section (internal gap) 101 to create at least two distinct electrodes. The internal gap creates at least two electrodes formed by the tool string—one uphole of the internal gap and one downhole of the internal gap.

An "external" gap 11 is also typically present on the drill string 10 and is typically an insulating section similar to that in the internal gap antenna assembly. This external gap is part of what is called a gap sub—a subsection of drill pipe having the insulating gap. The gap sub creates at least two electrodes formed by the drill string—one uphole of the external gap and one downhole of the external gap.

In some cases, multiple gaps and more than two electrodes may be used. Multiple gaps may be useful for extending the length of the "effective" gap between two electrodes. Multiple electrodes may be used for transmitting multiple signals.

The antenna electrodes may be electrically coupled to the pressure barrel on either side of the internal gap. The downhole electrode may then be electrically coupled to the rest of the bottom hole assembly ("BHA") by way of mechanical connections between the tool string and the drill string. The uphole electrode may then be electrically coupled to the rest of the uphole side of the drill string by way of a mechanical connection between the tool string and the drill string. In some cases, the downhole mechanical connection comprises a support structure that already exists to support the tool string. In some cases, the uphole mechanical connection comprises a special assembly configured to "reach" up past the external gap and interface mechanically with the inner surface of the drill pipe uphole of the external gap.

In certain embodiments, the EM telemetry devices and systems disclosed herein comprise power converters, particularly high efficiency power converters, e.g., switched-mode power supplies. In some embodiments, the power converter is a switched-mode power converter, which may be regulated by feedback control. Examples of power converters include inductor-based converters, for example, buck, boost, buck-boost, boost-buck, Cuk, forward, flyback, or variants or the like as well as inductorless converters such as switched capacitor converters. The power converters disclosed herein are compatible with a combination of requirements of high power EM telemetry include high average power, high pulse (or peak) power, high temperature tolerance (i.e., up to about 200° C., 210° C., 250° C., or even 300° C.), and tolerance of other downhole conditions (e.g., shock, vibration, pressure, and rotational forces). The power converters disclosed herein meet these requirements while maintaining high overall operational efficiency levels, particularly efficiencies of at least 50%, at least 70%, at least 80%, at least 90%, or at least 95%.

The EM telemetry devices and systems disclosed herein may comprise high temperature rechargeable energy storage devices (HTRESDs), e.g., ultracapacitors, that operate over a range of environmental conditions found in a downhole environment. The HTRESDs disclosed herein operate at temperatures up to about 200° C., 210° C., 225° C., 250° C., and even higher temperatures may be attained under certain conditions. Additionally, the HTRESDs disclosed herein operate at temperatures at the other end of the temperature range encountered in the drilling environment, e.g., at temperatures down to about −40° C., and all temperatures in between these lower and upper temperature bounds, or any sub-range thereof.

The HTRESDs disclosed herein are capable of delivering instantaneous power to downhole instrumentation in these extreme environmental conditions. HTRESDs suitable for use with EM telemetry systems described herein are disclosed in PCT Publication Nos. WO2013/009720 published Jan. 17, 2013 and WO2013/126915 published Aug. 29, 2013, which are incorporated herein by reference in their entirety. In addition, suitable HTRESDs, as well as related power systems and manufacturing processes, are disclosed in US Patent Publication Nos. US2013/0026978, US2013/0029215, US2013/0045157, US2013/0044405, US2013/0271066, US2013/0143108, and US2013/0141840 (filing dates provided in Table 2 below); PCT Publication No. WO/2014/145259 published Sep. 18, 2014; International Patent No. PCT/US14/59971, filed Oct. 9, 2014; and U.S. Provisional Patent No. 62/081,694, filed Nov. 19, 2014, the entire contents of each of which are incorporated herein by reference.

Ultracapacitor based HTRESDs of the type described in the foregoing references may, for example, operate at temperatures as low as −40 degrees Celsius and high as 250 degrees Celsius (and in any sub-range therebetween) or more for 10,000 charge/discharge cycles and/or over 100 hours or more at a voltage of 0.5 V or more. In some embodiments the ultracapacitors provide this performance while exhibiting and increase in equivalent series resistance (ESR) of less than 100%, e.g. less than about 85% and a decrease in capacitance of less than about 10%. In some embodiments, such ultracapacitors may have a volumetric capacitance of about 5 Farad per liter (F/L), 6 F/L, 7 F/L, 8 F/L, 8 F/L, 10 F/L or more, e.g., in the range of about 1 to about 10 F/L or any sub-range thereof.

In some embodiments, ultracapacitors of the types described herein may exhibit any of: a high volumetric energy density (e.g., exceeding 0.25 Wh/L, 0.5 Wh/L, 1 Wh/L, 2 Wh/L, 3 Wh/L, 4 Wh/L, 5 Wh/L, 6 Wh/L, 7 Wh/L, 8 Wh/L, 9 Wh/L, 10 Wh/L, 11 Wh/L, 12 Wh/L, 15 Wh/L, 18 Wh/L, 20 Wh/L, or more), a high gravimetric energy density (e.g., exceeding 5 Wh/kg, 6 Wh/kg, 7 Wh/kg, 8 Wh/kg, 9 Wh/kg, 10 Wh/kg, 11 Wh/kg, 12 Wh/kg, 15 Wh/kg, 18 Wh/kg, or more), a high volumetric power density (e.g., exceeding 30 kW/L, 40 kW/L, 50 kW/L, 60 kW/L, 70 kW/L, 80 kW/L, 90 kW/L, 100 kW/L, 110 kW/L, 120 kW/L, or more), a high gravimetric power density (e.g., exceeding 30 kW/kg, 40 kW/kg, 50 kW/kg, 60 kW/kg, 70 kW/kg, 80 kW/kg, 90 kW/kg, 100 kW/kg, 110 kW/kg, 120 kW/kg or more), and combinations thereof. In some embodiments, ultracapacitors of the types described herein demonstrate high performance as indicated by the product of energy density and power density, e.g., exceeding 300 Wh-kW/L$^2$, 500 Wh-kW/L$^2$, 700 Wh-kW/L$^2$, or more.

For example, the ultracapacitors disclosed herein are capable of maintaining their performance over a long period of time, e.g., hundreds of thousands, or even millions of charge/discharge cycles. Table 1 below shows the performance of exemplary cells of the type described herein. For the purposes of Table 1, cell lifetime is defined as the number of cycles required before the cell exhibits a reduction in discharge energy of 5% or more or an increase in equivalent series resistance (ESR) of the cell of 25% or more.

TABLE 1

Exemplary Ultracapacitor Performance Data

| Cell ID | Cell Volume /cm^3 | Power Density (kW/L) | Energy Density (Wh/L) | Lifetime (Cycles) | Operating Voltage (V) |
|---|---|---|---|---|---|
| HP | 2 | 100 | 7.0 | >500k | 3.5 |
| HE | 2 | 35 | 11 | >500k | 3.5 |
| HE 350 | 350 | 35 | 18 | >500k | 3.5 |
| HP 350 | 350 | 110 | 7 | >500k | 3.5 |

As trade-offs may be made among various demands of the ultracapacitor (for example, voltage and temperature) performance ratings for the ultracapacitor may be managed (for example, a rate of increase for ESR, capacitance) may be adjusted to accommodate a particular need. Note that in reference to the foregoing, "performance ratings" is given a generally conventional definition, which is with regard to values for parameters describing conditions of operation.

Applicants have found that HTRES devices featuring ultracapacitors of the type described in the references incorporated herein may also be suitable for the extreme vibrations and mechanical shocks found in the downhole environments.

In some embodiments, the HTRES device is configured to operate in the presence of vibrations of up to maximum vibration rating for an operational period. In some embodiments the operational period is at least 100 hours, and the maximum vibration rating is at least 1 Grms, 2 Grms, 5 Grms, 10 Grms, 20 Grms, 30 Grms, 40 Grms, 50 Grms, 60 Grms, 70 Grms, 80 Grms, 90 Grms, 100 Grms, or more, e.g., in the range of 1 to 100 Grms or any sub-range thereof. In some embodiments the operational period is at least 500 hours, and the maximum vibration rating is at least 1 Grms, 2 Grms, 5 Grms, 10 Grms, 20 Grms, 30 Grms, 40 Grms, 50 Grms, 60 Grms, 70 Grms, 80 Grms, 90 Grms, 100 Grms, or more, e.g., in the range of 1 to 100 Grms or any sub-range thereof. In some embodiments the operational period is at least 1,000 hours, and the maximum vibration rating is at least 1 Grms, 2 Grms, 5 Grms, 10 Grms, 20 Grms, 30 Grms, 40 Grms, 50 Grms, 60 Grms, 70 Grms, 80 Grms, 90 Grms, 100 Grms, or more, e.g., in the range of 1 to 100 Grms or any sub-range thereof. In some embodiments the operational period is at least 5,000 hours, and the maximum vibration rating is at least 1 Grms, 2 Grms, 5 Grms, 10 Grms, 20 Grms, 30 Grms, 40 Grms, 50 Grms, 60 Grms, 70 Grms, 80 Grms, 90 Grms, 100 Grms, or more, e.g., in the range of 1 to 100 Grms or any sub-range thereof. Grms refers to the root mean square average acceleration of a repetitive vibration as a multiple of G, where G is the acceleration due to gravity at the Earth's surface.

In some embodiments, the HTRES device is configured to operate in the presence of shocks up to a maximum shock rating. In some embodiments, the shock rating may be at least 10 G, 20 G, 30 G, 50 G, 100 G, 200, G, 300 G, 400 G, 500 G, or more, e.g., in the range of 10 G to 1,000 G or any sub-range thereof.

In various embodiments, EM telemetry systems of the type described herein may be configured to have similar operational temperature, vibration, and shock ranges.

Additional embodiments of HTRESDs include, without limitation, chemical batteries, aluminum electrolytic capacitors, tantalum capacitors, ceramic and metal film capacitors, hybrid capacitors magnetic energy storage, for instance, air core or high temperature core material inductors. Other types of HTRESDs that may also be suitable include, for instance, mechanical energy storage devices, such as fly wheels, spring systems, spring-mass systems, mass systems, thermal capacity systems (for instance those based on high thermal capacity liquids or solids or phase change materials), hydraulic or pneumatic systems.

One example is the high temperature hybrid capacitor available from Evans Capacitor Company Providence, RI USA part number HC2D060122 DSCC10004-16 rated for 125° C. Another example is the high temperature tantalum capacitor available from Evans Capacitor Company Providence, RI USA part number HC2D050152HT rated to 200° C. Yet another example is an aluminum electrolytic capacitor available from EPCOS Munich, Germany part number B41691A8107Q7, which is rated to 150° C. Yet another example is the inductor available from Panasonic Tokyo, Japan part number ETQ-P5M470YFM rated for 150° C. Additional embodiments are available from Saft, Bagnolet, France (part number Li-ion VL 32600-125) operating up to 125° C. with 30 charge-discharge cycles, as well as a lithium-ion battery (experimental) operable up to about 250° C. Celsius, and in experimental phase with Solid Energy of Watertown, Massachusetts. In certain embodiments of the devices and systems disclosed herein, the HTRESD is a high temperature ultracapacitor. However, this is not limiting of technologies that may be included in the energy storage of the EM telemetry devices and systems disclosed herein.

Alternatively or additionally, the EM telemetry devices and systems disclosed herein may include one or more batteries, particularly downhole-compatible batteries, e.g., lithium thionyl chloride batteries. In other embodiments, e.g., where the batteries are used in conjunction with ultracapacitors capable of providing pulsed high peak power output, the batteries may be relatively low rated batteries (e.g., with relatively low power, voltage, and/or current ratings). In some such embodiments, the batteries may be substantially free of lithium. The batteries may be arranged in a serial or parallel fashion in the EM telemetry devices and systems disclosed herein. The batteries may be arranged in parallel to increase the current available to the EM telemetry devices and systems, but they may also be arranged in series to increase the voltage available to the EM telemetry devices and systems.

In certain embodiments, the EM telemetry devices and systems disclosed herein may include any suitable power electronics including, e.g., power converters serving various power management roles, e.g., as described in PCT Publication No. WO/2014/145259 published Sep. 18, 2014. For example, the EM telemetry devices and systems disclosed herein may comprise an ultracapacitor charging circuit (UCC), crossover (XO) circuit, state of charge (SoC) circuit, ultracapacitor management (UMS) circuit, electronics management circuit, and any other suitable components.

Ultracapacitor Charger Circuit (UCC)

In certain embodiments, the EM telemetry devices and systems disclosed herein comprises a power converter. In further embodiments, the power converter is a UCC circuit for charging an energy storage device that includes one or more ultracapacitors. The UCC circuit features high temperature operation, e.g., greater than 75 degrees Celsius, e.g., greater than 125 degrees Celsius, e.g., 150 degrees Celsius or more, adjustable charge current control, redundant over voltage protection for the capacitor bank, and a wide input/output voltage range. In certain embodiments, the controller IC uses current mode regulation to mitigate the effect of the art-known right half plane (RHP) zero on output voltage during load transients. In this respect, the UCC circuit of the present disclosure provides an optimal range of operation whereby the converter is charging at a calibrated duty cycle to minimize overall losses, e.g., wherein the bus voltage is optimized.

In certain embodiments, the UCC circuit uses switch mode power conversion, wherein at low ultracapacitor charge, the IC uses the more efficient, i.e., less lossy, current mode control, and subsequently switches to voltage control mode at greater levels of ultracapacitor charge storage where such switching would result in more efficient charging of the ultracapacitor.

In certain embodiments, the EM telemetry devices and systems disclosed herein afford input current shaping, e.g., in applications where continuous and steady current draw from the energy source is desirable or a particular pulsed profile is best. In particular embodiments, such current shaping prevents undesirable electrochemical effects in batteries such as cathode freezeover effects or passivation effects.

In certain embodiments, the EM telemetry devices and systems disclosed herein affords input current smoothing, e.g., in applications where continuous and steady current draw from the energy source is desirable. In particular embodiments, such current smoothing reduces conduction losses in series resistances.

In certain embodiments, wherein the UCC circuit is operating in constant voltage mode, the UCC is capable of supplying a constant voltage in the event of a capacitor string disconnection. For example, the UCC can continue to source power into the load at a lower level.

In one embodiment, the UCC controller is implemented digitally. The advantages of such a system include component reduction and programmability. In certain embodiments, the control of the switch network is performed by a microcontroller/microprocessor.

In one embodiment, adjustable current may be established digitally with a Pulse Width Modulated (PWM) control signal created by a supervisor and a low pass filter to produce an analog voltage that the controller IC interprets as the controller IC does not communicate digitally. The controller IC is configured to regulate output current, e.g., the ultracapacitor charge current. Through control of the charge current, the UCC circuit is capable of regulating the voltage on the ultracapacitors, e.g., by hysteretic control wherein the voltage is kept within a voltage band by on-off control of the IC.

The UCC circuit, in certain embodiments, may be digitally controlled. In further embodiments, the UCC circuit is digitally controlled by the electronics management system (EMS), e.g., as detailed below. In further embodiments, the UCC circuit can enter sleep mode to conserve energy and this aspect may be provided for by a digital control.

The UCC controller can also be implemented in an analog fashion. In such a configuration, the feedback control would generally be carried out with the use of components such as operational amplifiers, resistors, and capacitors.

In certain embodiments, the controller integrated circuit (IC) at the center of the Ultracapacitor Charger (UCC) is electrically connected by modular bus stackers to and programmed to communicate with the junction circuit, the EMS circuit, cross over circuit, and/or one or more energy sources (such as battery, generator, or wireline). The UCC circuit may also comprise a resistor network for voltage sampling, a step down power section (e.g., a Buck converter), a step up power section (e.g., a boost converter), an inductor current sense resistor required for current mode control, and/or a charge current sense resistor required for regulating the charge current.

In certain embodiments, a power converter for charging an ultracapacitor is controlled hysteretically. For example, a charging current is regulated by the converter and a feedback control circuit. A voltage of an ultracapacitor is measured by the power converter or a supervisor or the like. The power converter may be disabled for instance when a voltage on an ultracapacitor reaches a certain threshold. Alternatively, the charging current may be reduced when the voltage reaches a certain threshold. In this way, various benefits may be realized. First, a voltage set point and hysteresis band may be set in firmware or software, i.e. digitally, without a redesign of feedback control circuitry, e.g. redesign that may otherwise be required for stability and dynamics. Thus, the output voltage is easily adjusted by a user or by a controller, e.g. in run-time. Second, whereas an efficiency of charging an ultracapacitor will generally be improved by limiting or regulating a charging current, and many loads expect a voltage within a range to operate properly, a controller having a feedback control for regulating a charging current may be used to provide for a voltage chosen to fall within a range to operate a load properly.

In certain embodiments, the UCC circuit regulates the power provided to the ultracapacitor during charging. In some embodiments, power regulation may be preferable to current regulation, e.g., in cases where it is desirable to increase or maximize charging speed. Power regulation may be achieved with a current-regulated power converter architecture by way of an outer feedback loop (whereas the inner feedback loop is that which regulates the current of the converter). The outer feedback loop may regulate the power. For instance, the system may measure its own output voltage and multiply the measured value by the commanded current. The result is a power and the power actually delivered can be subsequently adjusted up or down by adjusting the commanded current up or down. The process may repeat indefinitely so that the actual power delivered to the formation tracks a commanded power set point.

A similar situation exists in the case of voltage regulated power converter. The current output from the system may be measured and multiplied by the commanded voltage. The power may then be adjusted by adjusting the voltage command. The power control loop may be "slow" meaning it is slower than the inner current or voltage control loops.

Cross Over (XO) Circuit

In certain embodiments, the cross over circuit is a peripheral circuit board that can seamlessly be added into the modular architecture through stackers electrically connected and controlled by the junction circuit board to enable the use of multiple power sources. Along with the UCC circuit, the cross over circuit possesses autonomous capability.

In one embodiment, the cross over circuit can be preprogrammed to switch from one power source to another after the initial source has been depleted.

In another embodiment, the cross over circuit has the ability to parallel two sources together and to either increase the power capable of being delivered to the load, or to extract the very last remaining energy of the individual power sources where the individual, nearly depleted sources could not deliver enough power to drive the load alone.

The cross over circuit, in certain embodiments, may be digitally controlled by the electronics management system (EMS) and can enter sleep mode to conserve energy. The cross over circuit may comprise a supervisor, and in certain embodiments is electrically connected by the modular bus stackers to, and programmed to communicate with: the junction circuit, the EMS circuit, state-of-charge circuit, and/or one or more energy sources (such as battery, generator, or ultracapacitor string) through the supervisor of the circuit. The cross over circuit may also comprise a current sense resistor; a resistor network for voltage sampling; a current sense resistor for state-of-charge measurements; a unidirectional primary disconnect that allows the BUS voltage to be bootstrapped to the primary source, where power is initially processed through a low forward voltage diode in parallel with the p-channel MOSFET to reduce dissipation during the bootstrapping operation and once voltage is established on the bus, the primary disconnect may be turned on (the p-channel MOSFET is enhanced) by a resistor-diode network and re-channel MOSFET; a bidirectional secondary disconnect that processes power from the secondary source to the BUS, where the secondary disconnect, unlike the primary disconnect, can fully disconnect the secondary source from the BUS; a resistor-diode network for biasing the gate of the p-channel MOSFET, sized to allow for low voltage disconnect operation (resistor divider) and high voltage disconnect operation (diode clamps the gate voltage to a safe operating voltage); and/or a bleed resistor to ensure the n-channel MOSFET is turned off in the absence of a control signal.

State of Charge (SoC) Circuit

In certain embodiments, the SoC circuit serves to provide for an estimate of the remaining and/or used capacity of a given energy source. This circuit can combine measured current, temperature, the time domain shape of the current profile, and can produce a model to determine the remaining runtime for a given energy source.

Measurement of current is an important factor in determining the service time of an energy source, in particular, a battery. As such, in certain embodiments, current may be measured using an off-the-shelf IC that serves as a transconductance amplifier. In certain embodiments, current may be measured using Hall Effect sensors/magnetometers, inductive sensors, magnetic sensors, or high-side or low side current sense resistors Temperature may be measured using a resistance temperature detector (RTD), a resistor with a large temperature coefficient, (temperature dependent resistance). The resistance is read through the use of a resistor divider tied to the output pin of a microcontroller. The resistor divider is pulled up to 5V when a measurement is to be taken. Turning the resistor divider on and off saves power and reduces self-heating in the resistance. Other methods of measuring temperature include use of bi-metallic junctions, i.e. thermocouples, or other devices having a known temperature coefficient transistor based circuits, or infrared detection devices.

These measurements can be used as inputs to a given model describing the behavior of a given energy source over time. For instance, great variations in battery current have been shown to reduce the rated capacity of a Li-SOCL2 battery. For this battery chemistry, knowledge of the current profile would be useful in determining the remaining capacity of the battery.

The state of charge circuit may comprise a supervisor, and in certain embodiments is electrically connected by the modular bus stackers to, and programmed to communicate with: the junction circuit, the EMS circuit, the cross over circuit, and/or one or more energy sources (such as battery or ultracapacitor string) through the supervisor of the circuit. The state of charge circuit may also comprise an external comm bus implemented with pull up resistors; a voltage regulator used to establish an appropriate voltage for the supervisor and other digital electronics; a current sense circuit; unidirectional load disconnect, wherein a p-channel MOSFET is enhanced via a control signal to the pulldown n-channel MOSFET and a resistor divider ratio is chosen to allow proper biasing of the p-channel MOSFET at low voltage levels, while the Zener diode serves to clamp the maximum source-gate voltage across the MOSFET; and/or resistor divider networks and ADC buffer cap necessary for analog voltage reading Ultracapacitor Management System (UMS) Circuit In certain embodiments, the EM telemetry devices and systems disclosed herein comprises an ultracapacitor management system (UMS) circuit. The ultracapacitor management system circuit has the primary purpose of maintaining individual cell health throughout operation. The UMS circuit may measure individual cell voltages or voltages of a subset of cells within a string and their charge/discharge rates. The UMS circuit supervisor uses these parameters in order to determine cell health which may be communicated to the electronics management system (EMS) circuit to be included in optimization algorithms and data logs.

Additionally, in certain embodiments, the UMS circuit is responsible for cell balancing and bypassing. Cell balancing prevents ultracapacitors from becoming overcharged and damaged during operation. Cell bypassing diverts charge and discharge current around an individual cell. Cell bypassing is therefore used to preserve efficient operation in the event that a cell is severely damaged or exhibiting unusually high equivalent series resistance (ESR).

The UMS circuit is capable of determining individual cell health through frequent cell voltage measurements and communication of the charge current with the EMS. The cell health information may be relayed to the EMS circuit over the modular communication bus, e.g., through the modular bus stackers. The cell health information can then be used by the EMS circuit to alter system behavior. For example, consider that the EMS circuit is supporting high output power to a load by regulating to a high output capacitor voltage. If however, the UMS circuit reports that one or multiple ultracapacitors are damaged, the EMS can choose to regulate to a lower output capacitor voltage. The lower output voltage reduces output power capabilities but helps preserve ultracapacitor health. As such, in one embodiment, the UMS circuit offers a convenient method to independently control cell voltage levels while monitoring individual and ultracapacitor string cell health.

In certain embodiments, the supervisor of the UMS circuit may communicate to the UMS core via an internal circuit communication bus. In this example, data and command signals are transferred over the internal communication bus. The supervisor controls the UMS core to measure each cell voltage. Depending on the state of charge, the supervisor commands the UMS core to balance each cell. In particular embodiments, the balance time and frequency is controlled via the supervisor to optimize cell health and to minimize heat increases that may arise during balancing. Cell health may be monitored by the supervisor and communicated by the supervisor to the EMS circuit via the modular bus. Additionally, in certain embodiments, through the use of external devices, e.g. MOSFETs, the supervisor can decide to bypass a given cell.

The UMS Core has circuitry that enables measuring the voltage of individual cells. Additionally, the UMS core is capable of removing charge from individual cells to reduce the cell voltage. In one embodiment, the UMS core balances individual cells by dissipating the excess energy through a passive component, such as a resistance. In another embodiment, charge can be removed from one cell with high voltage and transferred to another cell with low voltage. The transfer of charge can be accomplished through the use of external capacitors or inductors to store and release excess charge.

In certain embodiments, since cell balancing and monitoring does not have to occur continuously, i.e., at all times, the UMS circuit may enter a low power sleep state. For instance, an EMS circuit may control the UMS circuit via the modular communication bus so that: (1) when not in use, the UMS circuit can go to a low power consumption mode of operation and (2) when called upon, the EMS circuit can initiate cell monitoring and balancing via the UMS supervisor.

In certain embodiments, the modular bus enables bi-directional communication between the UMS circuit supervisor, EMS circuit, and other supervisor nodes on the communication bus. Power to the UMS circuit supervisor may also be provided through the modular bus.

In certain applications, balancing circuitry may automatically balance a cell when the cell voltage exceeds a set voltage. This behavior affords the capability to perform real-time adjustments to the ultracapacitor string voltage. An UMS circuit may be configured to communicate on the modular bus thereby enabling real-time updates to cell balancing behavior. In addition, communication on the modular bus enables data to be stored external to the UMS circuitry. This modularity enables the UMS circuit to have a wide range of applications.

In certain embodiments, the supervisor and modular bus allow for changes in the ultracapacitors and system requirements, such as logging resolution and lifetime, without requiring extensive revisions to UMS circuitry.

In certain embodiments, the cell health information can be stored locally on the UMS circuit or stored by the EMS after transmission over the modular bus. The cell information can be useful in determining whether a bank of ultracapacitors needs to be replaced after usage or whether service is required on individual cells.

In certain embodiments, when a cell experiences a high voltage, the UMS circuit is capable of discharging that cell to a lower voltage. By discharging the cell to a lower voltage, cell lifetime is improved. Maintaining balanced cell voltage over the entire string improves optimizes lifetime of the capacitor string.

In certain cases, discharging a cell produces excess heat that can damage surrounding electronics. Furthermore, it is often advantageous to control the discharge current from a cell in order to prevent damage to the cell or excess thermal losses. As such, in certain embodiments, the UMS circuit is capable of controlling the discharge current profile, by distributing discharge currents across a widely separated circuit area, enabling improved thermal management and cell health. For example, heat caused by a discharging event is often localized to a section of the UMS circuit. If multiple cells need to be balanced, it is advantageous in order to reduce temperature increases not to balance cells that would cause temperature increases in adjacent location on the UMS circuit. Therefore, the UMS circuit manages temperature increases by selecting which cells to balance based on their spatial location on the UMS circuit. These features may be managed by a supervisor and additionally may be managed by an EMS and/or a combination of the above.

In certain embodiments, the UMS circuit also manages temperature increases during balances by controlling the time of discharge. For example, instead of constantly discharging an ultracapacitor until the desired cell voltage is met, the supervisor chooses to start and stop charging periodically. By increasing the duty cycle between discharge events, temperature increases caused by cell discharge current can be mitigated.

In certain embodiments, a damaged cell may exhibit a decreased capacitance compared to surrounding cells. In this case, the cell will exhibit higher charge and discharge rates. Normal balancing operations will mitigate any damage to the cell in this case. Similarly, in certain embodiments, a cell may exhibit increased leakage current, causing a constantly dropping cell voltage. A decreased voltage on a cell will require other cells to maintain a higher average voltage. Again, normal balancing operations will mitigate damage to cells in this case.

In certain embodiments, a cell may be damaged to the point where it exhibits very high ESR, degrading the power handling of the entire capacitor string. In these cases, typical balancing operations will not fix the problem. At this juncture, the UMS circuit can choose to bypass any given cell. Cell bypassing may be achieved via nonlinear devices such as external diodes that bypass charge and discharge current, such that every other cell must store a higher average voltage. However, power handling capability of string is maintained. In certain embodiments, where there are multiple batteries and/or ultracapacitors connected in series or parallel series, it is important to both monitor and balance the state of charge of individual cells. The UMS circuit comprises of necessary circuitry to monitor and balance a string of ultracapacitors while including additional functionality to improve efficiency, system health, and thermal management.

The UMS circuit in certain embodiments comprises a supervisor, is electrically connected by the modular bus stackers to, and programmed to communicate with: the junction circuit, the EMS circuit, the state of charge circuit, the cross over circuit, or other circuits in the EM telemetry devices and systems disclosed herein, and/or one or more energy sources (such as a battery, wireline or generator). The UMS circuit may also comprise an integrated circuit (IC) or controller for performing the functions of the UMS, switch devices such as transistors or diodes, and various ancillary components. The IC may be selected from off-the-shelf monolithic control IC's.

Electronics Management System (EMS) Circuit

In certain embodiments, the EM telemetry devices and systems disclosed herein comprise an EMS circuit. The EMS circuit is a multifunctional device capable of one or more of the following: collecting and logging data of system performance and environment conditions; managing other circuits; and communicating to external systems for programming and data transmission.

In certain embodiments, the EMS circuit hardware is tightly integrated with surrounding hardware, enabling the control and monitoring of total system behavior. The hardware may be complemented by intelligent firmware that manages the operation of several other microcontrollers, using external sensors and communication between the microprocessors to intelligently optimize system performance. The effect is an extremely versatile and capable system, one that can adapt in real-time to changes in the environment and requirements.

In certain embodiments, the EMS circuit collects and logs data of system performance and environmental conditions. The EMS circuit, e.g., via the EMS circuit supervisor, is responsible for recording sensor data directly from external sensors and through communication over the modular bus from other circuits. This data may be used to evaluate system performance for optimization. In general, significant events may also be logged for later evaluation.

In certain embodiments, the EMS circuit manages surrounding circuits for optimal system performance. For example, the EMS circuit may control the UCC circuit charging current. The charging current may be selected based on the data collected throughout the system through sensors and communication with the circuits. The EMS circuit can also put various circuit components into a low power sleep state to conserve power when possible.

In certain embodiments, the EMS circuit communicates to external systems for programming and/or data transmission. The external communication bus on the EMS circuit enables communication to outside hardware and software. This connection enables the EMS circuit to be reprogrammed while disposed in the system. The EMS can then reprogram other supervisors or direct other supervisors on their operation, effectively reprogramming the entire system. The external communication bus is also used to transmit data logs from internal memory to external software. In this way, data can be collected during operation and analyzed post-operation by external equipment, e.g., an external PC.

In one embodiment, the Electronics Management System (EMS) circuit serves to collect information from available supervisors and sensors and dependently control system behavior. The EMS also provides an interface to external electronics, such as PC software or firmware programmers. Through the external communication bus, it is possible to program the EMS circuit core, e.g., the EMS circuit supervisor, and consequently all other supervisors connected to the EMS circuit.

The EMS circuit core may be comprised of one or more digital circuits, e.g., microcontrollers, microprocessor, or field-programmable gate array (FPGA) units. In certain embodiments, the EMS circuit core is connected to a load connect/disconnect circuit that allows the ultracapacitor string to be connected or disconnected to an external load. The capacitor string may be disconnected from the load if, for example, the capacitor string voltage is too low or too high for the particular load. During normal run-time operation, the load is connected to the ultracapacitors through a load driver circuit.

In certain embodiments, the EMS circuit is connected to additional sensors that are not interfaced to other supervisors. These sensors may include one or more of the group consisting of a temperature sensor, a load current sensor, an input battery current sensor, an input voltage sensor, and a capacitor string voltage sensor.

Through the modular bus, the EMS circuit may be connected to other circuits. The communication bus may comprise data line, a clock line, and an enable line. In some embodiments, supervisors interface to the data, clock, and enable lines. Furthermore, each supervisor can be prescribed an identification address.

In one embodiment, to communicate over the internal communication bus, the EMS circuit activates the enable line and sends over the data and clock lines the identification address of the target supervisor followed by the desired data command instructions. When the supervisors see the enable line activated, each supervisor will listen for its prescribed identification address. If a supervisor reads its identification address, it will continue to listen to the EMS circuit message and respond accordingly.

In this way, communication is achieved between the EMS circuit supervisor and all other supervisors. In certain embodiments, the EMS circuit interfaces with the UCC circuit and controls the UCC circuit charge current. The charge current is controlled to regulate the output ultracapacitor voltage.

Feedback control and/or heuristic techniques are used to ensure safe and efficient operation of the electronics, ultracapacitors, and input battery stack. In certain embodiments, the EMS circuit interfaces with the cross over circuit to record and potentially control the battery connection state. The state of the cross over circuit and crossover events may be logged via the EMS and internal/external memory. In certain embodiments, the EMS circuit interfaces with the UMS circuit in order to monitor and log cell health and/or discharge events.

In certain embodiments, the EMS circuit is capable of bringing supervisors into a low power state to decrease power consumption and optimize run-time behavior. As described herein, the EMS circuit has a unique hardware structure that allows communication to and from a large variety of sensors, lending itself to a variety of advantages that generally serve to optimize one or more performance parameters, e.g., efficiency, power output, battery lifetime, or capacitor lifetime.

The EMS circuit in certain embodiments comprises a supervisor, is electrically connected by the modular bus stackers, and programmed to communicate with: the junction circuit, the UMS circuit, the state of charge circuit, the cross over circuit, and/or one or more energy sources (such as battery or ultracapacitor string) through the supervisor of the circuit.

The EMS circuit may also comprise at least one digital controller, e.g. a microcontroller, a microprocessor, or an FPGA, and various ancillary components.

Load Driver Circuit

In certain embodiments, the EM telemetry devices and systems disclosed herein may comprise a load driver circuit, e.g., an EM telemetry circuit.

The load driver circuit, in certain embodiments, acts as a power converter that may provide an aspect of regulation, for instance voltage regulation of the output of an EM telemetry device or system despite another widely varying voltage aspect. For example, when a power source is intermittent, e.g. it provides power for several minutes and then ceases to provide power for several minutes, an EM telemetry device or system disclosed herein may be required to provide power to a load, e.g., an antenna, when the power source is not providing power. In this example, an HTRESD may provide the stored energy for the supply of power during the period when the power source is not providing power. If the HTRESD is a capacitor, for instance an ultracapacitor, a limited energy capacity of said HTRESD may lead to a widely varying voltage of said HTRESD during a period when the EM telemetry devices or systems are transmitting data, i.e., providing power to an antenna, but the power source is not providing power. A load driver circuit, e.g., an EM telemetry circuit, may be employed in this example to provide for a regulated load voltage despite the widely varying HTRESD voltage. The load driver circuit may function as a power converter so that it processes the power drawn from said HTRESD and delivered to said load and so that it also incorporates said regulation aspects, i.e., a regulated power converter, in this example, an output voltage regulated power converter. Generally, a regulation aspect is enabled by feedback regulation techniques, e.g., of the type described herein.

In certain embodiments, the controller integrated circuit (IC) at the center of the load driver circuit, e.g., an EM telemetry circuit, is electrically connected by modular bus stackers to and programmed to communicate with the remainder of the EM telemetry devices and systems disclosed herein. For example, in certain embodiments, the remainder of the EM telemetry devices and systems disclosed herein may comprise various circuits. Non-limiting examples include a junction circuit, at least one sensor circuit, an ultracapacitor charger circuit, an ultracapacitor management system circuit, a changeover circuit, a state of charge circuit, and an electronic management system circuit.

In certain embodiments, the EM telemetry devices and systems disclosed herein further comprises modular circuit boards. In further embodiments the modular circuit boards are circular. In further embodiments, the modular circuit boards are stacked. In further embodiments, the modular circuit boards are circular and stacked.

In certain embodiments, the power source comprises at least one of a wireline power source, a battery, or a generator.

In certain embodiments, the power source comprises at least one battery. In this embodiment, the EM telemetry devices and systems disclosed herein may further comprise a cross over circuit, particularly when the power source comprises more than battery. In particular embodiments, the EM telemetry devices and systems disclosed herein further comprises a state of charge circuit board.

In certain embodiments, the power source comprises a wireline, and at least one battery, e.g., a backup battery. In those embodiments, the EM telemetry devices and systems disclosed herein may further comprise a cross over circuit. In particular embodiments, the EM telemetry devices and systems disclosed herein further comprises a state of charge circuit.

In certain embodiments, the power source comprises a generator.

In certain embodiments, the power source comprises a generator, and at least one battery, e.g., a backup battery. In this embodiment, the EM telemetry devices and systems disclosed herein may further comprise a cross over circuit. In particular embodiments, the EM telemetry devices and systems disclosed herein further comprises a state of charge circuit.

In certain embodiments, the circuit boards may be combined to provide multifunctional circuit boards.

The load driver circuit features high temperature operation, e.g., greater than 75 degrees Celsius e.g., greater than 125 degrees Celsius, e.g., 150 degrees Celsius or more, and may comprise any of an adjustable charge current control, redundant over voltage protection for the capacitor bank, and a wide input/output voltage range, and voltage mode regulation.

In certain embodiments, the load driver charges a capacitor, e.g. an ultracapacitor. In these embodiments, an adjustable current may be established digitally with a Pulse Width Modulated (PWM) control signal created by a supervisor and a low pass filter to produce an analog voltage that the controller IC interprets as the controller IC does not communicate digitally. The controller IC is configured to regulate output current, e.g., the ultracapacitor charge current. Through control of the charge current, the UCC circuit is capable of regulating the voltage on the ultracapacitors, e.g. by hysteretic control wherein the voltage is kept within a voltage band by on-off control of the IC.

The load driver circuit, in certain embodiments, may be digitally controlled. In further embodiments, the load driver circuit is digitally controlled by the electronics management system (EMS). In further embodiments, the load driver circuit can enter sleep mode to conserve energy and this aspect may be provided for by a digital control.

The load driver controller can also be implemented in an analog fashion. In such a configuration, the feedback control would generally be carried out with the use of components such as operational amplifiers, resistors, and capacitors. While effective, a minor disadvantage of this configuration is the inherent lack of flexibility controlling charge current and output voltage.

In certain embodiments, the controller integrated circuit (IC) at the center of the load driver circuit is electrically connected by modular bus stackers to and programmed to communicate with the junction circuit, the EMS circuit, cross over circuit, and/or one or more energy sources (such as battery, generator, or wireline). The load driver circuit may also comprise a resistor network for voltage sampling, a step down power section (e.g., a Buck converter), a step up power section (e.g., a boost converter), an inductor current sense resistor required for current mode control, and/or a charge current sense resistor required for regulating the charge current.

In one embodiment, the load driver circuit controller is implemented digitally. The advantages of such a system include component reduction and programmability. In certain embodiments, the control of the switch network is performed by a microcontroller/microprocessor.

Amplifier Circuit

Processing of high power levels often requires very efficient power electronics. Inefficiencies in power electronics result in temperature increases that can damage electronics and ultracapacitors. Therefore, in order to process significant power, high efficiency power electronics are often required. The class D topology, is art-recognized, as designed for high efficiency operation. High efficiency is achieved by running the output transistors in either a fully enhanced or off state. When fully enhanced, the MOSFETs can ideally be considered a short with no internal resistance. In this state, there is high current but no voltage drop over the output transistors, resulting in no power loss. In their off state, the MOSFETs ideally block all current at high voltage, resulting in no power loss. In present embodiment, the MOSFETs are not considered ideal switches, but rather power losses are mitigated through properly chosen switching frequencies and low loss components. The above essentially describes the basic concepts associated with art-recognized switch-mode operation. When switched-mode operation is applied to amplifiers, those amplifiers are often termed class-D amplifiers. Switched mode power supplies of the present EM telemetry devices and systems have a high operating efficiency, e.g., at least 50%, at least 70%, or at least 90%.

In certain embodiments, a class D Amplifier enables significantly higher power capabilities when compared to existing solutions. In a particular embodiment, the amplifier comprises six main components connected in a Class D full bridge switching amplifier configuration, i.e., also together referred to as a Class D amplifier: (1) High voltage capacitor rail; (2) Modulator; (3) device drivers; (4) Switching Section; (5) Signal low pass filters; and (6) Load impedance.

High Voltage Capacitor Rail

The high voltage capacitor rail supplies a positive rail voltage to the output transistors. In order to deliver significant power to the load, it is important that the high voltage capacitor rail maintain low impedance, minimizing power losses under heavy loads.

Modulator

The modulator has the function of modulating the signal provided to the load, e.g., to encode telemetry data onto the signal. The modulator may function in a number of ways. The modulator may modulate a number of quantities, e.g. power, voltage, current, frequency, phase, pulse width, pulse position, pulse amplitude, and combinations thereof.

An example open-loop method for modulating amplitude of the voltage presented to the load includes providing a time-varying analog signal as a time-varying reference input to a pulse-width modulator circuit, e.g., a comparator having two inputs, one being said reference, the other being a triangle wave signal oscillating at the desired switching stage switching frequency, the pulse-width modulator circuit providing the pulse width modulated gate driver control signal. By time-varying the reference voltage input to the pulse width modulator circuit, the duty ratio of the gate driver control signal is also varied, the duty cycle of said control signal in turn may control the instantaneous voltage presented to the load.

An example closed-loop method for modulating amplitude of the voltage presented to the load includes providing a time-varying analog signal as a time-varying reference input to a feedback control circuit, the feedback control circuit configured to regulate the voltage presented to the load by various methods known in the art. Generally, the feedback circuit comprises measurement aspects of feedback signals, an error amplifier, a dynamic compensator, a pulse width modulator, a gate driver, which may comprise a dead-time circuit. The dynamic compensator is generally designed to achieve a combination of closed-loop stability and closed-loop dynamics.

In various embodiments, the modulator may be configured to implement any suitable encoding or data transmission schemes known in the art. Applicants have realized that statistics based encoding schemes are particularly suitable for use in noise environments found in typical drilling operations. For example, in various embodiments, various pieces of data intended to be transmitted are associated with random or pseudorandom sequences of numbers. To transmit a given piece of data, a signal modulated with the associated random signal as transmitted from the downhole transmitter. A topside receiver receives the transmission, combined with possible noise. The receiver uses statistical techniques (e.g., a least squares technique) to determine which of the random or pseudorandom sequences is most likely to correspond to the received signal. This "most likely" sequence is then used to determine the transmitted data. Such techniques are particularly suited for detecting the transmitted signal in the presence of non-random noise, e.g., mains noise, noise associated with drilling motors, generators, or other electrical components common in drilling operations.

A variety of such statistics based techniques known from the field of telecommunication may be used, e.g., linear prediction techniques such as code-excited linear prediction, vector sum excited linear prediction, algebraic code excited linear prediction, time division multiple access (e.g., of the type used in cellular communication standards such as GSM), code division multiple access, frequency division multiple access, orthogonal frequency division multiple assess, spread spectrum, frequency hoping spectrum, and the like.

Device Drivers

The device drivers generally provide current or voltage amplification, voltage level shifting, device protection and in some cases signal dead time generation in order to properly drive the transistor inputs. Generally device drivers convert a low level control signal to a signal appropriate for controlling a device. Example devices include bipolar junction transistors, MOSFETs, JFETs, Super junction transistors or MOSFETs, silicon-controlled rectifiers, insulated gate bipolar transistors and the like. Gate drivers may be provided as discrete implementations or as off-the-shelf or monolithic integrated circuits.

Switching Section

The switching section comprising generally comprises output transistors switches processes input power to provide a transformed power to the load. An example switching section is configured in a full bridge configuration such that the of the transistors are on at any given lime. In one state, two transistors are on, providing a current flow through the load in one direction. In the other state, the other two transistors are on, providing a current flow through the load in the opposite direction.

Filtering

Each of the transistors are switched at a frequency well above the bandwidth of the reference signal. In order to accurately recreate an amplified version of the reference signal over the load, low pass filters are used to filter out the high frequency switching signal, ideally leaving only the low frequency reference signal transmitted through the load. The low pass filters are reactive components to prevent losses that would other occur over resistance components. Filtering between the switching section and the load should pass the frequency content desired in the modulated signal to the load. Meanwhile, the filtering may be band-limited enough to reject unwanted frequency content.

Load

In present invention, the load impedance represents the medium over which the telemetry signal is being transmitted. Load impedances commonly contain high order behavior that determines how the signal will propagate through space. Simple models, however, are represented by a power resistor.

Figure 2:
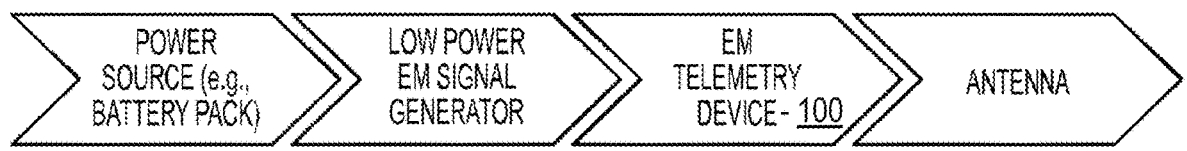
FIG. 2 shows a schematic of a system featuring an EM telemetry device.

While switching amplifiers may introduce switching artifacts in the output signal, in certain embodiments, these artifacts are minimized through the use of properly selected switching frequencies, and/or well-designed filtering. In a particular embodiment, the output filter preserves signal integrity by severely attenuating switching artifacts while preserving the information contained in the reference signal. The output filter may also contribute minimal power loss through having very low resistance components Exemplary EM Telemetry Devices and Systems FIG. 2 depicts certain exemplary embodiments of the EM telemetry devices and systems disclosed herein. Specifically, in certain embodiments, the EM telemetry system 100 includes a downhole power source (e.g., a battery pack) electrically connected to a relatively lower power EM signal generator and an EM telemetry device, as disclosed herein. In some embodiments, the EM telemetry device (e.g., including an HTRESD of the type described herein capable of high pulsed power output) may output a higher power EM signal than the lower power EM signal generator. In some embodiments, the EM telemetry device may be an "after market" device designed to be added to an existing EM telemetry system to provide increased performance, such as boosted output signal power.

The EM signal generator draws power from the battery and receives data signals from various downhole instruments (e.g., a directional sensor, a nuclear magnetic resonance tool, a coring tool, a sonic tool, a neutron density tool, a gamma detector tool, a seismic measurement tool, a telemetry tool, a resistivity tool, and/or a formation tester). The EM signal generator provides, e.g., a sinusoidal signal that is input to the EM telemetry device. The EM telemetry device amplifies the low power EM signal and transmits a high power (e.g., >50 W, >100 W, >150 W, >200 W. >500 W, >1000 W, >1250, >1500, >1750, >2000 W, or more, e.g., in the range of 20 W to 2000 W or any subrange thereof) EM signal to the antenna. The high power EM signal is thus transmitted to the surface, overcoming the limitations of conventional relatively low power EM telemetry tools.

Note that in some embodiments, the low power EM signal generator may be omitted, and the EM telemetry device may interface directly with the data signals from various downhole instruments to generate an outgoing telemetry signal.

The components of the EM telemetry devices and systems described herein may be electrically connected by a variety of known means. For example, some or all of the components may be connected through a power bus incorporated in the downhole toolstring (a "toolstring power bus" or "TPB"). A TPB may provide power and/or data in a single channel or across multiple channels. Alternatively or additionally, some or all of the components of the EM telemetry devices and systems described herein may be connected by an internal bus system, which is separate from the TPB that extends across the entire toolstring. The internal bus system may be used to transmit data and/or power signals within the EM telemetry devices and systems described herein. In addition, certain connections (e.g., between the EM telemetry device and the antenna in the above example shown in FIG. 1) may be a simple wired connection between a positive and a negative output terminal. An illustrative embodiment is shown by reference to FIGS. 3A and 3B.

Figure 3A:
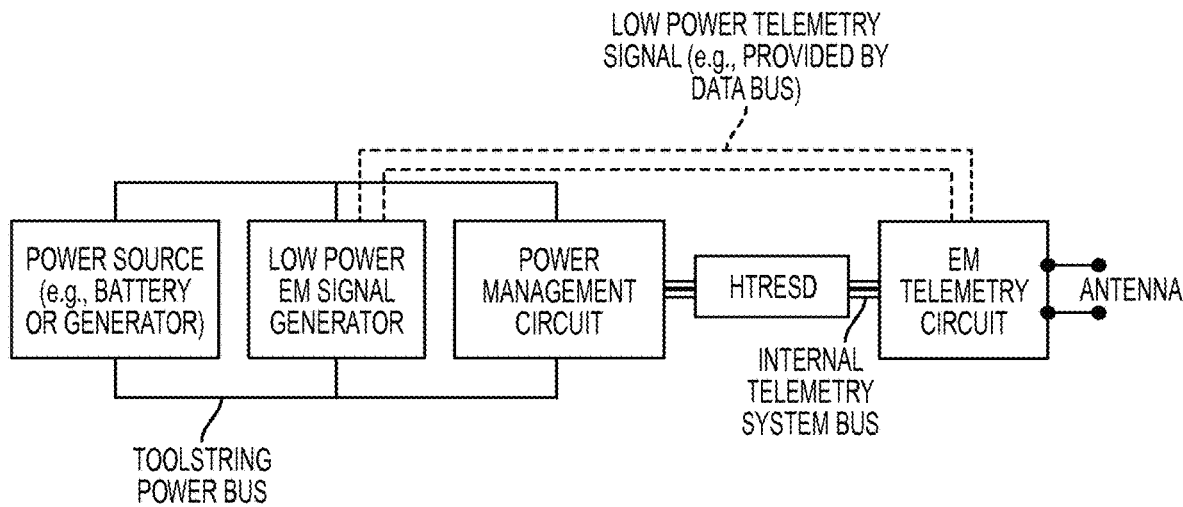
FIG. 3A shows schematic of a system featuring an EM telemetry device.
Figure 3B:
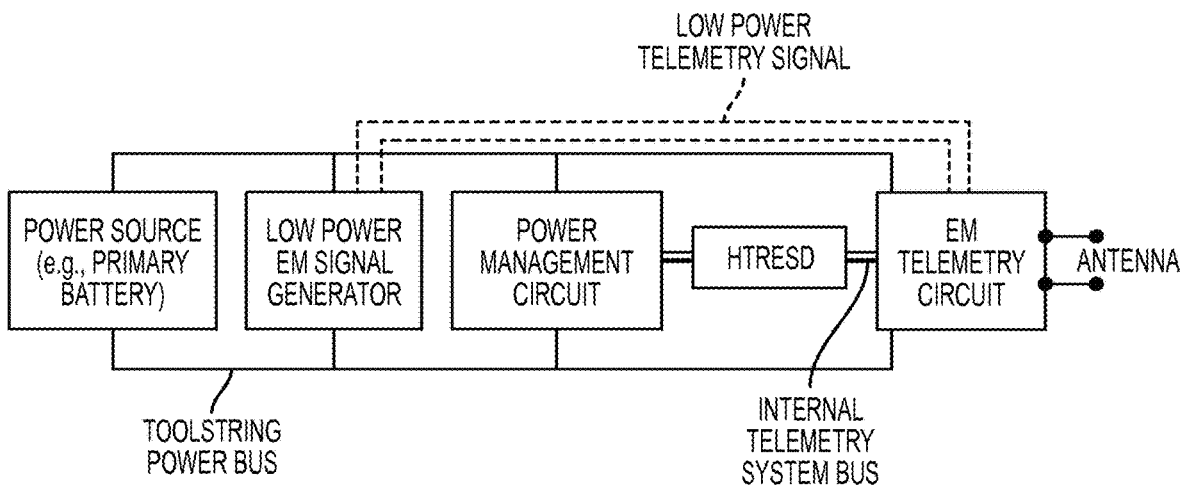
FIG. 3B shows schematic of a system featuring an EM telemetry device.

As shown in FIGS. 3A and 3B, certain embodiments of the EM telemetry devices and systems disclosed herein may comprise a power management circuit (e.g., including an EMS circuit, UCC, and/or other power management components as described above), which may be, e.g., a switched mode power supply with a high operational efficiency, for efficiently drawing power from a downhole power source, which may be a battery pack, a generator, or a topside power source (e.g., a generator connected to the toolstring by a wireline). The power management circuit efficiently manages power consumption from the power source and the charging of an HTRESD configured to meet the power need of the high power EM telemetry device (e.g., an ultracapacitor bank, such as an ultracapacitor string comprising 1-100 ultracapacitors and related electronics).

In various embodiments, the HTRESD may be characterized by a volumetric storage power density of greater than 30 kW/L, 40 kW/L, 50 kW/L, 75 kW/L, 100 kW/L. 110 kw/L, 120 kW/L, or more, e.g., in the range of 30 kW/L to 120 kW/L or any sub-range thereof. Accordingly, the HTRESD may facilitate high power transmission, while maintaining a form factor suitable for the tight confines often found in downhole applications. For example, in some embodiments, HTRESD may be generally cylindrical and elongated, with an outer diameter (OD) of less than 36 inches, 12 inches, 6 inches, 3 inches, 2 inches, 1 inch, 0.5 inches, or less, e.g., in the range of 0.5 inches to 36 inches or any sub-range thereof, such as 0.5 inches to 3 inches.

The EM telemetry circuit, which may also comprise a switched mode power supply with a high operational efficiency, receives the low power telemetry signal from the EM telemetry signal generator, which may itself be a conventional EM telemetry tool, and amplifies the signal to produce a high power EM telemetry signal. The EM telemetry circuit may receive the low power EM telemetry signal from a separate connection to the EM signal generator of from the TPB through the internal telemetry system bus. The EM telemetry circuit outputs a high power EM telemetry signal to an antenna connected to the positive and negative output terminals of the EM telemetry circuit. The HTRESD provides the necessary power pulse to the EM telemetry circuit to amplify the EM telemetry signal.

In various embodiment, the EM telemetry circuit may include any suitable receiver for detecting and processing the low power telemetry signal. For example, the low power EM signal generator may encode data packets using chirped pulse encoding, where a chirp indicates a frequency sweep. The EM telemetry circuit may continuously detect the frequency of the low power telemetry signal to detect chirp pulses an decode data, e.g., based on measured frequency shifts in the low power telemetry signal.

According to the embodiment shown in FIG. 3A, the EM telemetry circuitry may receive both power and data through the internal telemetry system bus. In those embodiments, the EM telemetry circuit may draw power from the HTRESD for both high power pulses and general circuit operation. Alternatively or additionally, as shown in FIG. 3B, the EM telemetry circuit may receive power from both the internal telemetry system bus and the power source, which may be provided through the TPB. In those embodiments, the EM telemetry circuit may draw a low current from downhole power source for general circuit operation and a high power pulses from the HTRESD during high power EM transmission windows. The EM telemetry circuit in conjunction with the power management circuit controls the overall power consumption to maximize the operational efficiency of the EM telemetry devices, systems, and methods disclosed herein.

EM telemetry devices and systems disclosed herein are capable of delivering high power to a downhole antenna for a high power EM transmission, e.g., about 20 W to about 2000 W or any sub-range thereof, such as, about 50-250 W, about 75-250 W, about 100-250 W. EM telemetry devices and systems disclosed herein are capable of operating in a downhole environment at about 8 V to about 300 V or more and about 0.5 A to about 35 A or more. EM telemetry devices and systems disclosed herein are also capable of high power pulses up to about 400 W or more, e.g., 500 W, 750 W, 1000 W, 1250 W, 1500 W, 1750 W, 2000 W or more.

In some embodiments, the voltage on each antenna electrode may vary between, e.g., +/−10 V, +/−50 V, +/−100 V, +/−200 V, +/−300 V, +/−400 V, +/−500 V, +/−600 V, +/−700, V, +/−800 V, +/−900, +/−1000 V, +/−1500 V, +/−2000 V or more, e.g., in the range of +/−1 V to +/−2000V or any sub range thereof.

In the present invention, the HTRESD allows for a mode of operation in which the HTRESD is charged from a low power source (e.g., from a relatively low voltage and/or low current supply such as a battery or downhole generator) and then discharged at a relatively higher power. The system provides for bursts of high power telemetry. The bursts of high power telemetry are provided at a power level higher than that which is available from the low power source. To operate in this mode, the transmission must comprise periods of non-transmission or at least periods when the transmission is provided at lower power levels than the power levels during bursts of high power telemetry. To maintain an energy balance, the relative on-time of the transmission compared to the off-time fundamentally dictates the ratio between the power level of the high power bursts and the maximum power available from the source. For instance, if the transmission on-time is one ninth that of the transmission off-time, the system can provide for bursts of telemetry with up to ten times the power available from the low power source.

In certain other embodiments, EM telemetry devices and systems disclosed herein may be further connected to other devices within the downhole toolstring—e.g., other downhole instruments or other power sources, such as one or more primary batteries, downhole generators, or topside power sources—through a TPB or through other electrical connections. A TPB may be used to both provide send electrical power to and from the EM telemetry devices and systems disclosed herein and to allow the devices or systems to communicate with other devices within the toolstring. For example, the EM telemetry devices and systems disclosed herein may communicate with an MP telemetry tool connected to the TPB to receive information from the MP telemetry tool and transmit that information using the EM telemetry tool. Such "dual telemetry" systems are described in U.S. Pat. Nos. 6,909,667, 7,573,397, 8,120,509, and 8,502,696, which are incorporated herein by reference in their entirety.

In certain embodiments, the EM telemetry devices and systems disclosed herein are capable of communicating with other downhole tools and/or devices on the surface. The device and systems may employ various communication modes and protocols to facilitate this communication. For example, communication within a toolstring between downhole tools may be facilitate by a TPB, which provides a wired electrical connection among devices connected to the toolstring. The TPB may be further connected electrically to the surface, e.g., where wired pipe is employed in the drilling operation. An example of wired pipe is the IntelliServ™ wired pipe available from National Oilwell Varco. Additionally or alternatively, the EM telemetry devices and systems disclosed may be capable of communicating within the toolstring by any other available communication methods, including without limitation optical communication (e.g., fiber optic communication), electromagnetic communication (e.g., radio frequency communication), and/or mechanical communication (e.g., rotary or mud pulse communication). By enabling communication between the EM telemetry devices and systems disclosed herein and the other tools within the toolstring, the EM telemetry devices and systems disclosed herein can operate more efficiently.

In certain embodiments, the EM telemetry devices and systems receive data directly from other downhole instruments (e.g., a directional sensor, a nuclear magnetic resonance tool, a coring tool, a sonic tool, a neutron density tool, a gamma detector tool, a seismic measurement tool, a telemetry tool, a resistivity tool, and/or a formation tester), generate a high power EM telemetry signal based on that data, and transmit the high power EM telemetry signal to a downhole antenna. In some embodiments, one or more downhole instruments transmit data through, and the EM telemetry devices and systems receive data from, a TPB. In some embodiments, one or more downhole instruments transmit data through a direct connection to the EM telemetry devices and systems disclosed herein. An illustrative embodiment is shown by reference to FIG. 4.

Figure 4:
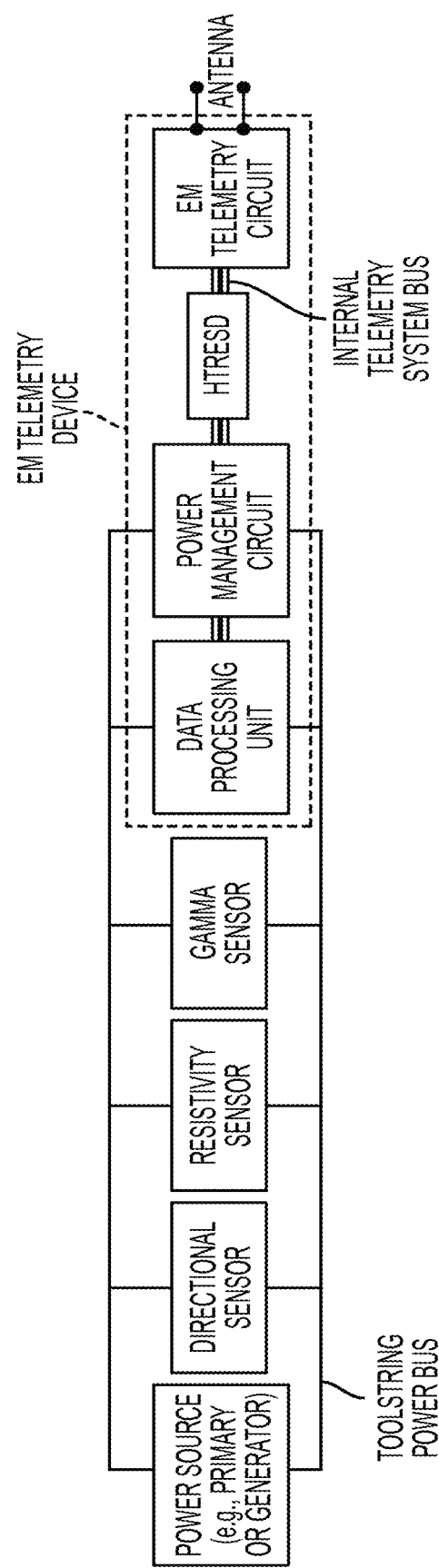
FIG. 4 shows schematic of a portion of a downhole toolstring featuring an EM telemetry device

As shown in FIG. 4, certain embodiments of the EM telemetry devices and systems disclosed herein are capable of communicating with other downhole instruments (e.g., a directional sensor (sometimes called a directional module), a resistivity sensor, a gamma sensor, or any other downhole instruments) through a TPB. The data processing unit, sometimes called a master processing unit or MPU, facilitates the processing of data received from the various downhole tools. The data processing unit generally does not require high power and may be powered by the downhole power source and/or the energy storage (e.g., HTRESD) incorporated in the EM telemetry device. The data processing unit generates an EM signal based on the data received from various downhole tools. For example, in certain embodiment of the EM telemetry devices, systems, and methods disclosed herein, the data processing unit may produce a phase shift modulated sinusoidal signal based on digital data received from various downhole instruments. In those embodiments, the EM telemetry devices, systems, and methods disclosed herein transmit a sinusoidal signal comprising digital data represented as a series of phase shifts that toggle between a "1" and a "0," beginning with an initially assumed "1" or "0" when signal is synchronized with the receiver.

In the example shown in FIG. 4, the EM telemetry device further comprises a power management circuit, which is analogous to the power management circuit show in FIGS. 3A and 3B. The power management circuit may comprise an EMS circuit, a UCC, a UMS circuit, and/or any other electronics for efficient management of power consumption from the downhole power source and charging of the HTRESD, which may comprise one or more ultracapacitors. The EM telemetry circuit receives the EM telemetry signal from the data processing unit and transmits a high power EM telemetry signal to the antenna, using the energy available In some embodiments, the EM telemetry circuit may modify or condition the low power telemetry signal in order to make it more suitable for high power transmission. For example, in some embodiments, the low power telemetry signal may include a periodic, non-sinusoidal wave. The EM telemetry circuit may convert this periodic, non-sinusoidal wave signal to a sinusoidal output having the same fundamental frequency as the periodic, non-sinusoidal wave. The sinusoidal signal will include fewer higher order harmonics, and so may be less susceptible to attenuation and signal loss when transmitted through a geological formation. A topside receiver may be configured to detect that sinusoidal wave (e.g., as described in detail below), determine its fundamental frequency, and, if desired, recreate the periodic, non-sinusoidal wave signal based on this information.

As described in detail herein, in some embodiments, the EM telemetry circuit may operate in a burst mode, transmitting only during certain time periods, e.g., to take advantage of high power pulses available from the HTRESD and allow for recharging of the HTRESD between pulses. However, in some embodiments, the low power telemetry system may include a continuous signal stream. In some such embodiments, the EM telemetry circuit may modify the low power telemetry signal to generate a modified output signal suitable for burst transmission. For example, the EM telemetry circuit may include one or more buffers that store data from the low power signal during periods where the high power EM telemetry circuit is non-transmitting.

In some embodiments, blanks may be inserted in a data stream used to generate the low power telemetry signal such that actual data is only included in the signal at times when high power EM telemetry circuit is transmitting. In some embodiments, the duration or frequency of the blanks periods in the data stream may be used to set the output power level of the high power transmission. For example, longer ore more frequent blank periods (allowing for longer or more frequent recharging periods) may indicate the use of a higher transmission power level.

In some embodiments, EM telemetry devices may transmit the high power output signal using a differential output, e.g., a bipolar signal. In some embodiments, the bipolar signal may be symmetric and may have substantially zero DC voltage offset (e.g., to reduce corrosion effects, as noted above). However, in some embodiments, the low power telemetry signal may be single ended. In some such embodiments, the EM telemetry circuit may include a level shifting circuit or other suitable circuit configuration for converting a single ended low power telemetry signal into differential signal that may be amplified to and output as a high power transmission signal. In various embodiments, any type of signal conversion circuitry may be provided, e.g., single ended to differential, differential to single ended, bipolar to unipolar, unipolar to bipolar, and combinations thereof.

The EM telemetry circuit may automatically control the gain used to generate the high power transmission signal, e.g., allowing a wide range of input signal amplitudes to be accommodated from a lower power telemetry signal generator.

In certain embodiments, the EM telemetry devices and systems disclosed herein can adjust the charge of the HTRESDs or the output power, current, or voltage profile based on available input power and/or available information about EM telemetry tool operations. Additionally or alternatively, the EM telemetry devices and systems disclosed herein can communicate with the EM telemetry tool to anticipate and schedule events related to the EM telemetry tool operation, e.g., power pulses required for an EM transmission period.

When the EM telemetry devices and systems disclosed herein include HTRESDs, the devices and systems are also rechargeable, i.e., they are capable of supplying power to an EM telemetry tool through at least 2 charge-discharge cycles. Systems and devices incorporating HTRESDs may be recharged between discharge cycles (e.g., power pulses experienced during a high power EM transmission window) by a variety of power sources, including primary batteries (such as common lithium thionyl chloride batteries), turbines, flywheels, inertial energy generators, and other downhole power sources. Alternatively or additionally, the EM telemetry devices and systems disclosed herein may be powered by a topside power source (e.g., a wireline or a wired pipe) connected to the downhole toolstring through known means.

When the EM telemetry devices, systems, and methods disclosed herein employ HTRESDs (e.g., one or more ultracapacitors), certain embodiment may comprise devices for regulating the charging and discharging of the HTRESDs systems. Where the EM telemetry devices and systems comprise multiple HTRESDs, the EM telemetry devices and systems may further comprise devices for regulating the charging and discharging of individual HTRESDs or groups of HTRESDs, e.g., balancing charge between HTRESDs or monitoring the charge state or other performance parameters of an HTRESD or group of HTRESDs.

Having thus described aspects of novel EM telemetry devices, systems, and methods, it should be recognized that a variety of embodiments may be realized. For example, the devices, systems, and methods disclosed herein may include circuits that provide a state of charge monitor for monitoring charge in at least one of the HTRESDs, including ultracapacitors, or another power source (such as a battery) coupled to the EM telemetry devices and systems, e.g., a downhole power source connected to a TPB. In certain embodiments, the EM telemetry devices and systems disclosed herein may include control circuitry for drawing power from one or more of several battery packs arranged, for example in a redundant configuration. In certain embodiments, the devices, systems, and methods disclosed herein may further comprise a motor drive, e.g., a brushless motor drive. In certain embodiments, the devices, systems, and methods disclosed herein may include various sensors, such as pressure, temperature and vibration (which may provide output to control circuitry for controlling an EM telemetry device or system as appropriate), rotation, and the like.

The EM telemetry devices and systems disclosed herein may employ a variety of optimization and efficiency based approaches to delivering power to an EM telemetry tool. For example, the EM telemetry devices and systems disclosed herein are capable of communicating with the EM telemetry tool to optimize the data transmission rate based on the available power, which may vary instantaneously. For example, EM telemetry devices and systems employing at least one HTRESD may be able to provide high power pulses during a first high data transmission rate mode when the HTRESD is in a high state of charge. When the HTRESD is in a relatively lower state of charge, or is in a recharging mode between discharge cycles, the EM telemetry devices and systems disclosed herein are capable of communicating with the EM telemetry, which can adjust to a second reduced data transmission mode. Power and data transmission rate can be adjusted across the full spectrum of available power (e.g., 20 W to 200 W or even 2000 W) and transmission rate (e.g., 5 bps to 100 bps, or even 1,000 bps, e.g., in the range of 1 bps to 10,000 bps or any sub-range thereof).

The EM telemetry devices and systems disclosed herein are capable of adjusting the state of an associated charge storage device, e.g., an HTRESD, particularly an ultracapacitor, based on the mode of operation of the EM telemetry tool and, generally, the drilling operation. For example, during a drilling mode the at least one HTRESD may be held at a first charge state wherein the HTRESD provides power to the EM telemetry tool sufficient for basic operation, e.g., data collection, whereas the at least one HTRESD may be held at a second charge state (e.g., a higher charge state) during a transmission mode wherein the HTRESD provides high power pulses to the transmitting EM telemetry tool.

The EM telemetry devices and systems disclosed herein also enable multi-channel EM telemetry. Some embodiments may enable up to 2, 3, 4, 5, 6, 7, 8, 9, 10, 15, 20, 25, 30, 35, 40, 45, 50, 100 or more channels.

For example, by increasing the overall power available to the EM transmission tool, the EM telemetry devices and systems disclosed herein may enable each channel to have the minimum power required for transmission. Whereas a typical EM telemetry tool may require 10 W of power for a typical low frequency (e.g., 1-6 Hz) transmission, the EM telemetry devices and systems disclosed herein are capable of providing at least 20 W, enabling two 10 W data transmission channels, assuming no increase the power available to each channel. The EM telemetry devices and systems disclosed herein may further provide at least 50 W, 100 W, 150 W, 200 W, 250, 500 W, 1000 W, 1500 W, 2000 W, or more enabling even more transmission channels to be used, wherein each channel may draw greater than 10 W during a transmission mode to boost the signal strength.

In addition to the power available from conventional sources, a limitation of multi-channel transmission is the signal attenuation that occurs at higher frequencies. During multi-channel transmission, the signal-to-noise ratio of the EM telemetry tool may limit the transmission spectrum, requiring additional channels to be at higher, attenuated frequencies. The EM telemetry devices and systems disclosed herein are capable of overcoming the signal attenuation characteristic of higher frequency (e.g., 10-20 Hz) transmission channels by providing more power to the EM telemetry tool to compensate for the attenuation of high frequency signals. For example, the EM telemetry devices and systems of the present disclosure are capable of enabling 5-channel EM telemetry as follows: (1) 20 W to a 2 Hz transmission channel; (2) 20 W to a 4 Hz transmission channel; (3) 20 W to a 6 Hz transmission channel: (4) about 23 W to an 8 Hz transmission channel to overcome the approximately 14% signal loss; and (5) about 26 W to a 10 Hz transmission channel to overcome the approximately 23% signal loss. The total power provided to an EM telemetry tool in this example is about 109 W. The EM telemetry devices and systems disclosed herein may enable additional advantages of high frequency transmission, particularly multi-channel, EM transmission, e.g., improved signal-to-noise where the primary sources of noise are low frequency components. For example, the EM telemetry devices and systems disclosed herein may enable transmission of an EM telemetry signal at a high frequency where there are few sources of noise, e.g., 30 Hz or greater. Operating at higher frequencies may require additional power to overcome greater signal attenuation, which the EM telemetry devices and systems disclosed herein can readily provide: and thus, there may be a tradeoff between increasing the power to a low frequency signal to improve the signal to noise ratio and increasing the power to enable a higher frequency transmission mode.

Alternatively or additionally, exemplary EM telemetry devices and systems of the present disclosure are further capable of adjusting the power to each channel to optimize power consumption. For example, where a particular channel has a low data transmission rate and/or less background noise, the power provided to that channel may be lower than the power provided to the other channels.

In certain embodiments, the EM telemetry devices and systems disclosed herein enable prioritization of data transmission based on a variety of downhole conditions, including available power and type of data being transmitted. For example, the EM telemetry devices and systems disclosed herein enable transmission of relatively low bandwidth data (e.g., directional drilling data, such as azimuth and inclination) in a first low power transmission mode. The EM telemetry devices and systems disclosed herein can then transmit high bandwidth data during a second higher power transmission mode, e.g., after acquisition of gamma data, neutron density data, seismic data, or a nuclear magnetic resonance data.

Figure 5:
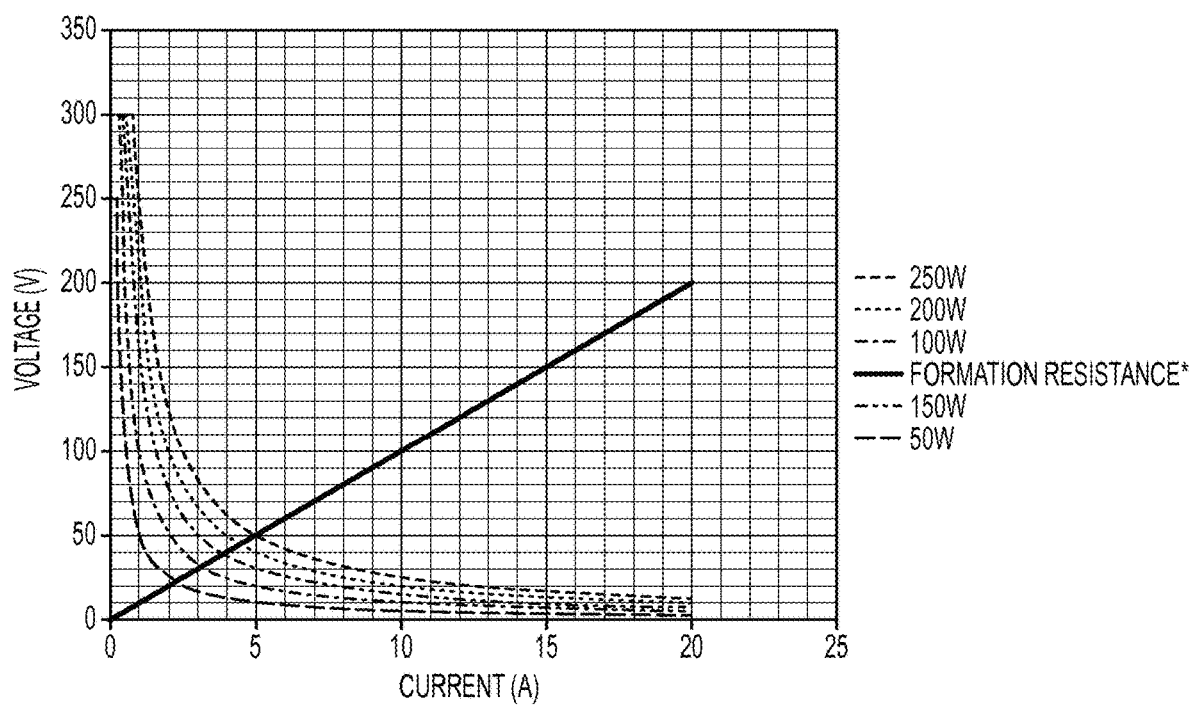
FIGS. 5, 6, and 7 depict exemplary power curves for the EM telemetry devices and systems disclosed herein.
Figure 6:
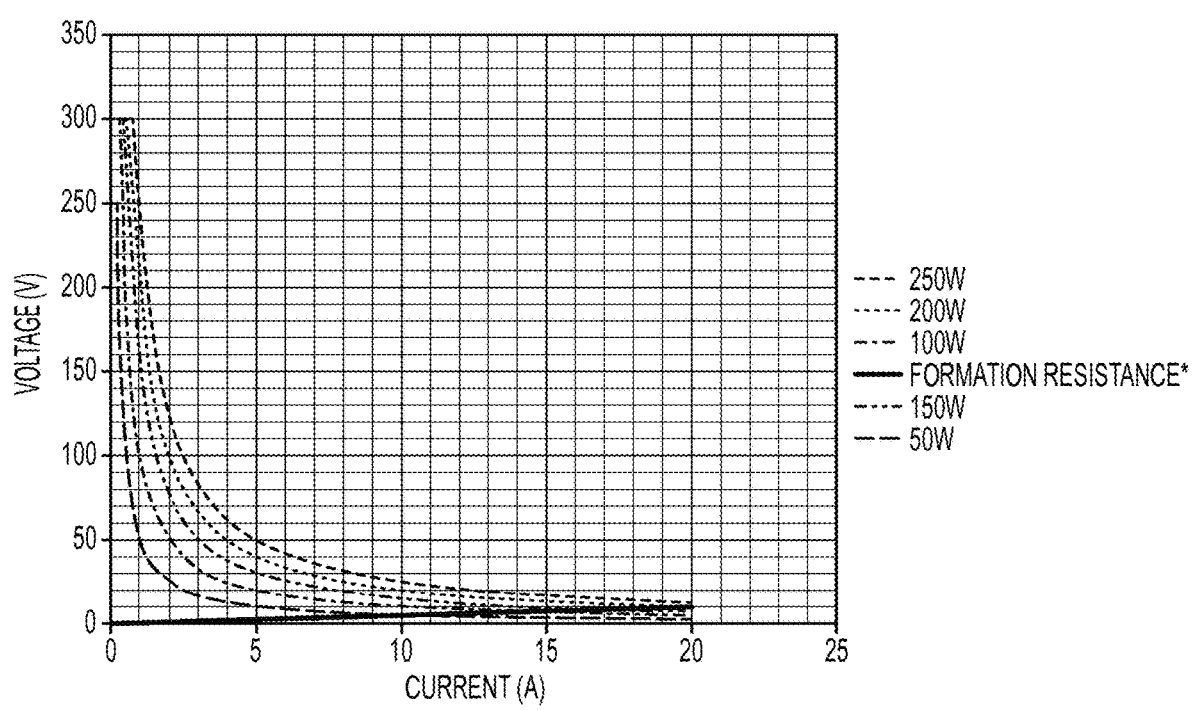
Figure 7:
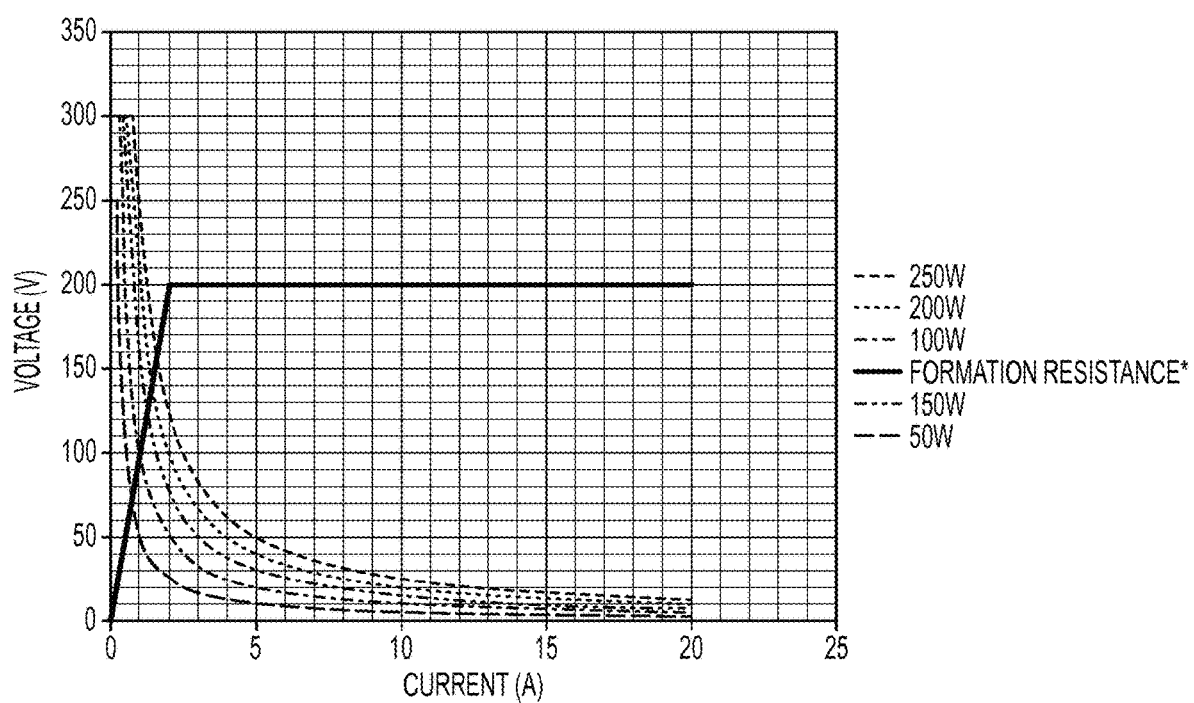

In certain embodiments, the EM telemetry devices and systems disclosed herein further enable efficient optimization of power consumption by EM telemetry tools based on environmental conditions, e.g., the aggregate resistance of the medium (i.e., the resistance of geological formation plus the drilling fluid). FIGS. 6, and 7 depict exemplary power curves for the EM telemetry devices and systems disclosed herein. The EM telemetry devices and systems disclosed herein can draw additional power based on the aggregate resistance of the medium when necessary to ensure adequate signal strength at the surface. FIGS. 5, 6, and 7 demonstrate three different examples of a range of aggregate resistance of the transmission medium—10 n, 0.6 n, and 100 n. The power curves demonstrate the current that must be provided to the EM telemetry antenna at a particular voltage setting, and vice versa. Thus, the curves demonstrate the efficiency of various EM telemetry devices and systems disclosed herein.

In some embodiments, the EM telemetry devices and systems disclosed herein may regulate output power, e.g., to trade off signal integrity for battery life. For example, in some embodiments, the transmission power may be reduced when a low battery state of charge is detected (e.g., as described in greater detail herein). Power regulation may also be used to limit power dissipation, e.g., in high power scenarios.

In some embodiments, the EM telemetry device may include a clock and a memory that stores a transmission power schedule for the device. For example, the schedule may be used to control the device such that it transmits at 7 W from time t=0 hours to time t=20 hours, 10 W from time t=20 hours to time t=50 hours, 20 W from time t=50 hours to time t=100 hours, and so forth. The power schedule may be generated based on a drilling plan for a downhole tool, e.g., based on expected depth and geological surrounding of the drilling tool at various times in the drilling plan. In some embodiments the stored power schedule may be updated, e.g., using downlink techniques described herein. However, in other embodiments, the stored schedule may be used for an entire drilling operation, reducing or eliminating the need for downlinking.

The EM telemetry devices, systems, and methods disclosed herein may comprise power converters and amplifiers that enable high power EM telemetry (e.g., about 20 W to about 250 W, 500 W, 1000 W, 1500 W, 2000 W, or more). Power converters of the EM telemetry devices and systems disclosed herein are typically switched mode power supplies and may employ various control and/or feedback architectures, e.g., current regulation or voltage regulation. Current regulation may be advantageous in applications of the EM telemetry devices and systems disclosed herein where the device or system drives a relatively low resistance load or formation. By directly regulating the current, over-current conditions that would be frequent in a voltage regulated system driving a low resistance and widely varying load can be avoided. Moreover, paralleled converters for producing the output current can be configured to inherently share the load when they are current-regulated rather than voltage regulated.

Generally, power rather than current regulation of the system is a useful feature because it directly controls the amount of power drawn from the downhole power source and the strength of the signal received on the surface. For instance, power regulation provides a straight forward tradeoff between strength of signal received on surface and downhole battery runtime. Power regulation may be achieved with a current-regulated power converter architecture by way of an outer feedback loop (whereas the inner feedback loop is that which regulates the current of the converter). The outer feedback loop may regulate the power. For instance, the system may measure its own output voltage and multiply the measured value by the commanded current. The result is a power and the power actually delivered can be subsequently adjusted up or down by adjusting the commanded current up or down. The process may repeat indefinitely so that the actual power delivered to the formation tracks a commanded power set point.

A similar situation exists in the case of voltage regulated power converter. The current output from the system may be measured and multiplied by the commanded voltage. The power may then be adjusted by adjusting the voltage command. The power control loop may be "slow" meaning it is slower than the inner current or voltage control loops. The inner control loops generally need to be faster than the frequency content of the controlled signal, e.g., the frequency of the sinusoidal output of the transmitter, while the power control loop only needs to be as fast as typical changes in the load. The load will typically change on the time-scale by which the drill string drills into the earth—a longer timescale than the period of the signals used for transmission. Hence, the power control loop may be relatively slow. Generally, voltage, current or power set points in the context of the downhole EM telemetry devices, systems, and methods disclosed herein may represent amplitude, peak to peak, peak or Root Mean Square (RMS) power setpoints or actual set points that vary in time continuously according to the signal to be imposed on the antenna electrodes.

In certain embodiments of the EM telemetry devices and systems disclosed herein, parallel power converters are employed. Parallel power converters enable numerous advantageous features of the EM telemetry devices and systems described herein. EM telemetry devices and systems employing parallel power converters more efficiently deliver high current to an EM telemetry antenna. In addition, parallel power converters provide redundancy that extends the operability of the EM telemetry devices and systems after a failure of one of the parallel power converters. Thus, the EM telemetry devices and systems disclosed herein employing parallel power converters are capable of operating for longer uninterrupted periods in a downhole environment and are less likely to require an expensive and time consuming breaking of the toolstring to retrieve and replace a failed EM telemetry device or system.

In certain embodiments, an ultracapacitor charging circuit is capable of charging at least one ultracapacitor or a bank of ultracapacitors while a separate circuit is capable of balancing the charge across the ultracapacitor bank.

In certain embodiments, the EM telemetry devices and systems disclosed herein comprise an amplifier to amplify the signal output from the EM telemetry tool.

In certain embodiments, the amplifier comprises a differential output its output comprises two terminals, neither of which is also connected to the system's internal ground reference.

In certain embodiments, the amplifier comprises a single-ended output—its output comprises two terminals, one of which is also connected to the system's internal ground reference.

In certain embodiments, the amplifier comprises a switched-mode amplifier (e.g., a class-D amplifier).

In certain embodiments, the amplifier comprises a linear amplifier.

In certain embodiments, the amplifier comprises a half-bridge or a push-pull circuit for generating a single-ended output signal.

In certain embodiments, the amplifier comprises two push-pull circuits or an H-bridge circuit for generating a differential output signal.

In certain embodiments, the amplifier is controlled so that a differential output signal is bi-polar—the difference between the two output terminals takes on both positive and negative values. In those cases, the amplifier output may be controlled to be substantially zero-mean in order to mitigate corrosion effects at the antenna electrode surfaces.

In certain embodiments, the amplifier comprises an output circuit that is controlled to continuously modulate the current or voltage output from the EM telemetry tool. In certain embodiments, continuous modulation is achieved by way of pulse-width modulation by operating the transistors comprising the output circuit as switches. In these cases, the output circuit is said to be switched at a frequency much higher than the fundamental of the output signal frequency. In certain embodiments, continuous modulation is achieved by way of linear operation using the transistors comprising the output circuit. In these cases, the output circuit is said to operate as a linear amplifier.

In certain embodiments, the amplifier comprises a switch network such as an H-bridge that is controlled to switch between various DC levels in order to construct a piece-wise linear approximation of the desired output signal. In these cases, the switch network is said to be switched at the fundamental of the output signal frequency.

In certain embodiments, the amplifier comprises a switch network such as an H-bridge that controls the polarity of a continuously varying input voltage or current. For instance if a sinusoidal output signal is desired, the switch network may switch the polarity of a rectified sinusoidal output signal at each of the desired zero-crossings to construct an un-rectified sinusoid. In these cases, the switch network is said to be switched at the fundamental of the output signal frequency.

In certain embodiments, the amplifier comprises a switch network such as an H-bridge and additionally comprises a current-regulated power converter. The current-regulated power converter may be controlled to generate a rectified version of the desired signal and the switch network such as an H-bridge may be controlled to invert the polarity of the output of the current-regulated power converter in order to create an un-rectified output current signal. In other embodiments the amplifier comprises a voltage-regulated power converter instead of the current-regulated power converter.

In certain embodiments, the amplifier is augmented with a second relatively slow control loop for regulating the power output from the amplifier.

Additionally or alternatively, the EM telemetry devices and systems disclosed herein may comprise a slow power loop feedback to control the power provided to the EM telemetry tool. When combined with a current regulating power converter, a slow feedback loop measuring output voltage of the EM telemetry devices and systems provide a measurement of the output power, which provides a feedback mechanism for adjusting current to a desired setpoint, i.e., the current demand of the EM telemetry tool. The power control loop may enable indirect measurement of the aggregate resistance through which the EM telemetry tool is transmitting (i.e., the resistance of the formation plus the drilling fluid).

In general, the EM telemetry devices, systems, and methods disclosed herein are adapted for operation in the harsh environment encountered downhole. For example, the EM telemetry devices and system, and HTRESDs, when included, are adapted, in some embodiments, for operation in a temperature range from ambient temperatures up to about 250° C., or even higher temperatures in certain embodiments.

Some exemplary off-the-shelf components and techniques that may be used in the EM telemetry devices and systems disclosed herein include: (1) bare die silicon and silicon-on-insulator active devices, (2) silicon carbide active power devices, (3) high temperature rated and low temperature coefficient ceramic passives (COG or NPO dielectrics), and (4) high temperature magnetic passives. AN (aluminum nitride) ceramics may be used as a circuit substrate material for excellent thermal stability and thermal conductivity. Circuit interconnects may be formed of oxidation resistant Au traces. Bonding strategies may employ flip chip or Au or Al wire bonding for bare die active components using, for instance, AuGe high temperature solder. In some embodiments, wire bonding is expected to be advantageous over flip chip bonding due to the added mechanical compliance, especially in the presence of thermal expansion and shock and vibration. Also, many conventional devices—e.g. devices comprising conventional silicon wafers—are rated for relatively high temperatures and/or may be independently qualified as reliable for operation at relatively high temperatures. For instance, silicon integrated circuits formally rated by their manufacturer for operation at temperatures only up to about 85 degrees Celsius may be tested and verified independently to operate reliably at temperatures up to, for instance 150 degrees Celsius, 175 degrees Celsius, 200 degrees Celsius, or even up to 30) degrees Celsius or more. This process of qualification beyond the manufacturer's specification is generally time-consuming and may be costly, but can yield useful high temperature circuit building blocks.

High temperature circuit techniques may be employed, for example, to ensure stability of feedback regulation circuits despite very wide temperature swings as passive circuit components used for frequency compensation may vary in value. Low or essentially zero temperature coefficient circuit designs can be achieved by coupling negative temperature coefficient resistors with conventional resistors, by closely matching active devices and by relying on ratiometric (relative) rather than absolute sensing and control. As an example, bandgap derived voltage references can be employed to cancel the effect of very wide temperature variations on set points in feedback regulation circuits. Temperature coefficient strategic component selections mitigate these problems as well, for instance CGO or NPO dielectric ceramic capacitors have a relatively flat response to temperature across this range. Active device performance variations can be significantly mitigated by use of silicon-on-insulator (SOI) and silicon carbide (SiC) technology widely available in both hermetic and bare die form.

Other high temperature materials, components and architectures as are known in the art may be employed to provide for operability at a specified (high) temperature. Silicon-on-insulator (SOI), Silicon Carbide (SiC), bare die components, ceramic PCB's, low temperature coefficient passives and high temperature, hi-rel solders will all be sourced to complete the electronic systems. Such components are described in US Patent Publication Nos. US2012/068074 and US2013/0026978, which are incorporated herein by reference in their entirety.

In certain embodiments, the EM telemetry devices and systems disclosed herein are capable of communicating with devices on the surface through a variety of "downlink" communication modes, including without limitation wired electrical communication (e.g., wired pipe such as Intelli-Serv), optical communication (e.g., fiberoptic communication), electromagnetic communication (e.g., radio frequency communication or quasi-static time varying current or voltage based communication), mechanical communication (e.g., rotary or mud pulse communication), and/or ultrasound communication.

A mechanical downlink may be a rotary downlink in which information is communicated by varying the rotational rate of the drillstring. A downhole rotational rate sensor detects the variations in rotational rate which can be interpreted by the EM telemetry device or system. The downhole rotational rate sensor may be integrated into the EM telemetry devices and systems disclosed herein or may be part of an external sensor array capable of communicating such rotational rate information to the EM telemetry devices and systems, e.g., by sending the rotational rate information through a toolstring power bus. In this manner, information can be transmitted from the surface to the downhole EM telemetry devices and systems.

In various embodiments, one or more components of the downhole EM telemetry device or system may operate in a transmit mode for uplinking data from downhole to topside (as described in detail above) and a receive mode for downlinking data from topside to downhole.

For example, in embodiments where the downhole EM telemetry device is a high power booster provided to operate with an incumbent low power telemetry system, the antenna of the high power device may be switched between transmit and receive modes. In receive mode, communications received from topside may be routed to the incumbent low power telemetry system, e.g., by way of a pass back circuit.

In some embodiments, a downlink may be provided from topside to an incumbent low power telemetry device. In some such embodiments, a high power EM telemetry device can be controlled in response to one or more properties of the incumbent device. For example, the downlink may set an output power of the incumbent device to a selected level. The high power EM telemetry device may read the selected output power level of the incumbent device, and set a property of the high power EM telemetry device based on this information.

For example, the high power EM telemetry device may include a memory that stores a mapping of incumbent device's power level settings to its own power level setting. For example, the high power EM telemetry device may determine that when the incumbent device is set to 1 W output, the high power EM telemetry device should output at a level of 15 W. When the incumbent device is set to 2 W output, the high power EM telemetry device should output at a level of 25 W, and so forth. In various embodiments, the mapping may be provided as a look up table, a mathematical relationship (e.g., a linear or non-linear mapping), or any other suitable form.

The EM telemetry devices and systems described herein can be arranged in a variety of configurations within a toolstring. In certain embodiments, the EM telemetry devices and systems described herein can be arranged to satisfy different form factors for toolstrings, including probe- and collar-mounted toolstrings.

Figure 16:
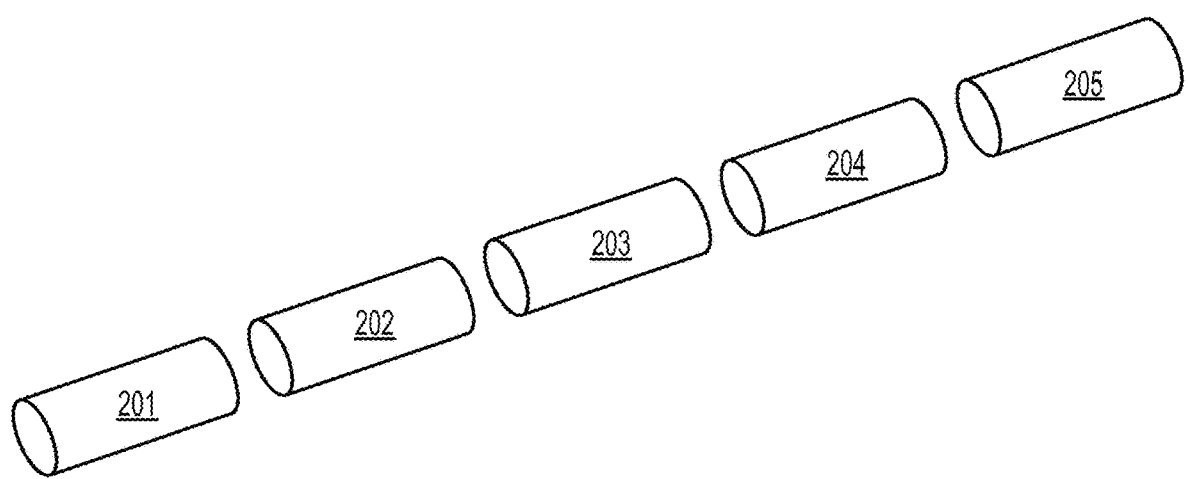
FIG. 16 is an illustration of a portion of a toolstring featuring an EM telemetry devices and systems disclosed herein

For example, FIG. 16 show and exploded view of a portion of a tool string assembly including an EM telemetry device of the type described herein. The assembly includes, in order from uphole to downhole, an antenna unit 201, a high power EM telemetry device 202 (e.g., including a high power EM telemetry circuit coupled to an HTRES, and any of the other various components described above), an incumbent low power EM telemetry device 203, a direction and inclination sensor 204, and a power source 205 (e.g., a battery based power source). In various embodiments, the ordering of these elements may be changed.

In some embodiments, the high power EM telemetry device 202 may be configured as an after-market addition to the assembly. For example, the high power EM telemetry device 202 may include pass through wiring, e.g., between the incumbent low power EM telemetry device 203 and other elements such as the antenna unit 201, e.g., to allow programming or control of the incumbent device.

In some embodiments, the high power EM telemetry device 202 may be generally cylindrical and elongated, with an outer diameter (OD) of less than 36 inches, 12 inches, 6 inches, 3 inches, 2 inches, 1 inch, 0.5 inches, or less, e.g., in the range of 0.5 inches to 36 inches or any sub-range thereof, such as 0.5 inches to 3 inches.

In some embodiments, the high power EM telemetry device 202 may include a mechanically strong housing (e.g., an aluminum housing) configured to protect internal electronic components. In some embodiments the housing may be configured to contain at least two double sided rectangular circuit boards, e.g., extending along the cylindrical axis of the housing and stacked in a direction transverse to the axis.

In some embodiments, the housing may act as a heat sink for the electronics housed within. For example, the most dissipative circuit elements (e.g., resistors and inductors) may be mounted closest to the housing.

In some embodiments the circuit boards may be mounted in a floating configuration, with no hard connections to the housing. Each of the circuit board may rest on an eclectically insulating pad, and may be potted in place. In some embodiments, the potting material may be configured to withstand thermal expansion and contraction, e.g., by inclusion voids in the material. Spacers may be positioned between the circuit boards. The spacers may be at least partially floating to allow for thermal expansion and contraction.

In some embodiments, the housing may include one or more wire chase features. The wire chase features may include smooth, contoured surfaces configured to reduce or eliminate wear on the wires.

In some embodiments, the housing may be connected to an adjacent element (e.g., the incumbent low power EM telemetry device 203) using bolts or other fasteners. The bolts may be disposed about the outer periphery of the cylindrical housing. The housing may include one or more electrical connections with adjacent element. An interlock feature may be provided to transfer strain away from the connecting bolts and electrical connections. For example the interlock feature may be disposed at an end of the housing near its central axis.

Short Duration Pulse Telemetry Scheme

The EM telemetry devices and systems described herein are suitable for pulsed transmission telemetry schemes. In some embodiments, the EM telemetry devices and systems may transmit information using a series of short duration high power signal pulses. In some embodiments, the pulses may be separated in time by periods that are much longer than the duration of the pulses themselves. Therefore, the transmission scheme may transmit a pulsed signal with very high peak power while maintaining a relatively modest total energy usage, such that the energy demands of the transmission scheme may be met using the devices and techniques described herein. For example, in various embodiments the high power pulses can be generated using energy stored in an energy storage device (e.g., an ultracapacitor) that is charged by a relatively low power source (e.g., a battery or downhole generator) during the time between pulses).

Figure 8:
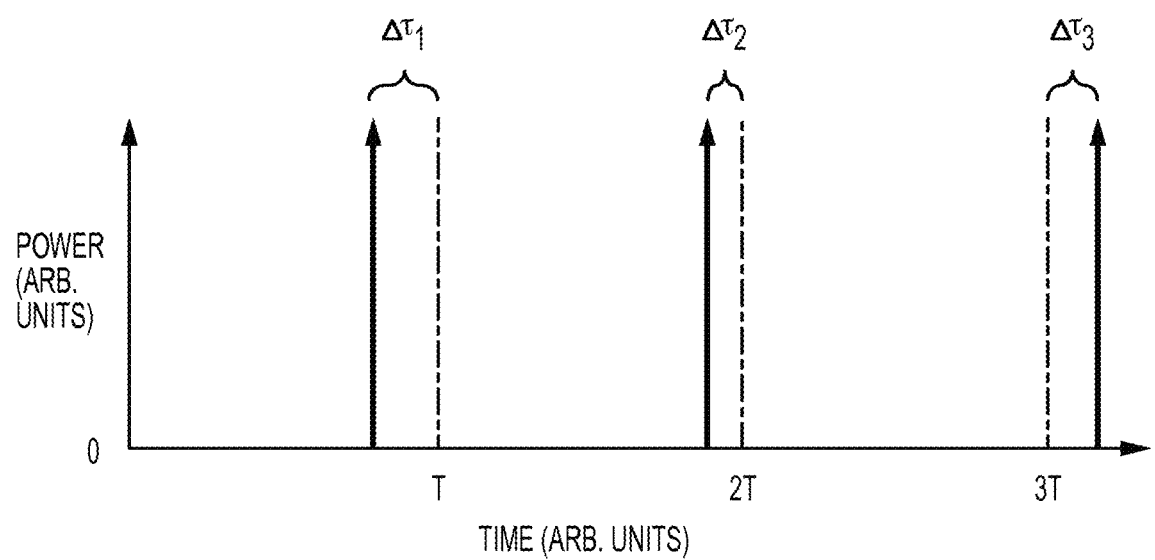
FIG. 8 illustrates a pulse position modulation scheme for use with the EM telemetry devices and systems disclosed herein.

FIG. 8 shows an exemplary implementation of a short duration high power pulsed signal transmission scheme. In this scheme, an EM telemetry system outputs a series of high power short duration transmission pulses (indicated with bold arrows). Information is encoded on the series of pulses by modulating the position in time of each of the pulses relative to a nominal period. For example, as shown, a pulse series has a nominal period of T. A first pulse is advanced by a time $\Delta\tau_1$ from a nominal first period at time T. A second pulse is advanced by a time $\Delta\tau_2$ from a nominal second period at time 2T. A third pulse is delayed by a time $\Delta\tau_3$ from a nominal third period at time 3T. A topside receiver unit at the surface may detect the signal, measure the variation of the pulse times from the nominal period, and decode the variations to recover the encoded information.

In various embodiments, output pulses may be generated with short durations, e.g., less than 1.0 second, less than 0.1 seconds, less than 0.01 seconds, less than 0.001 seconds, less than 0.1 milliseconds, less than 0.01 milliseconds, less than 0.001 milliseconds or less. For example in some embodiments, the pulse duration is in the range of 0.001 milliseconds to 1.0 second, or any sub-range thereof, such as 1-100 milliseconds.

In some embodiments, output pulses may be generated with low duty cycles (i.e., the ratio of the durations of the pulses to the total off-time between pulses.) In some embodiments, the duty cycle may be less than 5%, less than 1%, less than 0.1%, less than 0.05%, less than 0.01%, less than 0.005%, less than 0.001% or lower. For example in some embodiments, the duty cycle is in the range of 0.001% to 5% or any sub-range thereof, such as 0.1% to 1%.

In some embodiments, output pulses may be generated with high peak or average output power. In some embodiments, the peak or average output power of each of the pulses may be greater than 20 W, greater than 100 W, greater then 200 W, greater than 300 W, greater than 400 W, greater than 500 W, greater than 750 W, greater than 1000 W, greater than 1250 W, greater than 1500 W, greater than 1750 W, greater than 2000 W, or more. Various embodiments may include suitable voltage and/or current regulation devices (e.g., as described above) to provide a desired pulse power level.

In some embodiments, the EM telemetry system receives a telemetry signal from a low power source (e.g., a low power telemetry signal generator of the types described above). In some embodiments, this low power signal may use a different type of transmission scheme (e.g., using frequency, phase, or amplitude modulation of a sinusoidal signal). In some such cases, the EM telemetry system may include one or more demodulators, decoders, or similar devices that may decode information encoded on the low power signal. This information can then be re-encoded on a high power short pulse based signal.

In other embodiments, the EM telemetry system may be configured to sample the low power signal directly, and encode the information regarding the signal onto the short duration high power pulse transmission. For example, if the low power signal is a sinusoidal wave, the wave may be sampled and encoded on the high power transmission using pulse position modulation techniques known in the art. See, e.g., Bandyopadhyay M. N. Communication Engineering, Chapter 2.20, PHI Learning Private Limited (2010).

Although one specific encoding scheme is shown in FIG. 8, it is to be understood that in various embodiments, other encoding schemes may be used. In general, high power, short duration pulses are suitable for use with various known pulse position modulation schemes (e.g., any scheme where information is encoded my modulating the position in time of pulses in a series of pulses).

In other embodiments, other suitable modulation schemes may be used including, for example, pulse width modulation, pulse amplitude modulation, pulse density modulation, pulse code modulation, etc. In various embodiments these modulation schemes may be adapted to operate with a low duty cycle, thereby retaining the advantages described herein of having energy and power demands that may be met using devices and techniques of the described herein (e.g., ultracapacitor based pulsed power systems).

In various embodiments, as noted above, the modulator may be configured to implement any suitable encoding or data transmission schemes known in the art. Applicants have realized that statistics based encoding schemes are particularly suitable for use in noise environments found in typical drilling operations. For example, in various embodiments, various pieces of data to be sent are associated with random or pseudorandom sequences of numbers. To transmit a given piece of data, a signal modulated with the associated random signal as transmitted from the downhole transmitter. A topside receiver receives the transmission, combined with possible noise. The receiver uses statistical techniques (e.g., a least squares technique) to determine which of the random or pseudorandom sequences is most likely to correspond to the received signal. This "most likely" sequence is then used to determine the transmitted data.

In various embodiments, any of variety of such statistics based techniques known from the field of telecommunication may be used, e.g., linear prediction techniques such as code-excited linear prediction, vector sum excited linear prediction, algebraic code excited linear prediction, time division multiple access (e.g., of the type used in cellular communication standards such as GSM), code division multiple access, frequency division multiple access, orthogonal frequency division multiple assess, spread spectrum, frequency hoping spectrum, and the like.

In some embodiments, the EM telemetry system may include a topside receiver unit adapted for use with a high power short duration pulse transmission scheme, e.g., of the type described with reference to FIG. 8. For example, the topside receiver unit may include a clock synchronized with the downhole components of the system to allow for synchronous detection of the transmitted signal. For example, for the scheme shown in FIG. 8 above, the topside receiver unit may include a clock synchronized to the nominal period of the output pulse train. Accordingly, the topside receiver will know when to nominally expect the pulses, thereby easily determining the advance or delay of the pulses relative to the nominal period. However, it is to be understood that in other embodiments, non-synchronous detection may be used (e.g., by considering the relative time spacing between adjacent pulses in a pulse train).

In general, the top side receiver unit may include any suitable detectors, filters, amplifiers, demodulators, decoders, etc. for receiving and decoding the signal transmitted from the downhole environment. Some embodiments may include for example, lock-in amplifier based detections. In various embodiments, the top side receiver unit may be configured to filter out or compensate for multi-path interference, e.g., using techniques suitably adapted from the fields of RADAR, seismic imaging, or optical communication.

Topside Receiver

In various embodiments, telemetry systems of the type described herein may include a topside receiver having one or more sensors configured to detect a signal transmitted from a downhole EM telemetry device and decode telemetry information encoded on the signal. As further detailed below, the topside receiver may detect a signal using voltage detection schemes, current detection schemes, and combinations thereof.

As used herein, "topside" refers to a location at or near (e.g., within a few meters of) the surface of the earth. In some embodiments, all or portion of the topside receiver may be submerged (e.g., located at the ocean floor, or at the bed of a river or lake).

Figure 9:
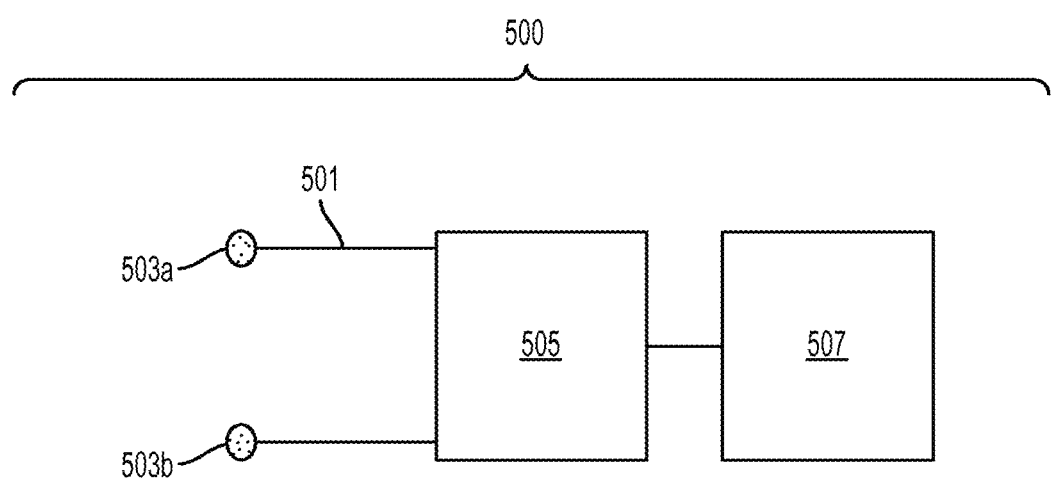
FIG. 9 is a schematic of a receiver device for use with the EM telemetry devices and systems disclosed herein.

Referring to FIG. 9, in an exemplary embodiment a topside receiver 500 is configured to receive a telemetry signal from a downhole EM telemetry device (e.g., device 100 shown in FIG. 1, above). The telemetry signal is transmitted, e.g., through a geological formation, to the receiver 500.

The receiver 500 includes a receiver antenna 501. As shown, the receiver antenna 501 includes a first electrode 503a and a second electrode 503b. However, it is to be understood that in various embodiments, any suitable number of electrodes may be used. For example, in some embodiments multiple electrodes may be arranged at various locations to capture more signal (e.g., electrical current) transmitted from the downhole telemetry device. In some embodiments, the use of multiple, spatially dispersed, electrodes allows for the detection of a spatial or temporal property of the transmitted signal, e.g., polarization, position of origin, time-of-flight, etc. Some embodiments may employ more than one antenna.

The receiver antenna 501 is configured to generate a signal in response to telemetry signal from the downhole EM telemetry device. In some embodiments, the telemetry signal will produce one or both of a time varying current input into one or both of the electrodes 503a and 503b, and a time varying voltage difference across the electrodes 503a and 503b. These time varying voltage and current are referred to herein the antenna signal voltage and antenna signal current, respectively.

The topside receiver 501 also includes a detector 505 operatively coupled to the antenna 501. The detector 505 is configured to detect at least one of an antenna signal current and an antenna signal voltage, as will be described in greater detail below. In some embodiments, the detector 505 may be a multi-mode detector that detects antenna signal current in a first mode, and an antenna signal voltage in a second mode. In various embodiments, the detector 505 may be switched from one mode to the other, e.g., manually by a user, or automatically (e.g., in response to a change in the detected signal, environmental conditions, etc.).

In some embodiments, the detector 505 may operate in multiple measurement modes simultaneously (e.g., simultaneous current measurement and voltage measurement, which may provide information indicative of the power of the transmitted signal).

The topside receiver 500 also includes a decoder 507 operatively coupled to the detector 505. The decoder 507 is configured to decode data encoded on the telemetry signal, e.g., based on the detected antenna signal current or antenna signal voltage. The decoder 507 may use any suitable technique to decode the detected signal. For example, some embodiments may implement any of the decoding schemes discussed herein, e.g., the short duration, high power scheme described above. In various embodiments, the decoder 507 may implement pulse width demodulation, pulse position demodulation, pulse amplitude demodulation, pulse frequency demodulation, pulse density demodulation, pulse code demodulation, frequency demodulation, amplitude demodulation, and combinations thereof.

In various embodiments, the modulator may be configured to implement any suitable encoding or data transmission schemes known in the art. Applicants have realized that statistics based encoding schemes are particularly suitable for use in noise environments found in typical drilling operations. For example, in various embodiments, various pieces of data to be sent are associated with random or pseudorandom sequences of numbers. To transmit a given piece of data, a signal modulated with the associated random signal as transmitted from the downhole transmitter. The topside receiver receives the transmission, combined with possible noise. The receiver uses statistical techniques (e.g., a least squares technique) to determine which of the random or pseudorandom sequences is most likely to correspond to the received signal. This "most likely" sequence is then used to determine the transmitted data.

A variety of such statistics based techniques known from the field of telecommunication may be used, e.g., linear prediction techniques such as code-excited linear prediction, vector sum excited linear prediction, algebraic code excited linear prediction, time division multiple access (e.g., of the type used in cellular communication standards such as GSM), code division multiple access, frequency division multiple access, orthogonal frequency division multiple assess, spread spectrum, frequency hoping spectrum, and the like.

In various embodiments, the topside receiver 500 cooperates with the downhole telemetry device 100 to detect and decode data encoded on the telemetry signal with a bit rate of at least 1 bit per second (bps), 2 bps, 3, bps, 4 bps, 5 bps, 6 bps, 7, bps, 8, bps, 9, bps, 10 bps, 15 bps, 20, bps, 25 bps, 30 bps, 35 bps, 40 bps, 45 bps, 50, bps, 60 bps, 70, bps, 80, bps, 90, bps, 100 bps, or more. For example, in embodiments where the downhole telemetry device 100 transmits with high output power (e.g., 1 kW, 2 kW or more) and/or a wide transmission bandwidth, the topside receiver 500 (e.g., featuring high performance detection schemes of the type described herein) may provide a transmission bit rate of greater than 100 bps, e.g., several hundred bps or 1 kbps or more, e.g., in the range of 1 bps to 10 kbps or any sub-range thereof.

In some embodiments, the receiver 500 is configured to receive data from the downhole telemetry device 100 over multiple transmission channels, e.g., at least two, three, four, five, ten, twenty, thirty, forty, fifty or more transmissions channels (e.g., in the range of 1 to 1,000 channels or any sub-range thereof, such as 2 to 5 channels, 2 to 10 channels, 3 to 5 channels, 3 to 10 channels, 3 to 20 channels, 5 to 10 channels, or 5 to 20 channels). For example each channel may correspond to a frequency band, as described above. In various embodiments, any suitable multichannel or multiplex transmission scheme may be used including, e.g., orthogonal frequency division multiplexing, frequency division multiplexing, time division multiplexing, code division multiplying, and combinations thereof.

In some embodiments, the topside receiver 500 and downhole telemetry device 100 cooperate to provide a data transmission channel, e.g., with the performance characteristics described herein, when the downhole EM telemetry device is transmitting from at depths of up to 100 m, 500 m, 1 km, 2 km, 3 km, 4 km, 5 km, 10 km, 15 km, or more, e.g., in the range of about 0 to 50 km or any sub-range thereof such as 0 to 1 km, 0 to 5 km, 0 to 10 km, and 0 to 15 km).

In some embodiments, the topside receiver 500 can detect and decode a small signal, even in the presence of significant noise (e.g., the types of electromagnetic interference generated during downhole drilling operations). The signal to noise power ratio $SNT_P$ may be calculated as:

$$SNT_P = 10\log_{10}\left(\frac{P_{signal}}{P_{noise}}\right),$$

where $P_{signal}$ is the power of the signal at the detector and $P_{noise}$ is the power of the noise at the detector. Similarly the signal to noise amplitude ration $SNT_A$ may be calculated as $$SNT_A = 10\log_{10}\left(\frac{A_{signal}^2}{A_{noise}^2}\right),$$

where $A_{signal}$ is the amplitude of a quantity related to the signal (e.g., antenna signal current or voltage). and $A_{noise}$ is the amplitude of the corresponding quantity for the noise (e.g., current noise or voltage noise). In various embodiments the topside receiver may reliable detect the signal even when the $SNT_P$ and/or $SNT_A$ is less than about 0 dB, −10 dB, −20 dB, −30 bB, −40 dB, −50 dB, −60 dB, −70 dB, −80 dB, −90 dB, −100 dB, −120 dB, −130 dB, −140 dB, −150 dB, −160 dB, −180 dB, −190 dB, −200 dB, or less e.g., in the range of 0 dB to −200 dB or any subrange thereof, such as 0 dB to −100 dB, or 0 dB to −120 dB.

In various embodiments, the detector 505 may exhibit a high level of sensitivity. For example, in some embodiments the detector 505 may be sufficiently sensitive to detect an antenna signal current with an amplitude of 10 A or less, 1 A or less, 0.1 A or less, 0.01 A or less, 1 mA or less, 0.1 mA or less, 0.01 mA or less, 1 pA or less, 0.1 pA or less, 0.01 pA or less, 1 nA or less, 0.1 nA or less, 0.01 nA or less, or 1 pA or less, e.g., in the range of 1 pA to 10 A or any sub-range thereof, such as 1 pA to 1 nA, 1 nA to 1 μA, 1 μA to 1 mA, 1 mA to 1 A. The antenna signal current may be oscillating or otherwise time varying (e.g., sharply pulsed). In such cases the foregoing sensitivity levels may be realized for any suitable parameter indicative of current amplitude e.g. a peak amplitude, time average amplitude, sinusoidal amplitude, or other suitable quantity).

In some embodiments the detector 505 may be sufficiently sensitive to detect an antenna signal voltage with an amplitude of 10 V or less, 1V or less, 0.1 V or less, 0.01 V or less, 1 mV or less, 0.1 mV or less, 0.01 mV or less, 1 μV or less, 0.1 μV or less, 0.01 μV or less, 1 nV or less, 0.1 nV or less, 0.01 nV or less, or 1 μV or less, e.g., in the range of 1 μV to 10 V or any sub-range thereof, such as 1 μV to 1 nV, 1 nV to 1 μV, 1 μV to 1 mV, 1 mV to 1 V. The antenna signal voltage may be oscillating or otherwise time varying (e.g., sharply pulsed). In such cases the foregoing sensitivity levels may be realized for any suitable parameter indicative of voltage amplitude e.g. a peak amplitude, time average amplitude, sinusoidal amplitude, or other suitable quantity).

In some embodiments the detector 505 may be sufficiently sensitive to detect an antenna signal power with an amplitude of 10 W or less, 1 W or less, 0.1 W or less, 0.01 W or less, 1 mW or less, 0.1 mW or less, 0.01 mW or less, 1 μW or less, 0.1 μW or less, 0.01 μW or less, 1 nW or less, 0.1 nW or less, 0.01 nW or less, or 1 μW or less, e.g., in the range of 1 μW to 10 W or any sub-range thereof, such as 1 μW to 1 nW, 1 nW to 1 μW, 1 μW to 1 mW, 1 mW to 1 W. The antenna signal power may be oscillating or otherwise time varying (e.g., sharply pulsed). In such cases the foregoing sensitivity levels may be realized for any suitable parameter indicative of power amplitude e.g. a peak amplitude, time average amplitude, sinusoidal amplitude, or other suitable quantity).

In various embodiments, the detector 505 is configured to detect signals with the foregoing sensitivity levels even in the presence of significant noise, e.g., characterized by signal to noise rations $SNT_P$ and/or $SNT_A$ as set forth above.

In various embodiments, the detector 505 can detect a signal, e.g., the antenna signal current or antenna signal voltage, over a broad range of frequencies. In some embodiments, the detector is configured to detect the antenna signal current or the antenna signal voltage at frequencies in the range of about 0.5 Hz to about 100 Hz or any sub-range thereof, e.g., about 0.5 Hz to about 50 Hz, about 0.5 Hz to about 30 Hz, about 1 Hz to about 100 Hz, about 1 Hz to about 50 Hz, about 1 Hz to about 30 Hz, about 5 Hz to about 100 Hz, about 5 Hz to about 50 Hz, about 5 Hz to about 30 Hz. In some embodiments, (e.g., where the high frequency attenuation of the signal through the earth is relatively low, or where very high output power is available at the downhole telemetry device) the detector 505 may be configured to detect signals at even higher frequencies, e.g., greater than 100 Hz, 200 Hz, 300 Hz, 400 Hz, 500 Hz, 1 kHz, or more In various embodiments, the detector 505 may have a large detection bandwidth. In some embodiments the detector is configured to detect a signal, e.g., the antenna signal current or the antenna signal voltage, with a detection bandwidth of about 5 Hz or more, about 10 Hz or more, about 30 Hz or more, about 50 Hz or more, about 100 Hz or more, e.g., in the range of 1 to 1,000 Hz or any sub-range thereof.

In some cases, the environment of the topside receiver may include many sources of electromagnetic interference. For example, in downhole drilling applications, one may expect the presence of various electrical generators, motors (e.g., a drill too drive motor), numerous cables and other conductive objects that may carry spurious currents, etc. One common type of interference is AC mains hum at a mains base frequency (e.g., at 50 Hz or 60 Hz) and harmonics thereof. Another common type of interference is electromagnetic pick up from the drive motor of a drilling tool, which may be a frequency of a drill rotation rate (e.g., 1 Hz for a drill rotation rate of 60 rotations per minute) and harmonics thereof. Further, the environment may be such that it is difficult to provide reliable grounding for the topside receiver, exacerbating the foregoing interference types through ground loop pick up and leading to common mode noise in the detection circuit.

In view of this, the topside receiver 500, and particularly the detector 505 may implement various techniques described herein to reduce or eliminate undesirable noise and interference.

For example, in some embodiments, the topside receiver 500 may have an isolated ground. The isolated ground may provide a ground return with noise reduced or substantially eliminated. The isolated ground may be separate from the equipment grounding return of the receiver 500, where equipment grounding includes, e.g., metal enclosures and the like that contain the wiring and must be grounded to provide a safe return path in case of fault currents.

In some embodiments, the isolate ground provides an insulated, separate ground path for the ground reference in in the receiver 500, and may help eliminate the potential for a ground loop. The isolated ground may be insulated and separate all the way from the receiver 500 to a power supply. In some embodiment, the power supply may be a dedicated power supply that provides power only to the topside receiver 500, and is not connected to other equipment such as a drilling tool drive motor. For example, in some embodiments the dedicated power supply may include a battery, a dedicated generator, or a dedicated AC mains line.

In some embodiments, the dedicated power supply may include a low noise, linear, isolated AC to DC power supply. In some embodiments, the power supply may provide a wide range of output voltages, e.g., +/−24 V. In some embodiments, the output of the power supply may be regulated down to lower voltages (e.g., +/−16.5 V) to further reduce noise.

In some embodiments, a low noise power supply, e.g., full AC-DC-AC uninterrupted power supply, with isolation, may be used to power all equipment (e.g., computers, displays, oscilloscopes, analyzers, etc.) connected to the detector 505.

As described in greater detail below, the topside receiver 500 may include one or more filters configured to attenuate or eliminate noise, e.g., from electromagnetic interference. In some embodiments the filter may include an ultracapacitor. The ultracapacitor may be, e.g., a high frequency ultracapacitor having a cutoff frequency greater than about 10 Hz, 20 Hz, 30 Hz, 30 Hz, 40, Hz, 50 Hz, or more, e.g., in the range of 10 Hz to 100 Hz or any sub-range thereof. In some embodiments the high frequency ultracapacitor may be of the type described in, e.g., U.S. Provisional Patent No. 61/919,692 filed Dec. 20, 2013, the entire contents of each of which are incorporated herein by reference. As described in greater detail below, the filter may be well balanced differential filters with a high degree of common mode noise rejection.

In general, the detector 505 of the topside receiver 500 may employ a differential detection scheme, e.g., to reduce or eliminate common mode noise. For example, the detector 505 may receive a double-ended input signal from the antenna 501, and detect a differential quantity (e.g., a difference between input currents from each of the electrodes 503a and 503b, or a different in input voltages from each of the electrodes 503a and 503b).

In some embodiments, the input signal may be a bipolar signal. In some embodiments, the detector 505 may include one or more differential amplifiers.

In some embodiments, the differential amplifier may employ multiple operational amplifiers each having differential input and single ended output (e.g., a paired inverting amplifier and non-inverting amplifier). In some embodiments, the multiple operational amplifiers may be implemented in a single monolithic package, e.g., to reduce the number of external connections that may pick up electromagnetic interference.

In some embodiments, the differential amplifier may employ one or more fully differential amplifier devices having differential input and differential output. In some embodiments, some or all of the fully differential amplifier devices may be implemented in a single monolithic package, e.g., to reduce the number of external connections that may pick up electromagnetic interference.

In some embodiments, the differential amplifier may preferentially amplify a differential signal, while attenuating noise in the common mode. For example, the differential amplifier may have a common mode rejection ratio (CMRR) defined as $$CMRR = 10\log_{10}\left(\frac{A_{diff}^2}{A_{common}^2}\right),$$

where $A_{diff}$ is the differential gain of the amplifier and $A_{common}$ is the common mode gain of the amplifier. In some embodiments, the differential amplifier may have a CMRR greater than 10 dB, 20 dB, 30 bB, 40 dB, 50 dB, 60 dB, 70 dB, 80 dB, 90 dB, 100 dB, 120 dB, 130 dB, 140 dB, 150 dB, 160 dB, 180 dB, 190 dB, 200 dB, or more e.g., in the range of 10 dB to 200 dB or any sub-range thereof. In some embodiments, the amplifier may exhibit the foregoing CMRR over a wide range of frequencies, e.g., from 0 Hz (DC) to 100 Hz, 500 Hz, 1 kHz, or more.

Figure 10:
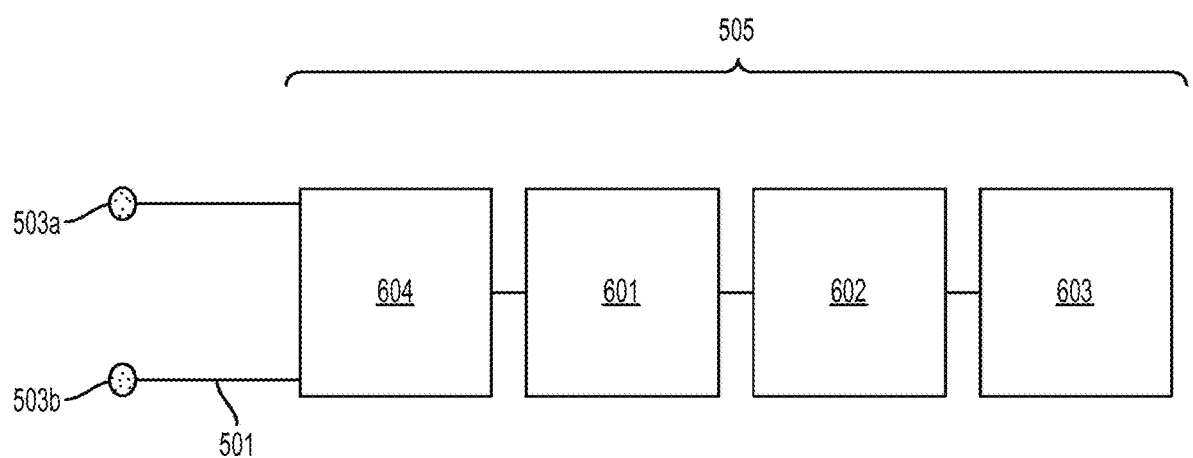
FIG. 10 is a schematic of a detector for use with the EM telemetry devices and systems disclosed herein.

FIG. 10 shows an exemplary embodiment of the detector 505. The detector 505 includes a preamplifier 601 having an input coupled to the receiver antenna 501. In some embodiments, a primary filter 602 is coupled to the output of the preamplifier 601, and configured to filter the preamplified signal from the preamplifier 601, as detailed below. In some embodiments, an optional prefilter 604 may be placed before the preamplifier 601, e.g., to help prevent saturation of the preamplifier.

In some embodiments, a primary amplifier 603 is coupled to the primary filter 602. The primary amplifier 603 is configured to further amplify the filtered preamplifier signal. Each of the components of the detector 505 will be discussed in greater detail below.

It is to be understood that in various embodiments, more or fewer amplifier or filter stages may be used, as appropriate for the application at hand. For example, in some embodiments where voltage sensing is used, the preamplifier 601 may be omitted. Also, while one detector 505 is shown, in some embodiments, multiple detectors 505 may be used (e.g., a first detector for current based detection and a second detector for voltage based detection).

In some embodiments, at least one of the preamplifier 601 and the primary amplifier 603 is a differential amplifier. In some embodiments, both of the preamplifier and the primary amplifier are differential amplifiers. In some embodiments where the detector 505 includes additional amplifiers, some or all of the additional amplifiers may be differential amplifiers.

Figure 11A:
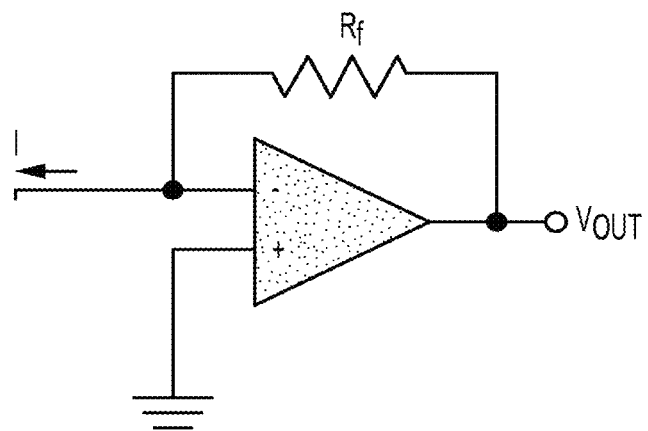
FIGS. 11A-11D show exemplary amplifier circuits for use in a detector for use in EM telemetry devices and systems disclosed herein.
Figure 11B:
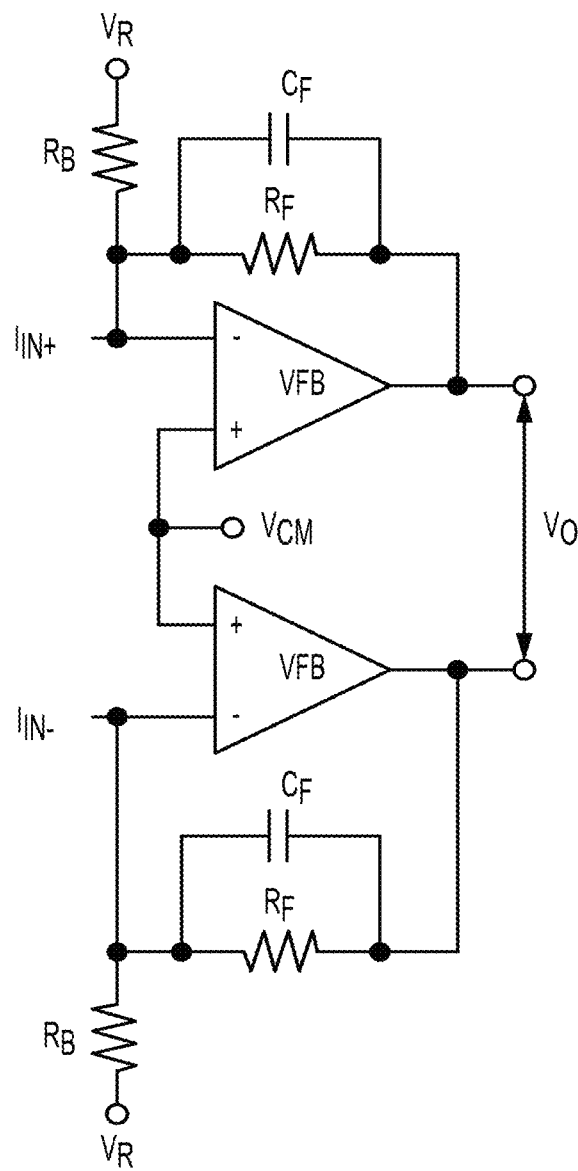
Figure 11C:
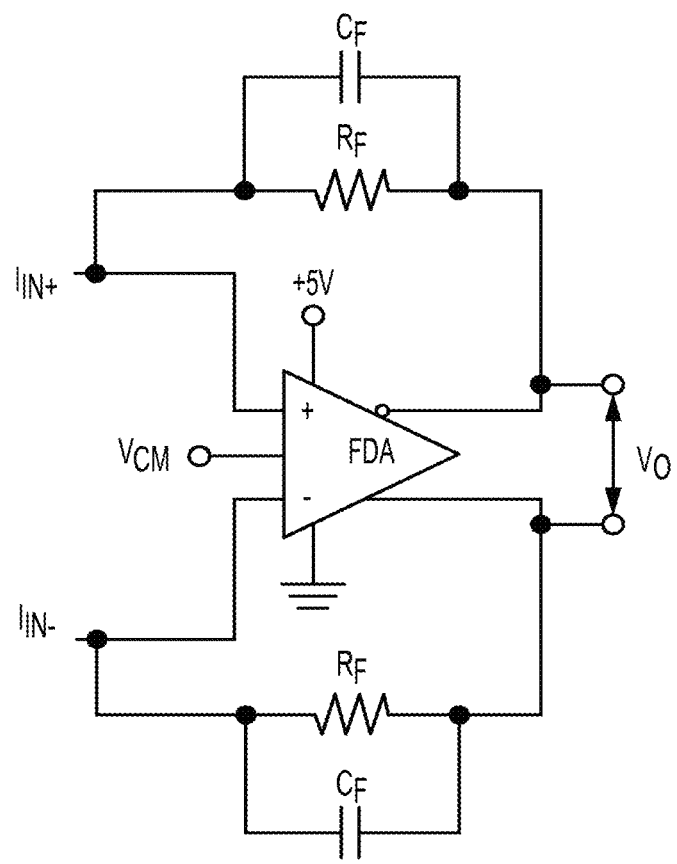
Figure 11D:
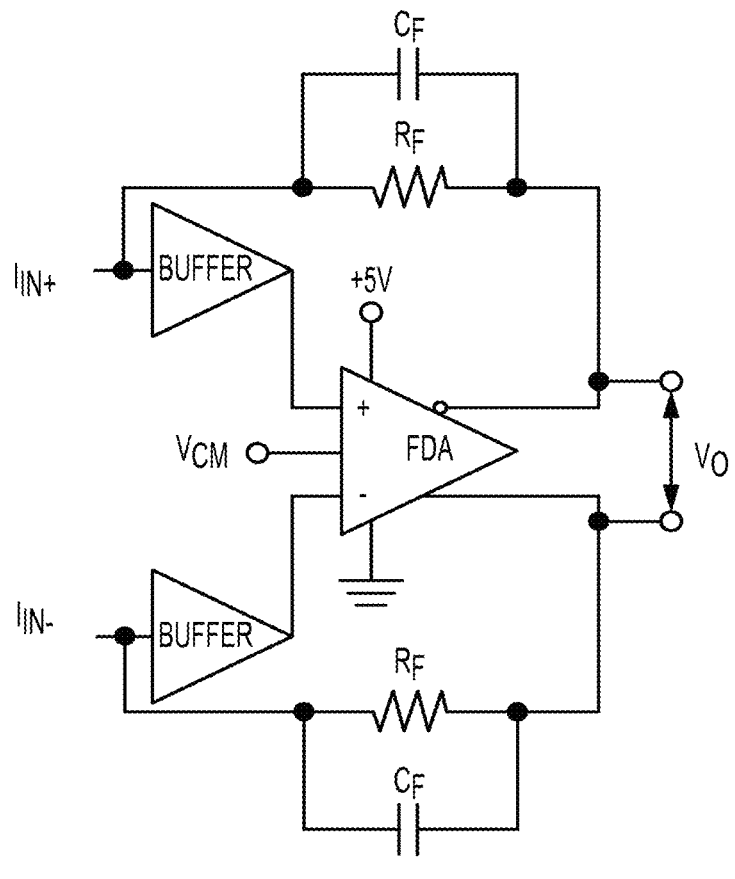
Figure 11D:
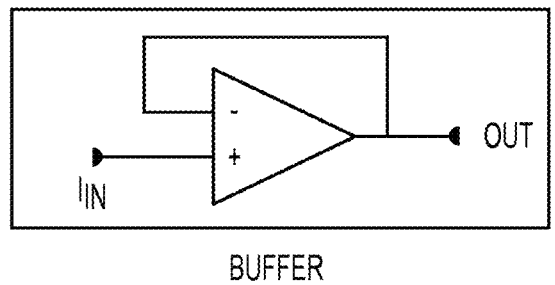

FIGS. 10B to 10D show exemplary embodiments of differential transimpedance amplifiers (e.g., suitable for use as the preamplifier 601 when detecting an antenna signal current, as described below). FIGS. 11B-11D show exemplary embodiments of differential voltage amplifiers (e.g., suitable for use as the preamplifier 601 when detecting an antenna signal voltage, as described below, or for use as the primary amplifier in either current or voltage sensing schemes).

As noted above, in various embodiments, the detector 505 may be configured to sense an antenna signal current or an antenna signal voltage. The choice of sensing scheme may depend on a number of factors, e.g., the resistive properties of the load of the detector. In typical embodiments, the resistive properties of the load will be determine primarily by the nature the media separating the downhole telemetry device from the topside receiver. Another factor includes, e.g., the input impedance of the detector 505.

In some embodiments, current sensing may be used when the load resistance is relatively high, and voltage sensing used when the load resistance is relatively low.

For typical embodiments, when current sensing is used, the receiver is configured to have low input impedance (e.g., less than 50Ω, 10Ω, 5Ω, 1Ω, 100 mΩ, 10 mΩ, 1 mΩ or less) as low noise as possible, high common mode rejection, and high current limit protection (e.g., up to +/−250 V). The receiver may include input shielding, e.g., a cylindrical conductive shield surrounding one or more input leads from the electrodes 503), e.g., tied to local ground. In some embodiments, common mode noise may be extracted and fed back to a shield driver (e.g., and op-amp based driver) that adjusts the voltage of shield the to further cancel noise. The receiver may feature buffered output with bandpass filtering (e.g., to remove low and/or high frequency noise) prior to further signal processing.

In embodiments where current sensing used, the preamplifier 601 may be a transimpedance amplifier (TIA) that convers an input current to an output voltage. In various embodiments, the TIA may include an operational amplifier having a feedback resistor between an output of the operational amplifier and an inverting input of the operational amplifier, e.g., as shown in FIG. 11A In some embodiments, the TIA may also include a feedback capacitor in parallel with the feedback resistor to control the stability and bandwidth of the amplifier (e.g., as shown in FIGS. 11B-11D).

In some embodiments, e.g., the TIA may be a differential amplifier that convers an input current differential to an output voltage (e.g., as shown in FIG. 11B) or an output voltage differential (as shown in FIGS. 11C and 11D).

For example, FIG. 11B shows a differential TIA that employs two operational amplifiers (each labeled VFB) each having differential input and single output. Each operational amplifier receives a respective input current $I_{in+}$ and $I_{in-}$ (e.g., from electrodes 503a and 503b, respectively) at its inverting input. The non-inverting input of both operational amplifiers is held at a common voltage. Each operational amplifier has a feedback resistor connected between its output and its inverting input. The voltage difference $V_o$ between the outputs of the operation amplifiers will be proportional to the difference between the input currents such that $$V_o = A_{diff}(1_{in+} - 1_{in-}).$$

where $A_{diff}$ is the differential gain of the TIA. The feedback loop for each operational amplifier includes a feedback capacitor in parallel with the feedback resistor to control the stability and bandwidth of the amplifier.

In some embodiments, both of the operational amplifiers and, optionally, some or all of the associated resistors or other circuit elements, may be implemented in a single monolithic package, e.g., to reduce the number of external connections that may pick up electromagnetic interference, reduce or eliminate resistor mismatch issues, etc.

FIG. 11C shows a differential TIA that employs a single fully differential amplifier (FDA) having differential inputs and differential outputs. The FDA receives input current $I_{in+}$ and $I_{in-}$ at its non-inverting input and inverting input, respectively. A first feedback resistor is connected between a first output of the FDA and its non-inverting input A second feedback resistor is connected between a second output of the FDA and its inverting input. The voltage difference $V_o$ between the first and second outputs of the FDA will be proportional to the difference between the input currents such that $$V_o = A_{diff}(i_{in+} - i_{in-}).$$

where $A_{diff}$ is the differential gain of the TIA. As shown, each feedback loop of the FDA includes a feedback capacitor in parallel with the feedback resistor to control the stability and bandwidth of the amplifier.

In some embodiments, the FDA and, optionally, some or all of the associated resistors or other circuit elements, may be implemented in a single monolithic package, e.g., to reduce the number of external connections that may pick up electromagnetic interference, reduce or eliminate resistor mismatch issues, etc.

It is to be understood that the amplifier circuits shown in FIGS. 11A-11C are exemplary only, and include additional components or modifications. For example, FIG. 11D shows a TIA similar to that shown in FIG. 11C, but with the addition of an input buffer located before each input to the FDA. As shown in the inset, each of the input buffers may include an operational amplifier configured as a unity gain input buffer by shorting the output of the operational amplifier with its inverting input. In some embodiments the operational amplifiers used for the input buffers may be selected to have desirable input characteristics such a low input current noise rating and/or high input impedance. In some such embodiments the use of the buffers may relax the requirements for the FDA (e.g., the input current noise rating or input impedance of the FDA) without sacrificing overall performance of the amplifier.

In some embodiments, both of the input buffer operational amplifiers may be implemented in a single monolithic package, e.g., to reduce the number of external connections that may pick up electromagnetic interference.

In various embodiments, the preamplifier 601 may include any other type of current to voltage amplifier. For example, various embodiments may adapt current to voltage amplifiers of the types used to measure small currents, e.g., output currents from photodiodes operating in the photovoltaic mode, output currents from photomultiplier tubes, and the like. Exemplary amplifiers include the Models 181, 5182, 5184, and 5186 current preamplifiers available from Signal Recover of Oak Ridge, TN In typical embodiments, when voltage sensing is used, the receiver is configured to have high input impedance (e.g., greater than about 100 kΩ, 1 MΩ, 5 MΩ, 10 MΩ, 100 MΩ, 1 GΩ, or more, e.g., in the range of 100 kΩ to 1 GΩ or any sub-range thereof), as low noise as possible, high common mode rejection, and high current limit protection (e.g., up to +/−250 V). The receiver may include input shielding, e.g., a cylindrical conductive shield surrounding one or more input leads from the electrodes 503), e.g., tied to local ground. In some embodiments, common mode noise may be extracted and fed back to a shield driver (e.g., and op-amp based driver) that adjusts the voltage of shield the to further cancel noise. The receiver may feature buffered output with band-pass filtering (e.g., to remove low and/or high frequency noise) prior to further signal processing.

In some embodiments, all equipment connected to the detector 505 (e.g., post-amplifiers, output boxes, etc.) may be configured to avoid shunt resistances that reduce the overall input impedance of the detector 505.

Figure 12A:
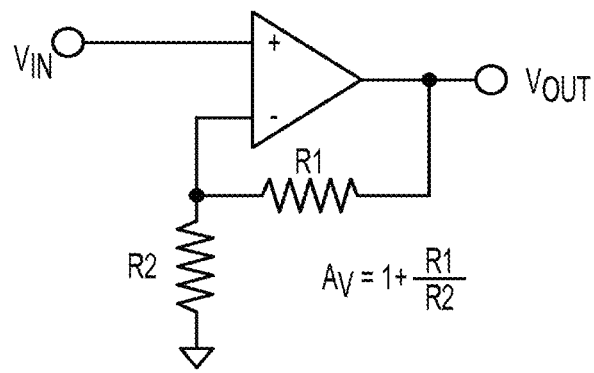
FIGS. 12A-12D show exemplary current amplifier circuits for use in a detector for use in EM telemetry devices and systems disclosed herein.
Figure 12A:
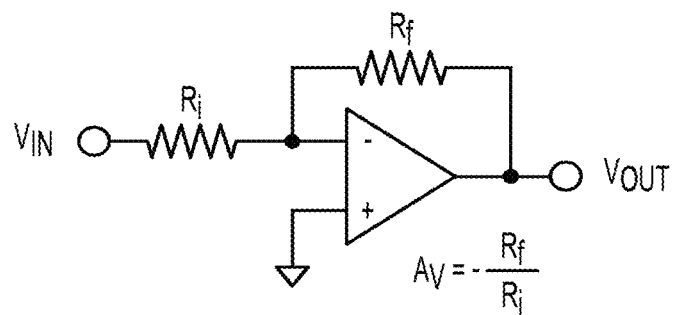

In some embodiments where voltage sensing is desired, the preamplifier 601 may include one or move voltage feedback amplifiers. In some embodiments, the voltage feedback amplifier may employ one or more operational amplifiers each having differential input and single output. For example, FIG. 12A shows exemplary implementations of an inverting voltage feed-back amplifier (top) and a non-inverting voltage feedback amplifier (bottom), suitable for use with a single ended input voltage signal. In each case, the input voltage Vin may be received from one of electrodes 503a or 503b, while the other electrode is connected to a ground return.

Figure 12B:
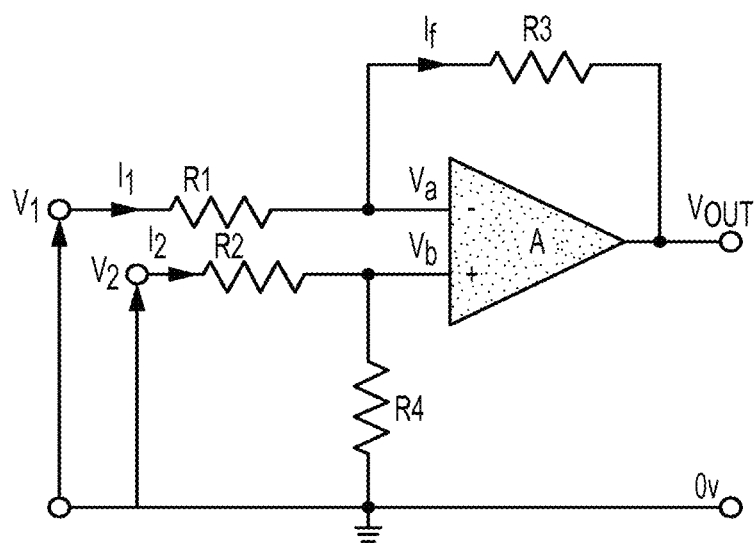

In some embodiments, (e.g., where ground or common mode noise is an issue) the voltage feedback amplifier may be a differential amplifier. For example, FIG. 12B shows an implementation of a differential voltage amplifier using a single operational amplifier having differential inputs and a single output Each input of the operation amplifier receives a respective input voltage $V_1$, $V_2$ (e.g., from electrodes 503a and 503b, respectively). A feedback resistor is connected between the output and the inverting input of the operational amplifier. A gain setting resistor is connected between the non-inverting input of the operational amplifier and ground return. The output of the amplifier will be proportional to the voltage differential $V_1-V_2$.

Figure 12C:
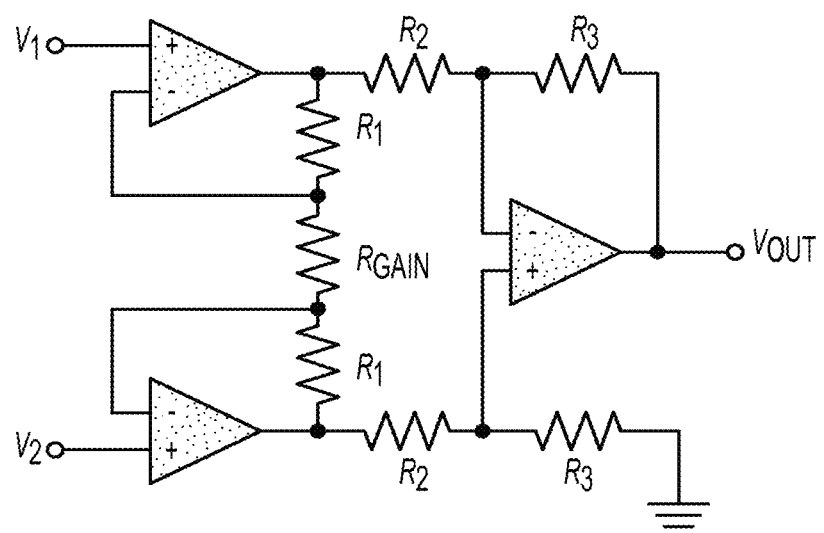

FIG. 12C shows an embodiment of a differential voltage amplifier featuring three operation amplifiers, each having differential input and a single output. Two of the operational amplifiers (leftmost) each having a feedback resistor $R_1$ act is input buffers, and a third operation amplifier (rightmost) produces a desired output Each of the buffer amplifiers receives an respective input voltage $V_1$, $V_2$ (e.g., from electrodes 503a and 503b, respectively). In response the rightmost amplifier produces an output voltage proportional to the different between the input voltages such that $$\frac{V_{out}}{V_2 - V_1} = \left(1 + \frac{2R_1}{R_{gain}}\right)\frac{R_3}{R_2}.$$

The rightmost amplifier, along with the resistors labelled $R_2$ and $R_3$ is arranged similarly to the differential voltage amplifier shown in FIG. 11B. The two amplifiers on the left are unity gain buffers. The use of the a single resistor $R_{gain}$ between the two inverting inputs of the leftmost amplifiers increases the differential-mode gain of the buffer pair while leaving the common-mode gain equal to 1. This increases the common-mode rejection ratio (CMRR) of the circuit and also enables the buffers to handle much larger common-mode signals without clipping than would be the case if they were separate and had the same gain. Another benefit of this arrangement is that it boosts the gain using a single resistor rather than a pair, thus avoiding a resistor-matching problem and very conveniently allowing the gain of the circuit to be changed by changing the value of a single resistor. A set of switch-selectable resistors or even a potentiometer can be used for $R_{gain}$, providing easy changes to the gain of the circuit, without the complexity of having to switch matched pairs of resistors.

In some embodiments, both of the input buffer operational amplifiers and the output operational amplifier, along with some or all of the resistor elements may be implemented in a single monolithic package, e.g., to reduce the number of external connections that may pick up electromagnetic interference, to reduce resistor mismatch issues, etc.

Exemplary differential voltage amplifiers exhibiting advantageous common-mode rejection include models AD8221, AD8129, and AD8130, available from Analog Devices, Inc. of Norwood, MA In some embodiments, the differential amplifier voltage may employ a fully differential amplifiers having differential input and differential output. In some embodiments, one or more fully differential amplifiers may be implemented in a single monolithic package, e.g., to reduce the number of external connections that may pick up electromagnetic interference.

Figure 12D:
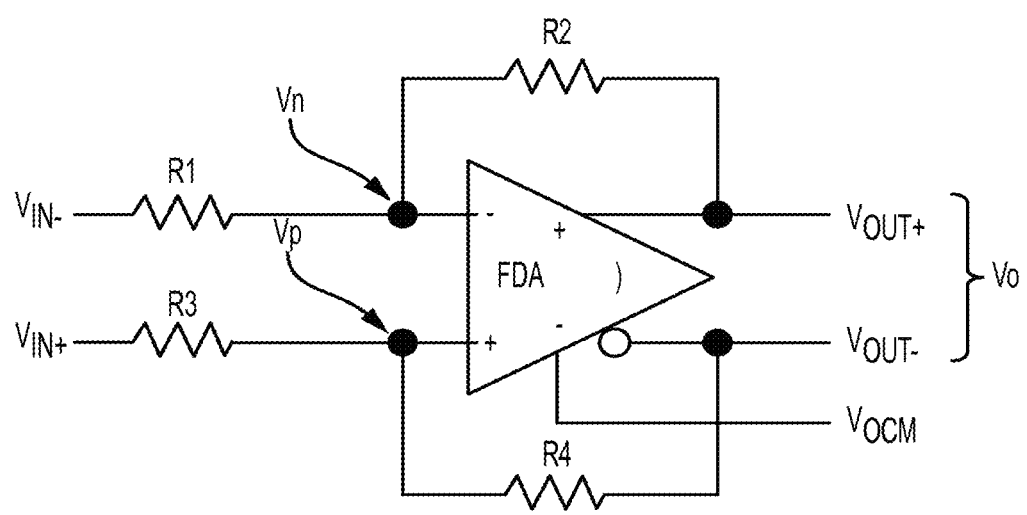
Figure 13:
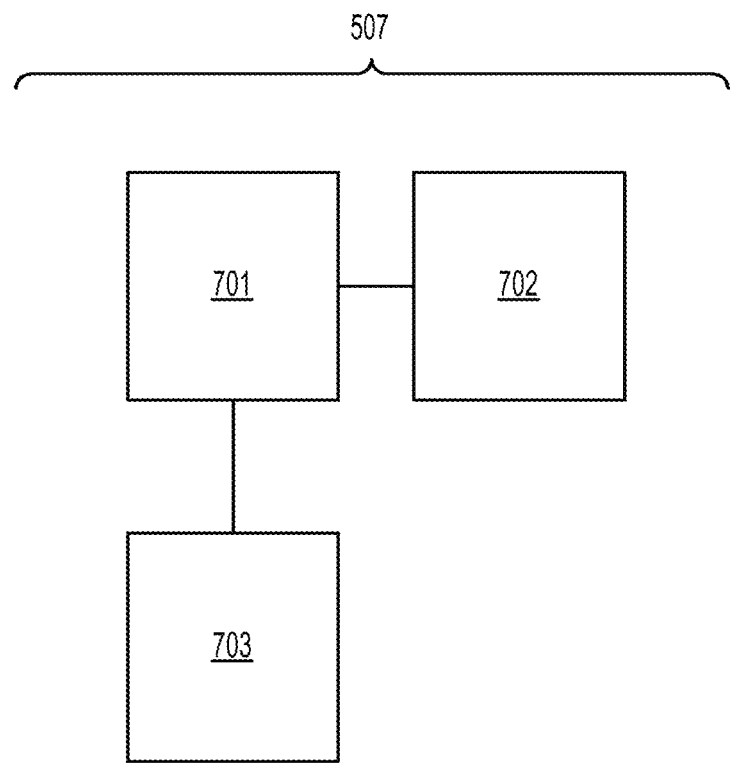
FIG. 13 is a schematic of a decoder for use in a receiver for the EM telemetry devices and systems disclosed herein.

FIG. 12D shows an embodiment of a differential voltage amplifier featuring a fully differential amplifier (FDA), having differential input and a differential output. The FDA receives input voltages $V_{IN+}$ and $V_{IN-}$ (e.g., from electrodes 503a and 503b) through resistors $R_1$ and $R_3$ at its non-inverting input and inverting input, respectively. A first feedback resistor $R_2$ is connected between a first output of the FDA and its non-inverting input. A second feedback resistor $R_4$ is connected between a second output of the FDA and its inverting input. The voltage difference $V_0$ between the first and second outputs of the FDA will be proportional to the difference between the input currents such that $$V_o = A_{diff}(V_{IN+} V_{IN-}).$$

where $A_{diff}$ is the differential gain of the amplifier.

In some embodiments, the FDA, possibly along with some or all of the resistor elements may be implemented in a single monolithic package, e.g., to reduce the number of external connections that may pick up electromagnetic interference, to reduce resistor mismatch issues, etc.

In various embodiments, the preamplifier 601 may include any other suitable type of voltage amplifier. For example, various embodiment may adapt voltage amplifiers of the types used to measure small voltages, e.g., in the field of scientific instrumentation. An exemplary voltage amplifiers includes the Model 5113 voltage preamplifier available from Signal Recover of Oak Ridge, TN In various embodiments, the operational amplifiers and/or fully differential amplifier devices used in the circuits described herein may be selected to have desirable characteristics such as low input current noise density, low input voltage noise density, high CMRR (as described above), high gain, high bandwidth, and combinations thereof. For example, in some embodiments the devices are rated with input current noise density of less than 100 nA/√Hz, 10 nA/√Hz, 1 nA/√Hz, 100 pA/√Hz, 10 pA/√Hz, 1 pA/√Hz, 100 fA/√Hz, 10 fA/√Hz, 1 fA/√Hz, or less, e.g., in the range of 100 nA/√Hz to 1 fA/√Hz or any sub-range thereof. In some embodiments the devices are rated for input voltage noise density of 10 mV/√Hz, 1 mV/√Hz, 100 nV/√Hz, 10 nV/√Hz, 1 nV/√Hz, 100 pV/√Hz, 10 pV/√Hz, 1 pV/√Hz, 100 fV/√Hz, 10 fV/√Hz, 1 fV/√Hz, e.g., in the range of 10 mV/√Hz to 1 fV/√Hz or any sub-range thereof.

Exemplary low noise operational amplifiers include Models AD8610 and AD8620 available from Analog Devices, Inc. of Norwood, M or Models LT6236, LT6237, and LT6238A available from Liner Technology of Milpitas, CA Exemplary low noise fully differential amplifiers include Model AD8132 available from Analog Devices, Inc. of Norwood, MA and Model THS4140 available from Texas Instruments of Dallas, TX.

In some embodiments, a prefilter 604 may be used to filter the signal from the antenna 501 prior to being input to the detector 505, e.g., at the preamplifier 601. In some embodiments the prefilter 604 may be a bandpass filter having one or more passbands corresponding to frequencies of interest (e.g., the transmission frequencies of the downhole telemetry device). In some embodiments, the prefilter 604 may reduce or eliminate saturation of the preamplifier 601 (e.g., due to high amplitude noise at frequencies outside of the frequencies of interest).

In some embodiments, the prefilter 604 may include only passive elements (e.g., resistors, capacitors, inductors, transformers, and diodes). In some embodiments, the prefilter 604 may include active elements (operation amplifiers, differential amplifiers, etc.), e.g., in addition to passive elements.

In some embodiments, it is desirable that the filter exhibit high dynamic range, in order to avoid signal loss. In some embodiments, the dynamic range of the prefilter is at least 60 dB, 90 dB, 120 dB, 150 dB, 180 dB, 200 dB or more, e.g., in the range of 60 dB to 200 dB, or any sub-range thereof.

In some embodiments, the primary filter 602 filters the output of the preamplifier 601 prior to input into the primary amplifier 603. The primary filter 602 may be configured to pass signals in one or more passbands corresponding to frequencies of the telemetry signal and attenuate or block signals in at least one stopband corresponding to frequencies of a noise source.

For example, when the noise source is a drive motor for a downhole drilling tool associated with the downhole telemetry device, a narrow stopband may be provided at one or more associated frequencies. For example, if the drive motor runs at 60 rotations per second, a narrow stop band may be provided around 1 Hz (e.g., from 0.5 Hz to 1.5 Hz), and, optionally, at harmonics thereof.

In some embodiments the stop band around a noise frequency may be narrow, so as to avoid unnecessary signal loss. For example, in some embodiments, the stopband has a width of less than 10 dB, 5 dB, 3 dB, 2 dB, 1 dB, 0.5 dB, 0 dB, −0.5 dB, −1 dB, −2 dB, −3 dB, −5 dB, −10 dB or less, where the bandwidth is calculated as $$Width_{dB} = 20\log_{10}\left(\frac{f_{max} - f_{min}}{f_{center}}\right),$$

where $f_{max}$ is the maximum frequency, $f_{min}$ is the minimum frequency, and $f_{center}$ is the center frequency of the stopband. The maximum and minimum frequencies are taken at the −3 dB attenuation points. For example, in some embodiments, the stopband has an absolute width of less than 10 Hz, less than 5 Hz, less than 3 Hz, less than 2 Hz, less than 1 Hz, less than 05. Hz or less, e.g. in the range of 0.1 to 10 Hz or any sub-range thereof.

In some embodiments, the one or more passbands of the primary filter 602 may be bracketed by stop bands at lower and higher frequencies, e.g., to reduce or eliminate near-band noise interference.

In some embodiments, the primary filter 602 may include a low pass filter to attenuate or eliminate high frequency noise at frequencies above those transmitted by the downhole telemetry device. In some embodiments, the primary filter 602 may include a high pass filter to attenuate or eliminate low frequency noise (e.g., 1/f noise) at frequencies below those transmitted by the downhole telemetry device.

In various embodiments, the primary filter 602 may include one or more analog filters. The primary filter 602 may include any of Butterworth, Chebyshev, Elliptic, and Bessel filters. In some embodiments, the primary filter 602 may include one or more high order filters, e.g., $2^{nd}$, $3^{rd}$, $4^{th}$, $5^{th}$, $6^{th}$, $7^{th}$, $8^{th}$, $9^{th}$, $10^{th}$ and higher order filters. I various embodiments any suitable filter topology may be used, e.g., a Sallen-Key topology.

In various embodiments, some or are all of the filter components of the primary filter 602 may be fully differential, and may exhibit high common mode noise rejection. In some embodiments, the primary filter 602 may have a CMRR greater than 10 dB, 20 dB, 30 bB, 40 dB, 50 dB, 60 dB, 70 dB, 80 dB, 90 dB, 100 dB, 120 dB, 130 dB, 140 dB, 150 dB, 160 dB, 180 dB, 190 dB, 200 dB, or more e.g., in the range of 10 dB to 200 dB or any sub-range thereof. In some embodiments, the amplifier may exhibit the foregoing CMRR over a wide range of frequencies, e.g., from 0 Hz (DC) to 100 Hz, 500 Hz, 1 kHz, or more.

In various embodiments, the primary filter 602 may be implemented using operational amplifiers, fully differential amplifiers, and combinations thereof, (including the low noise devices described above with reference the preamplifier 601) in combination with inductors and/or capacitors. Examples of filters constructed using fully differential amplifiers may be found, e.g., in B. Carter, A differential Op-Amp Circuit Collection, Texas Instruments 2001 (available at http://www.ti.con/lit/an/sloa064/sloa064.pdf, accessed Oct. 19, 2014) the entire contents of which are incorporated by reference.

In some embodiments, some or all of the operational amplifier, fully differential amplifier, resistor, capacitor, inductor, and other elements of the primary filter may be implemented in one or more monolithic packages, e.g., to reduce the number of external connections that may pick up electromagnetic interference, to reduce resistor mismatch issues, and the like.

In various embodiments, the primary amplifier 603 further amplifies the signal from the preamplifier 601. In various embodiments, the primary amplifier may be a low noise voltage amplifier, e.g., of the type described above with respect to voltage sensing preamplifiers.

In various embodiments the primary amplifier 603 may include any suitable amplifier type. For example, in some embodiments, the primary amplifier 603 may be adapted from an amplifier of the type used in precision audio amplification. For example, in some embodiments, the primary amplifier 603 may be a class D amplifier (e.g., of the type described above for use in the downhole telemetry device 100).

Although several examples of a detector 505 have been described, it is to be understood that in various embodiments other suitable types of detectors may be used. For example, in some embodiments, the detector 505 may implement a synchronous detection technique, e.g., where the downhole telemetry device includes a clock synchronized to a topside clock and modulates the telemetry system based in a way that is referenced to the clock. In such embodiments, the detector 505 may include a lock-in amplifier. Examples of lock-in amplifiers suitable for synchronous detection of a small signal include those available from Signal Recovery of Oak ridge, TN, e.g., Models 5210, 7124, and 7280. In some embodiments, the lock-in amplifiers may be configured to selectively operate in current input and voltage input modes.

As shown in FIG. 12, in some embodiments, the decoder 507 may include an analog to digital converter (ADC) 701, a processor 702, and, optionally, a signal analyzer 703. The ADC 701 converts an analog signal from the detector 505 into a digital signal, and passes the digital signal on to the processor 702 and the signal analyzer 703. In some embodiments the ADC has a high sensitivity and dynamic range.

It is to be understood that in other embodiments, the ADC may be omitted, e.g., where the processor 702 is an analog processor.

The processor 702 may receive the digital signal from the ADC 701, and process the signal, e.g., to decode data encoded on the telemetry signal, as described above. In some embodiments the processor 702 may include one or more general purpose microprocessor. In some embodiments, the processor may include one or more special purpose processors, such as a digital signal processor. In some embodiments, the processor may output data (e.g., the decoded data from the telemetry signal), e.g., to a display or memory. In some embodiments, the processor 702 may serve additional functions, e.g., user interface, power management, and monitoring, synchronization, and/or control of one or more components of the topside receiver 500.

In some embodiments, a signal analyzer 703 also receives the digital signal from the ADC 701. In some embodiments, the signal analyzer may include a spectrum analyzer that transforms the time domain signal into a frequency domain to generate frequency spectrum information, e.g., using a suitable digital transformation algorithm, such as a fast Fourier transform (FFT). The frequency spectrum may be used. For example, to identify noise sources at various frequencies. This information may then be used to modify the operation of the antenna 501 (e.g., by modifying electrode placement) or the detector 505 (e.g., by adjusting the stopband, passband, cut-off frequency, or other property of one or more filters) to reduce or eliminate the identified noise.

In some embodiments, the adjustment may be manual. For example, a user may replace or modify various components of the detector 505, such as filter inductors or capacitors, or may manually reposition the electrodes 503*a* and 503*b* to reduce noise.

In some embodiments, the adjustment may be automated. For example, the signal analyzer 703 may cooperate with the processor 702 to automatically adjust the operation of the detector 505. For example, the detector 505 may include a filter having bank of switch selectable elements (e.g., inductors or capacitors) that can be used to adjust the properties of the filters. The processor 702 may control a switch for the bank of elements to adjust the filter in response to noise data generated by the signal analyzer 703. Alternatively, the processor 702 may control switches that switch one or more different filters into and out of the signal processing circuitry as desired.

In various embodiments, other types of signal analyzers may be provided, including analyzers that operate in the time domain, or that apply different types of domain transformations to the signal (e.g., a wavelet transformation).

It is to be understood that in various embodiments, the functions of the ADC 701, processor 702, and signal analyzer 703 maybe be implemented in any suitable fashion, e.g., in a combination of software and hardware and distributed across one or more processors.

In some embodiments, one or more of the analog filtering devices described above may be replaced by a digital filter, e.g., implemented in a digital signal processor (DSP) coupled to the ADC 701. For example, in some embodiments, the DSP may implement a high order bandpass filter, e.g., with linear phase. In some embodiments, the digital filters can be controlled, e.g., by the processor 702 to compensate for changes in the noise characteristics of the input signal, e.g., as detected by the signal analyzer 703. In some embodiments, the signal analyzer 703 may also be implemented, at leas tin part, using the DSP.

In some such embodiments, it is desirable to use a high performance ADC, e.g., a 24 to 31 bit ADC with low noise characteristics. In some embodiments, e.g., where the topside detector 500 is an "after market" unit configured to interface with an incumbent analog system, a digital to analog converter (DAC), e.g., a 16 bit DAC, may be used to convert a digital signal from the detector 500 back to an analog signal suitable for use with an incumbent system.

Figure 14A:
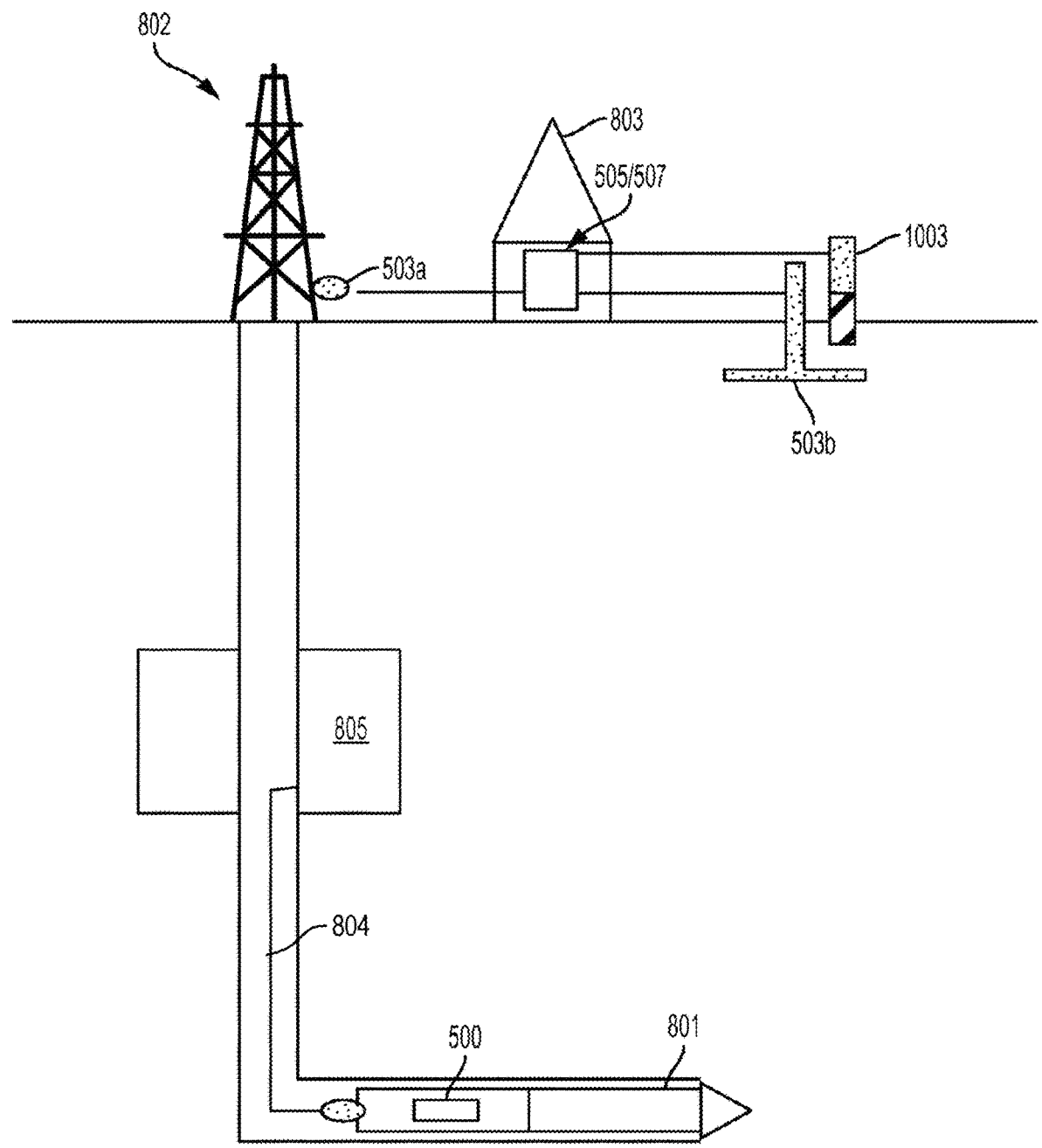
FIGS. 14A and 14B illustrate the use of the EM telemetry devices and systems disclosed herein in exemplary drilling operations. In each figure, portions of the toolstring 10 located uphole of the EM telemetry device 100 are omitted for clarity.

FIG. 14A shows an exemplary deployment of a telemetry system including downhole EM telemetry tool 100 and topside receiver 500 of the type described herein. The telemetry tool 100 is incorporated in a drill string assembly (DSA) 801 than includes a drilling tool driving by a topside rig 802. The detector and decoder portions of the topside receiver 500 (along with, e.g., peripheral components such as a dedicated power source, memory, user input/output devices, and the like) reside in an instrumentation shack 803 at the surface. Electrodes 503*a* and 503*b* are located outside of the shack 803 and are each connected to the detector 505 by a respective wire.

In some embodiments, one or more of the wires may be the central conductor of a coaxial cable, with the outer conductor of the cable used to provide shielding. For example, the outer conductor may be grounded. In some embodiments, e.g., where the detector 505 operates in a voltage sensing mode, the outer conductor may be held at the same DC offset potential as the inner conductor (e.g., to reduce grounding related noise).

In some embodiments, it may be desirable for one of the electrodes 503 to be in electrical contact with the DSA 801. As shown, a first electrode 503a is in electrical contact with the rig 802 associated with the drill string assembly. In some embodiments, the rig 802 may be in good electrical contact with the DSA 801, thereby providing the desired electrical contact between electrode 503a and the DSA 801.

However, in some embodiments, the rig 802 may not provide a reliable electrical contact with the DSA 801. In such cases, a cable 804 (or other suitable electrically conductive element) may be used to establish electrical contact between the DSA 801 and a more uphole object that provides good electrical contact with the first electrode 503a. For example, as shown, the cable 804 provides a continuous, reliable electrical contact between the DSA 801 and an uphole blow out preventer 805, which is in turn in good electrical contact with the rig 801 and the first electrode 503a. In other embodiments, the cable 804 may be attached directly to the rig 801 or directly to the first electrode 503a.

In some embodiments, the contact between the cable 804 and the DSA 801 may accommodate motion (e.g., rotation) of the DSA 801. For example, the contact may be a sliding contact such as a brush contact.

The second electrode 503b is positioned at or near (e.g., within 1-10 m of) the surface to receive an electromagnetic signal transmitted from the downhole EM telemetry device 100. As described in detail above, the signal may be encoded with data related to the operation (e.g., direction, inclination, rotational rate, etc.) of the DSA 801. For example, as described above, the downhole EM telemetry device 100 may drive a time varying current through the ground formation between the telemetry device 100 and the second electrode 503b. The signal is then detected by detector 505 (e.g., as current or voltage signal), and decoded by the decoder 507.

In some embodiments, the second electrode 503b may be stake configured to be partially embedded in the ground. In some embodiments, e.g., as shown in FIG. 14A, the second electrode 503b may include a current collector plate to increase the detected signal. For example, the current collector plate may be arranged transverse to an imaginary axis pointing from the center of the earth to the topside electrode 503b.

In some embodiments, multiple electrodes 503 (not shown) may be distributed at various locations across the surface to collect current transmitted form the telemetry device 100, thereby increasing the signal provided to the detector 505 (and, optionally, providing spatial or temporal information about the transmitted signal, such as a polarity, a location of origin, time-of-flight, or the like).

In some embodiments, the first electrode may be disconnected from the rig 802 (and in turn the DSA 801). In some such embodiments, the first electrode 503a may also be a stake similar to, but displaced from, the second electrode 503b. In some such embodiments, none of the electrodes 503 are in electrical contact with the DSA 801.

Figure 14B:
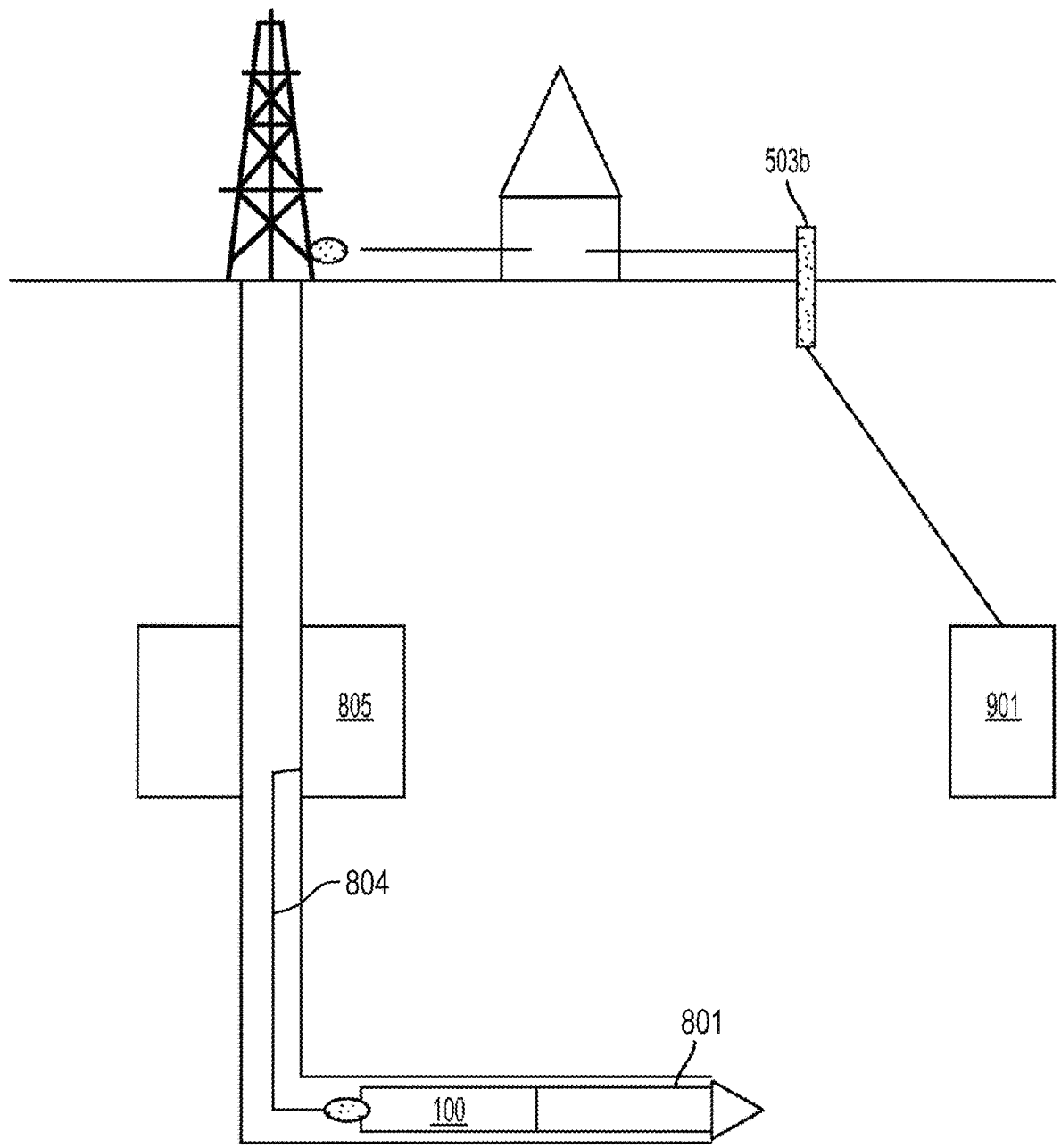

Referring to FIG. 14B, in some embodiments, the second electrode 503b may be in electrical contact with at least one sub-surface object 901. The sub surface object 901 may be any electrically conductive object adjacent to the drilling site containing the DSA 801, such as an adjacent well component (e.g., a casing pipe or blow out component), a metallic deposit, or any other suitable object. The sub-surface object 901 may act as a current collector for the electrode 503b with increased proximity to the DSA 801, thereby reducing signal loss during transmission through the ground formation between the telemetry device 100 and the second electrode 503b.

Figure 15:
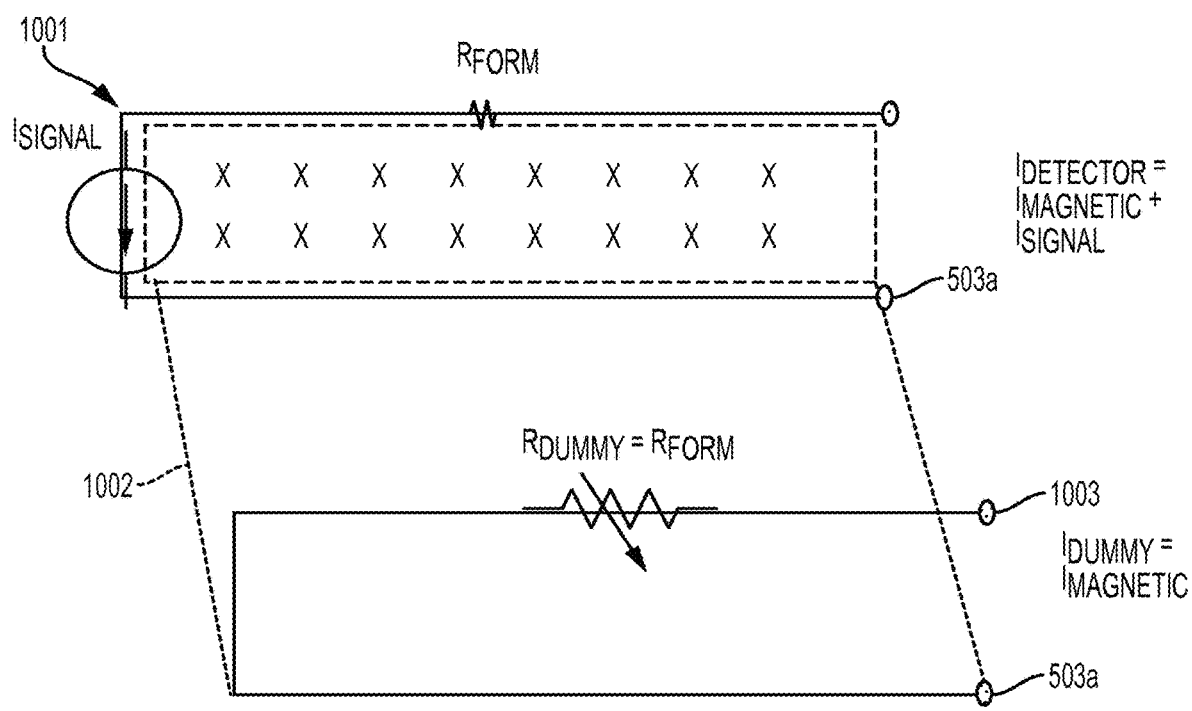
FIG. 15 illustrates a noise cancellation technique for use with the EM telemetry devices and systems disclosed herein.

In some embodiments, the topside detector 500 may employ techniques to reduce or eliminate noise. For example, FIG. 15, schematically illustrates an exemplary detection circuit 1001 for the topside receiver 500. The downhole EM telemetry tool drives a signal current $I_{signal}$ through the resistance of the ground formation $R_{form}$ to the electrode 503b of the receiver antenna 501.

The physical layout of the detection circuit 1001 may include a conductive loop with a magnetic flux passing through the loop (indicated as x's). Time dependent changes in the magnetic flux will cause an electromotive force (EMF) to develop in the circuit, such that the current $I_{detector}$ input into the detector 505 through the electrode 503b will be the sum of $I_{signal}$ plus an additional current $I_{magnetic}$ caused by the magnetic EMF. In some embodiments, e.g., where it is impractical to control the magnetic flux through the detection circuit 1001, the current $I_{magnetic}$ will present noise to the detector 505.

In some embodiments, a dummy detection circuit 1002 may be provided. As indicated by the dashed lines in FIG. 15, the dummy circuit 1002 has substantially the same physical layout and location as the detection circuit 1001. The dummy circuit 1002 is not coupled to the signal current $I_{signal}$. The dummy circuit may include a resistor $R_{dummy}$ set equal to the resistance of the ground formation $R_{form}$. Since the dummy circuit 1002 is co-located with the detection circuit 1001, it experiences nearly the same time varying magnetic flux, a therefore the same EMF. With $R_{dummy}$ set equal to the resistance of the ground formation $R_{form}$, the total current input into the detector 505 from the dummy circuit 1002 will be equal to the magnetic noise current $I_{magnetic}$ of the detection circuit 1001. The detected signal from the dummy circuit 1002 may be subtracted from the detected signal from the detection circuit (e.g., using a differential amplifier) to substantially cancel the magnetic noise component, leaving only $I_{signal}$.

For example, as shown in FIG. 14A, the dummy circuit 1002 may be implemented by providing a dummy electrode stake 1003 adjacent to the detector electrode stake 503b, but electrically insulated from the ground formation, and so isolated from the telemetry signal. The dummy electrode 1003 may be connected to the detector 505 with cabling having the same layout and located adjacent to the corresponding cabling of the detector electrode stake 503b. The detector 505 may implement a differential detection scheme as described above to reduce or substantially eliminate magnetic interference.

In embodiments where additional electrode stakes are used, the foregoing magnetic noise cancellation technique may be extended by providing a dummy stake next to each detector electrode stake.

Although the foregoing magnetic noise cancellation technique is provided in the context of current detection, it is to be understood that a substantially similar approach may be used in a voltage detection context.

In various embodiments, the signal path between each of the electrodes 503 and the detector 505 may be selected to reduce or eliminate noise. For example, in some embodiments where external noise sources are present, the wire between the electrode 503 and the detector path 503 is not laid out along the shortest available path, but instead deviates from the shortest available path to avoid noise sources. For example, in some embodiments where the detector 505 is located on a drilling pad (i.e., region of cleared land supporting various drilling equipment surrounded by a region of uncleared land), it may be desirable to route the connecting wire along or outside the periphery of the drilling pad to avoid pick up from noise sources on the pad.

In some embodiments where multiple electrodes 503 are used, it may be desirable to route two or more connecting wires along a common path (e.g., as a twisted pair of wires surrounded by a conductive shield, e.g., grounded or tied to a shield driver for noise cancellation as described above) for at least a portion of the path leading out of the detector 505. The wires can then branch out separately from the common path portion to each of the respective electrodes.

In some embodiments, e.g., where the detector 505 is located in a shack surrounded by various other equipment, it may be desirable to shield the wires from the electrodes 503 as they enter the shack and are input into the detector 505. In some embodiments, all wires from the electrodes 503 may be directed into a switchbox located external to the receiver shack. In some embodiments, the switchbox provides only two output wires, as a shielded twisted pair, into the shack. This prevents excessive noise from one line corrupting the others, and allows an easy signal input to the detector 505. Switching between the various (e.g., 3 or more) switchbox input lines and the two switchbox output lines may be accomplished in any suitable fashion, e.g., digitally from the shack (e.g., using one or more transitory switches), or manually from the external switch box.

Transmitter/Receiver Systems

In various embodiments, EM telemetry devices and systems and topside receiver devices and system described herein may be used separately. However, in some embodiments, using these devices and systems together may provide advantageous synergies. The downhole EM telemetry devices and systems provide high power transmission over a broad range of frequencies, even in extreme downhole conditions. The topside receiver can receive and decode these transmission with high sensitivity and high noise reduction. Together, the system may provide for a reliable, high bit rate communication link between a downhole tool and a topside controller, even at great depths and in extreme conditions.

The availability of such a reliable transmission link may provide many advantages, and may allow for drilling operation not possible without such a link. For example, such a reliable communication link may allow an operator to receive substantially continuous telemetry (e.g., position, direction, inclination, rotational rate, and other information) perform a complicated directional drilling operation. The telemetry may be provided substantially continuously (e.g., with an update rate sufficient to track the position and status of the drill tool as necessary for the operation) for tens or even hundreds of hours of operation. Accordingly, the operator may be able to obtain smoother, more advantageous drill paths than previously possible.

Although the examples provided above focus on providing telemetry for a downhole tool, such as a drill, it is to be understood that the devices and techniques provided herein may be used for ay suitable application, including other types of subsurface communication or telemetry. Incorporation By Reference The entire contents of all patents, published patent applications and other references cited herein, including, but not limited to those listed in Table 2 below, are hereby expressly incorporated herein in their entireties by reference.

TABLE 2

| Patent App. # | Application Title | Filing Date | Publication Date | Publication |
|---|---|---|---|---|
| 12/928,896 | Electrochemical Double-Layer Capacitor for High Temperature Applications | Dec. 21, 2010 | Jun. 21, 2012 | US20120154979 |
| 12/928,897 | Battery-Capacitor Hybrid Energy Storage System for High Temperature Applications | Dec. 21, 2010 | Jun. 21, 2012 | US20120156528 |
| 13/480,085 | Power System for High Temperature Applications with Rechargeable Energy Storage | May 24, 2012 | Oct. 25, 2012 | US20120268074 |
| PCT/US12/39342 | Power System for High Temperature Applications with Rechargeable Energy Storage | May 24, 2012 | Nov. 29, 2012 | WO2012162500 |
| 13/491,593 | Energy Storage Media for Ultracapacitors | Jun. 7, 2012 | Dec. 13, 2012 | US20120313591 |
| PCT/US12/41438 | Energy Storage Media for Ultracapacitorse | Jun. 7, 2012 | Dec. 13, 2012 | WO2012170749 |

TABLE 2-continued

| Patent App. # | Application Title | Filing Date | Publication Date | Publication |
|---|---|---|---|---|
| PCT/US12/45994 | High Temperature Energy Storage Device | Jul. 9, 2012 | Jan. 17, 2013 | WO2013009720 |
| 13/553,716 | Power Supply for Downhole Instruments | Jul. 19, 2012 | Jan. 31, 2013 | US20130026978 |
| PCT/US12/47474 | Power Supply for Downhole Instruments | Jul. 19, 2012 | Jan. 31, 2013 | WO2013016145 |
| 13/560,628 | Housing for an Energy Storage w. Hermetic Seal | Jul. 27, 2012 | Jan. 31, 2013 | US20130029215 |
| 13/588,452 | In-Line Manufacture of Carbon Nanotubes | Aug. 17, 2012 | Feb. 21, 2013 | US20130045157 |
| 13/587,037 | High Power and High Energy Electrodes Using Carbon Nanotubes | Aug. 16, 2012 | Feb. 21, 2013 | US20130044405 |
| 13/699,396 | Production Logging Instrument | Nov. 5, 2012 | Oct. 17, 2013 | US20130271066 |
| PCT/US1263621 | Production Logging Instrument | Nov. 5, 2012 | May 10, 2013 | WO2013067540 |
| 13/681,081 | Mechanical Hermetic Seal | Nov. 19, 2012 | Jun. 6, 2013 | US20130143108 |
| 13/706,055 | On-Board Power Supply | Dec. 5, 2012 | Jun. 6, 2013 | US20130141840 |
| PCT/US13/27697 | Advanced Electrolyte Systems and Their Use in Energy Storage Systems | Dec. 25, 2013 | Aug. 29, 2013 | WO2013126915 |
| 13/776,603 | Advanced Electrolyte Systems and Their Use in Energy Storage Devices | Feb. 25, 2013 | Feb. 13, 2014 | US20140042988 |
| 13/886,177 | Enhanced Carbon Based Electrode for Use in Energy Storage Devices | May 2, 2013 | Feb. 27, 2014 | US20140057164 |
| PCT/US14/29992 | Modular Signal Interface Devices and Related Downhole Power and Data Systems | Mar. 15, 2014 | Sep. 18, 2014 | WO2014145259 |
| PCT/US14/30310 | Inertial Energy Generator for Supplying Power to a Downhole Tool | Mar. 17, 2014 | Sep. 18, 2014 | WO2014145520 |

Those skilled in the art will recognize, or be able to ascertain using no more than routine experimentation, numerous equivalents to the specific procedures described herein. Such equivalents were considered to be within the scope of this invention and are covered by the following claims. Moreover, any numerical or alphabetical ranges provided herein are intended to include both the upper and lower value of those ranges. In addition, any listing or grouping is intended, at least in one embodiment, to represent a shorthand or convenient manner of listing independent embodiments; as such, each member of the list should be considered a separate embodiment.

It should be recognized that the teachings herein are merely illustrative and are not limiting of the invention. While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed but to be construed by the claims appended herein.

What is claimed is:

1. An electromagnetic (EM) telemetry device comprising an EM telemetry circuit capable of transmitting a pulsed high power EM telemetry signal, wherein:
the high power EM telemetry signal has a peak or average pulse power of about 20 W to about 2000 W, and
the EM telemetry circuit has a maximum operating temperature of at least 150 degrees Celsius; wherein the high power EM telemetry signal originates from a low power EM signal generator.

2. The EM telemetry device of claim 1, wherein the device further comprises an energy storage device comprising at least one battery, inductor, high temperature rechargeable energy storage device (HTRESD), or any combination thereof.

3. The EM telemetry device of claim 2, wherein the energy storage device comprises an HTRESD comprising at least one electrolytic capacitor, hybrid capacitor, ultracapacitor, or any combination thereof.

4. The EM telemetry device of claim 3, wherein the HTRESD comprises at least one ultracapacitor.

5. The EM telemetry device of claim 2, wherein the energy storage device comprises at least one battery.

6. The EM telemetry device of claim 5 wherein the at least one battery comprises a lithium thionyl chloride battery.

7. The EM telemetry device of claim 1, wherein the device is configured to connect to a toolstring power bus (TPB).

8. The EM telemetry device of claim 1, wherein the device is configured to receive input power from a downhole power source.

9. The EM telemetry device of claim 8, wherein the downhole power source comprises a battery, a generator, a power supply connected to a topside power source, or any combination thereof.

10. The EM telemetry device of claim 9, wherein the device further comprises a power management circuit.

11. The EM telemetry device of claim 10, wherein the power management circuit comprises an ultracapacitor charging circuit.

12. The EM telemetry device of claim 11, wherein the power management circuit comprises a battery management circuit.

13. The EM telemetry device of claim 11, wherein the power management circuit comprises a switch mode power supply.

14. The EM telemetry device of claim 13, wherein the switch mode power supply is selected from the group consisting of buck, boost, buck-boost, boost-buck, Cuk, forward, flyback, inductorless converters, and any variants thereof.

15. The EM telemetry device of claim 11, wherein the power management circuit has an operational efficiency greater than 50%.

16. The EM telemetry device of claim 15, wherein the power management circuit has an operational efficiency greater than 90%.

17. The EM telemetry device of claim 10, wherein the power management circuit comprises an electronics management circuit.

18. The EM telemetry device of claim 1, wherein the low power EM signal generator is an EM telemetry tool capable of providing an EM signal at a power of up to about 15 W.

19. The EM telemetry device of claim 18, wherein the device comprises an energy storage providing at least 50 W of instantaneous power to the EM telemetry circuit.

* * * * *